(12) United States Patent
Thompson

(10) Patent No.: US 11,892,114 B2
(45) Date of Patent: Feb. 6, 2024

(54) EXPANDER WITH ACCESSORIES TO ADJUST NOMINAL SIZE

(71) Applicant: Titan CMP Solutions LLC, Boise, ID (US)

(72) Inventor: Roger W. Thompson, Boise, ID (US)

(73) Assignee: TITAN CMP SOLUTIONS LLC, Boise, ID (US)

( * ) Notice: Subject to any disclaimer, the term of this patent is extended or adjusted under 35 U.S.C. 154(b) by 323 days.

(21) Appl. No.: 17/237,899

(22) Filed: Apr. 22, 2021

(65) Prior Publication Data

US 2021/0239253 A1 Aug. 5, 2021

Related U.S. Application Data

(63) Continuation-in-part of application No. 16/246,392, filed on Jan. 11, 2019, now abandoned, which is a
(Continued)

(51) Int. Cl.
*F16L 55/18* (2006.01)
*F16L 55/165* (2006.01)
(Continued)

(52) U.S. Cl.
CPC ............ *F16L 55/18* (2013.01); *F16L 55/163* (2013.01); *F16L 55/1657* (2013.01);
(Continued)

(58) Field of Classification Search
CPC ..... F16L 55/18; F16L 55/163; F16L 55/1657; F16L 55/1658; F16L 55/44; E03F 2003/065
(Continued)

(56) References Cited

U.S. PATENT DOCUMENTS 2,535,342 A 12/1950 Ahlgren
3,227,214 A 1/1966 Whann
(Continued)

FOREIGN PATENT DOCUMENTS

CA 1213531 11/1986
CA 2427534 A1 12/2001
(Continued)

OTHER PUBLICATIONS

"Rehabilitation of Underground Infrastructure Utilizing Trenchless Pipe Replacement", Luekle et al., Practice Periodical on Structural Design and Construction, vol. 6, Issue 1 (Feb. 2001).
(Continued)

*Primary Examiner* — James F Hook
(74) *Attorney, Agent, or Firm* — Zeman-Mullen & Ford, LLP

(57) ABSTRACT

An expander, preferably for use in expanding a host pipe to be refurbished. A floating pad is disposed to be displaced relative to a chassis by at least one retractable and extendable piston such that the expander has a first expansion range between fully-retracted and fully-extended states. A floating pad jacket and a chassis jacket are disposed to be removably attached to the floating pad and chassis, such that the floating pad jacket increases the first expansion range of the expander to a second expansion range when the floating pad jacket is attached to the floating pad, and the chassis jacket increases the first expansion range of the expander to a third expansion range when the chassis jacket is attached to the chassis. At least one piston may be configured to be extended and retracted independently.

20 Claims, 35 Drawing Sheets

Related U.S. Application Data continuation of application No. 15/922,407, filed on Mar. 15, 2018, now Pat. No. 10,746,341.

(60) Provisional application No. 62/471,389, filed on Mar. 15, 2017.

(51) Int. Cl.
*F16L 55/163* (2006.01)
*F16L 55/44* (2006.01)
*F16L 101/12* (2006.01)
*E03F 3/06* (2006.01)

(52) U.S. Cl.
CPC .......... *F16L 55/1658* (2013.01); *F16L 55/44* (2013.01); *E03F 2003/065* (2013.01); *F16L 2101/12* (2013.01)

(58) Field of Classification Search
USPC ............. 138/97, 98; 405/150.1, 184.2, 184.3
See application file for complete search history.

(56) References Cited

U.S. PATENT DOCUMENTS

| | | |
|---|---|---|
| 3,354,955 A | 11/1967 | Berry |
| 3,958,607 A | 5/1976 | Gray |
| 4,000,879 A | 1/1977 | Martin et al. |
| 4,024,721 A | 5/1977 | Takada et al. |
| 4,253,497 A | 3/1981 | Martin et al. |
| 4,362,489 A | 12/1982 | Bast |
| 4,418,572 A | 12/1983 | Prange |
| 4,429,720 A | 2/1984 | Beck et al. |
| 4,487,052 A | 12/1984 | Yarnell |
| 4,529,008 A | 7/1985 | Appleton |
| 4,626,134 A | 12/1986 | Coumont |
| 4,627,765 A * | 12/1986 | Hentschel ............. E21D 9/0621 299/33 |
| 4,678,370 A | 7/1987 | Allen |
| 4,770,256 A * | 9/1988 | Lipsker ............... E21B 17/1014 175/57 |
| 4,848,964 A | 7/1989 | Yarnell |
| 4,930,542 A * | 6/1990 | Winkle ............... F16L 55/1658 264/36.16 |
| 4,954,016 A | 9/1990 | Storgard |
| 4,958,959 A | 9/1990 | St. Onge |
| 5,076,730 A | 12/1991 | Bergey |
| 5,205,671 A | 4/1993 | Handford |
| 5,265,647 A * | 11/1993 | Taylor ..................... F16L 55/18 118/DIG. 11 |
| 5,273,414 A | 12/1993 | Gargiulo |
| 5,482,404 A | 1/1996 | Tenbusch, II |
| 5,924,913 A | 7/1999 | Reimelt |
| 5,971,404 A | 10/1999 | Stoves |
| 6,167,913 B1 | 1/2001 | Wood et al. |
| 6,206,049 B1 * | 3/2001 | Ward ..................... F16L 55/265 264/269 |
| 6,457,532 B1 | 10/2002 | Simpson |
| 6,793,442 B2 | 9/2004 | Carter et al. |
| 7,096,570 B2 | 8/2006 | Marr et al. |
| 7,191,841 B2 | 3/2007 | Sivley, IV |
| 7,308,944 B2 | 12/2007 | Johnston et al. |
| 7,353,889 B1 | 4/2008 | Gunsaulis et al. |
| 7,559,365 B2 | 7/2009 | Watson et al. |
| 7,559,722 B2 | 7/2009 | Crane |
| 7,740,076 B2 | 6/2010 | Costa et al. |
| 7,812,328 B2 * | 10/2010 | Betz ....................... B01J 19/123 250/493.1 |
| 7,836,741 B2 | 11/2010 | Johnston |
| 7,905,255 B2 | 3/2011 | Iwasaki-Higbee |
| 7,931,311 B2 | 4/2011 | Dubedout et al. |
| 8,186,385 B2 | 5/2012 | Iwasaki-Higbee |
| 8,702,349 B2 | 4/2014 | Carter et al. |
| 8,727,666 B2 | 5/2014 | Farley et al. |
| 9,175,798 B1 | 11/2015 | Thompson |
| 9,322,503 B2 | 4/2016 | Thompson |
| 2003/0131898 A1 | 7/2003 | Andersen et al. |
| 2007/0036613 A1 | 2/2007 | Tjader |
| 2009/0283646 A1 * | 11/2009 | Sugahara .......... F16L 55/16455 248/73 |
| 2011/0188943 A1 | 8/2011 | Wentworth et al. |
| 2013/0174979 A1 | 7/2013 | Kiest, Jr. |
| 2016/0238182 A1 | 8/2016 | Thompson |
| 2016/0348812 A1 | 12/2016 | Hairston et al. |
| 2017/0234474 A1 | 8/2017 | Thompson |
| 2018/0328531 A1 * | 11/2018 | Weisenberg ............ F16L 55/18 |
| 2020/0158276 A1 * | 5/2020 | Britton ................ F16L 55/1653 |

FOREIGN PATENT DOCUMENTS

| | | |
|---|---|---|
| EP | 0292104 B1 | 11/1992 |
| EP | 0647812 A1 | 4/1995 |
| EP | 1013874 A2 | 12/1999 |
| GB | 965132 | 7/1964 |
| GB | 1161407 | 8/1969 |
| GB | 2440626 A | 2/2008 |
| WO | 00/37766 | 6/2000 |

OTHER PUBLICATIONS

Dubnewych, McKenna, McDonald and Patel: "Problems Encountered on the Upper Reach of the Northeast Interceptor Sewer Project", published engineering project report c. 2004 from Los Angeles Area.

Rehabilitating Aging Structures, Brochure from Contech Engineered Solutions, copyright 2012.

DuroMaxx® Steel Reinforced Polyethylene Liner Pipe Handling and Installation Guide, Brochure from Contech Engineered Solutions, copyright 2012.

Al-Abri, Omar S., et al., Structural behavior of solid expandable tubular undergoes radial expansion process—Analytical, numerical, and experimental approaches, International Journal of Solids and Structures, Sep. 2013, pp. 2980-2994, vol. 50, Issue 19.

Camp, Craig, et al., Culvert Replacement Using Pipe Ramming, Tunneling, or Pipe Jacking, Paper for North American Society for Trenchless Technology (NASTT), No-Dig Show 2010, Paper A-5-05, pp. 1-11.

Brochure from the United States Department of Agriculture Forest Service, Decision Analysis Guide for Corrugated Metal Culvert Rehabilitation and Replacement Using Trenchless Technology, Dec. 2012.

Marr, Brian, Solid Expandable Casing Repair (Powerpoint Presentation), for SPE International (Society of Petroleum Engineers), Apr. 26, 2006.

Brochure prepared for the International Pipe Bursting Association, Guideline for Pipe Bursting, Jan. 2012.

Article from unitracc.com, Hydraulic and Static Pipe Bursting, 2014.

Weatherford Product Brochure, MetalSkin solid expandable systems, MetalSkin Cased-Hole Liner System, 2008.

Weatherford News Release, Weatherford Successfully Completes World's Longest ESS Installation in 6 Inch Horizontal Hole, Nov. 28, 2000.

Schladweiler, Jon C., From Orangeburg to Papier Mache Pipe—the Wood Fibre Pipes, the article was originally presented in the "Historian's Report" in the AWPCA (now the Arizona Water Association—AZ Water) Newsletter in Jul. 2005, but was found on the Internet at http://www.sewerhistory.org/articles/compon/orangeburg/pitch-fibre.pipe.htm.

International Search Report and the Written Opinion of the International Searching Authority in related International Application No. PCT/US2018/022636 dated May 24, 2018 (9 pages).

* cited by examiner

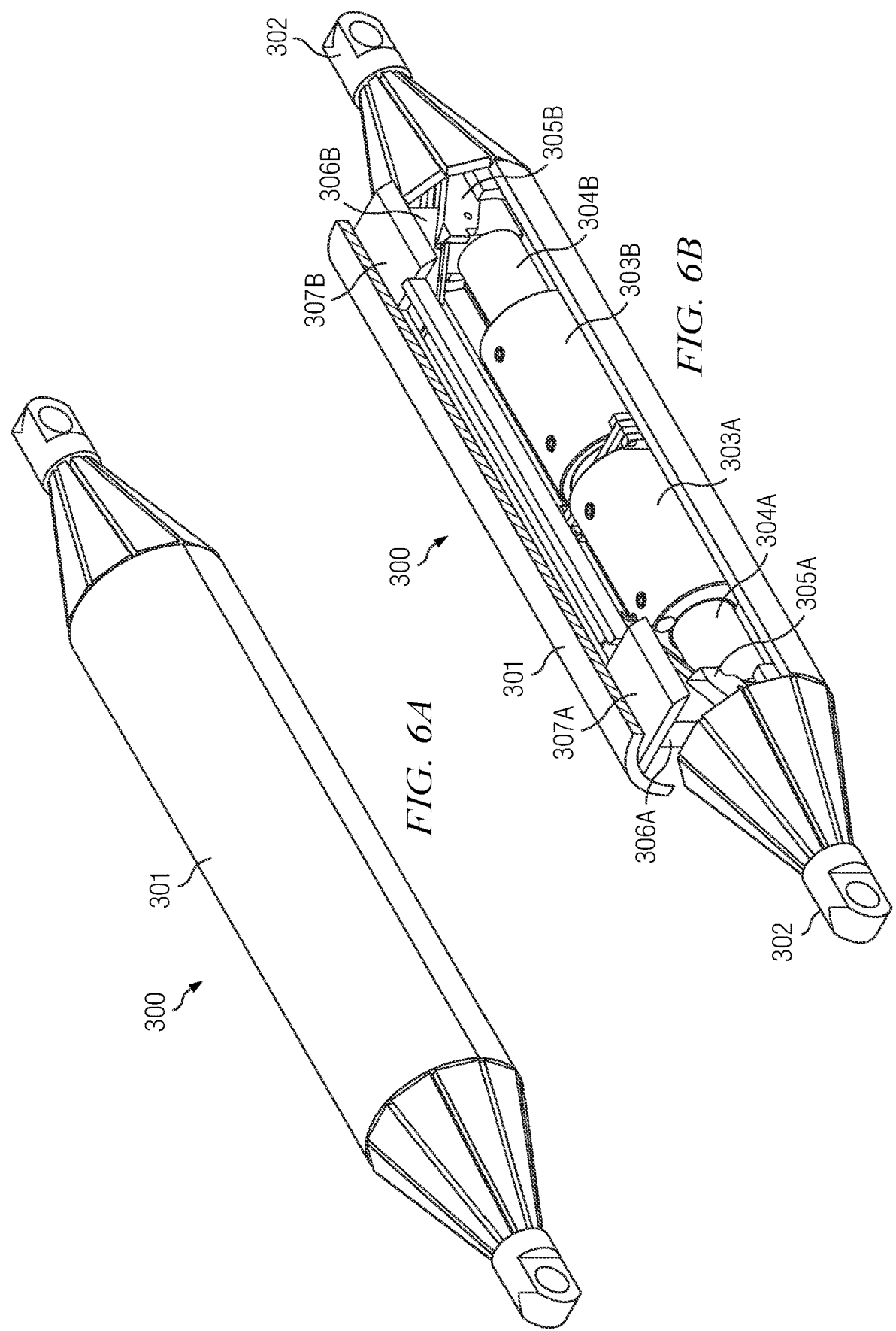

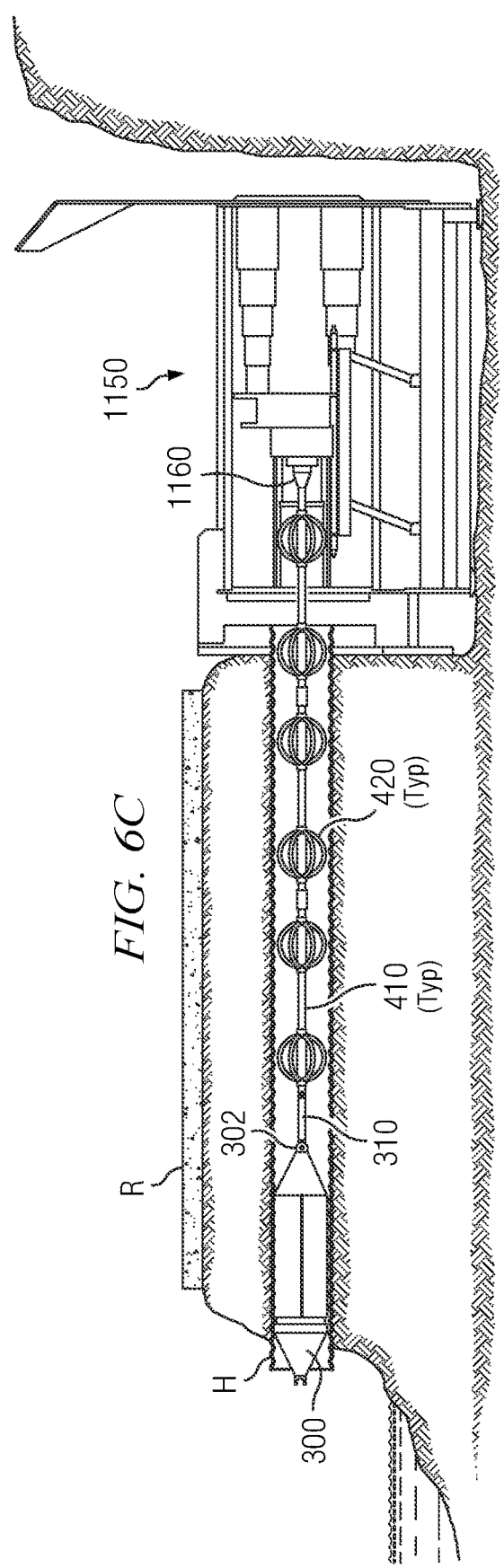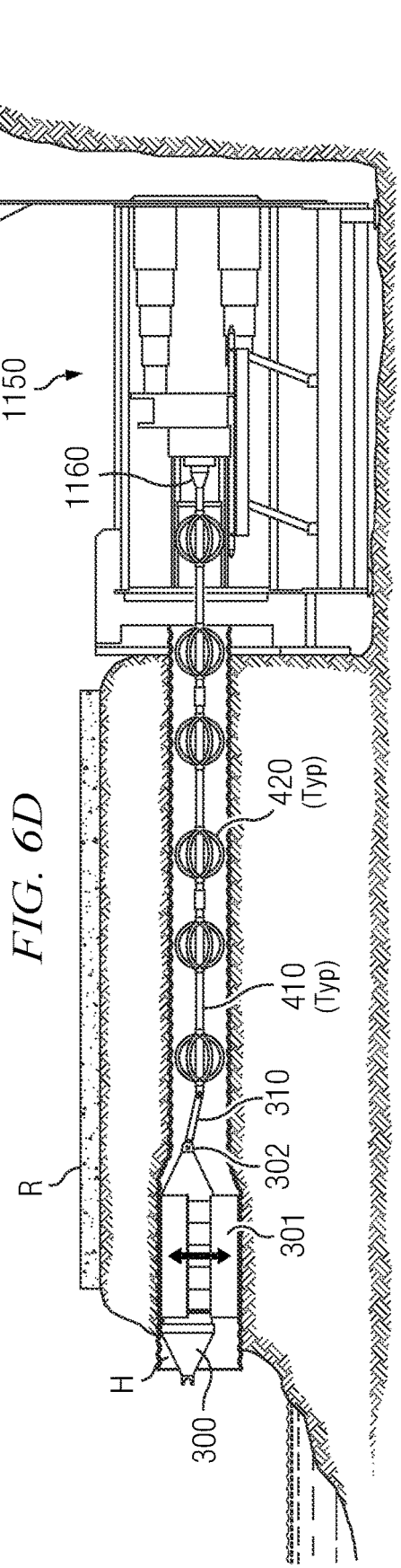

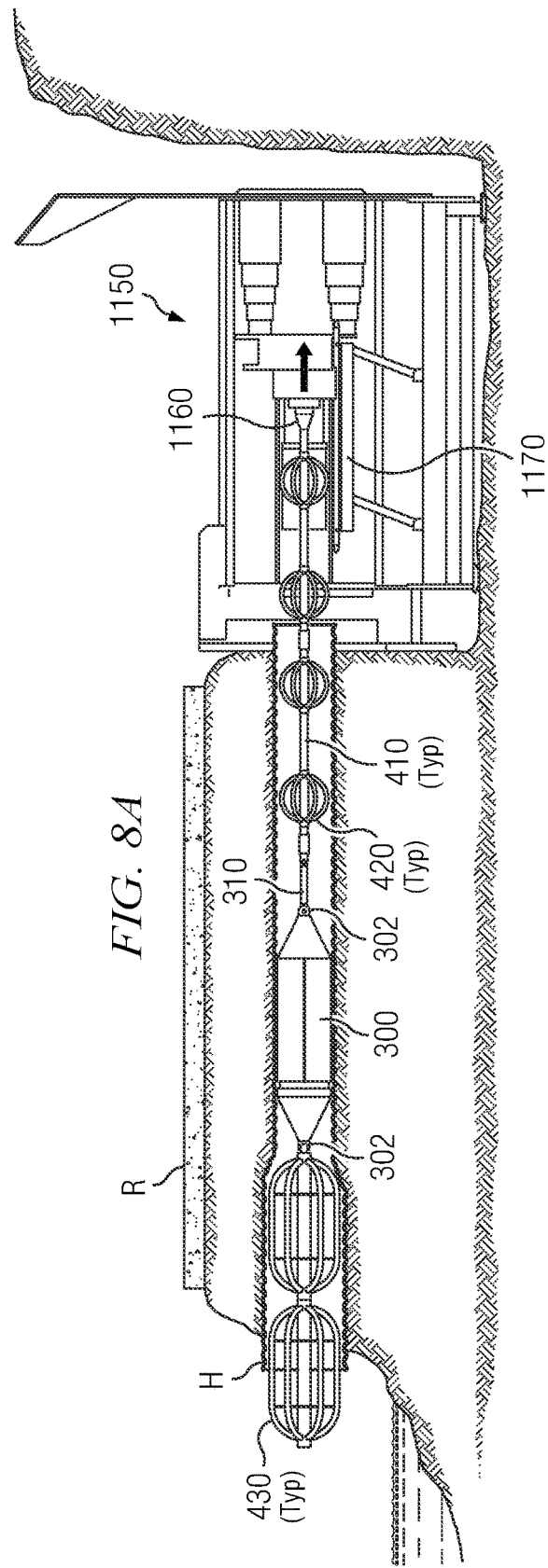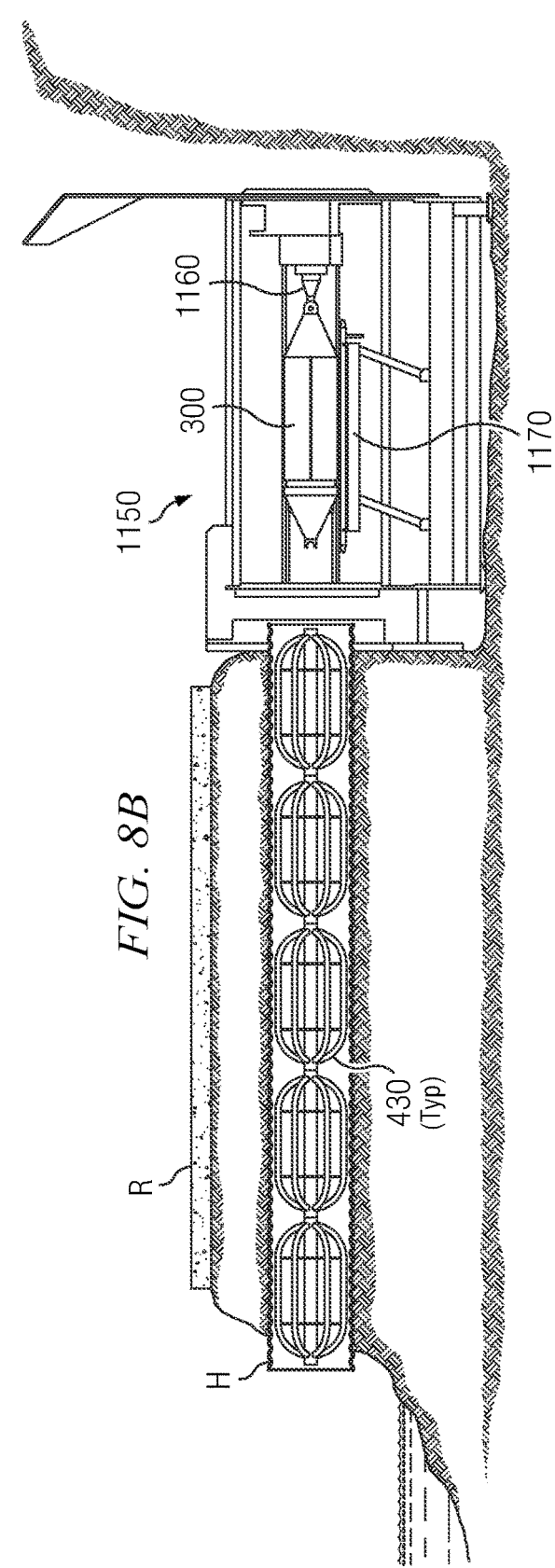
FIG. 8A
FIG. 8B

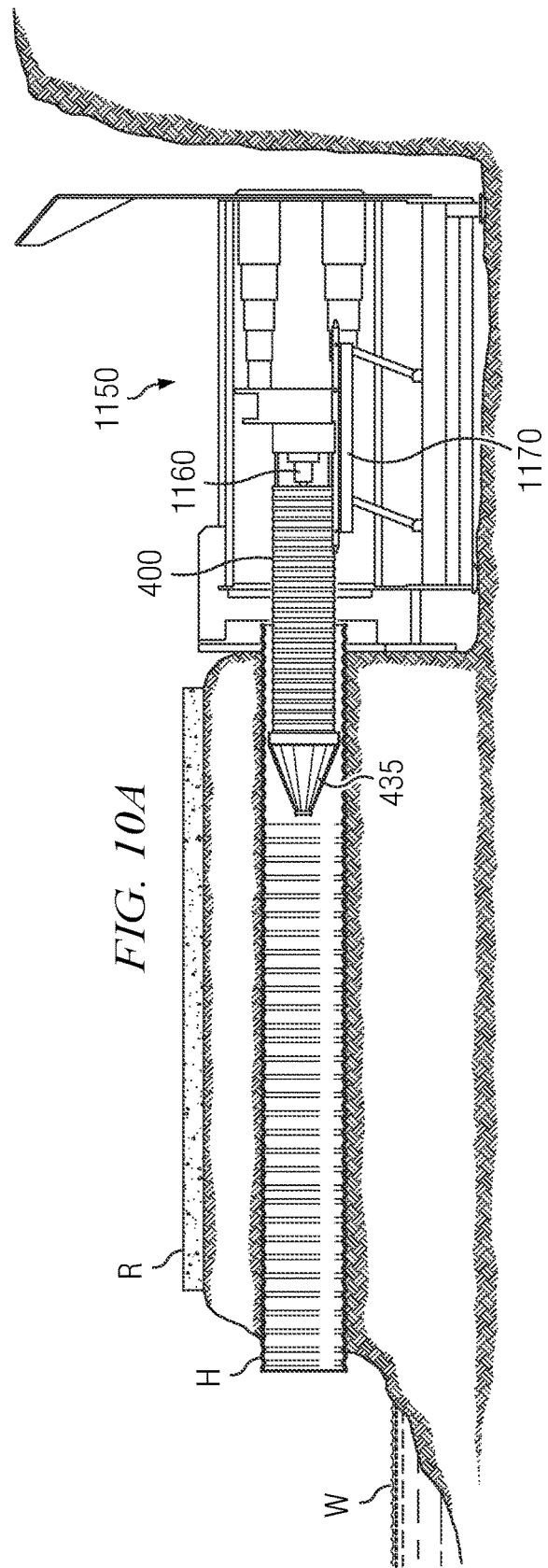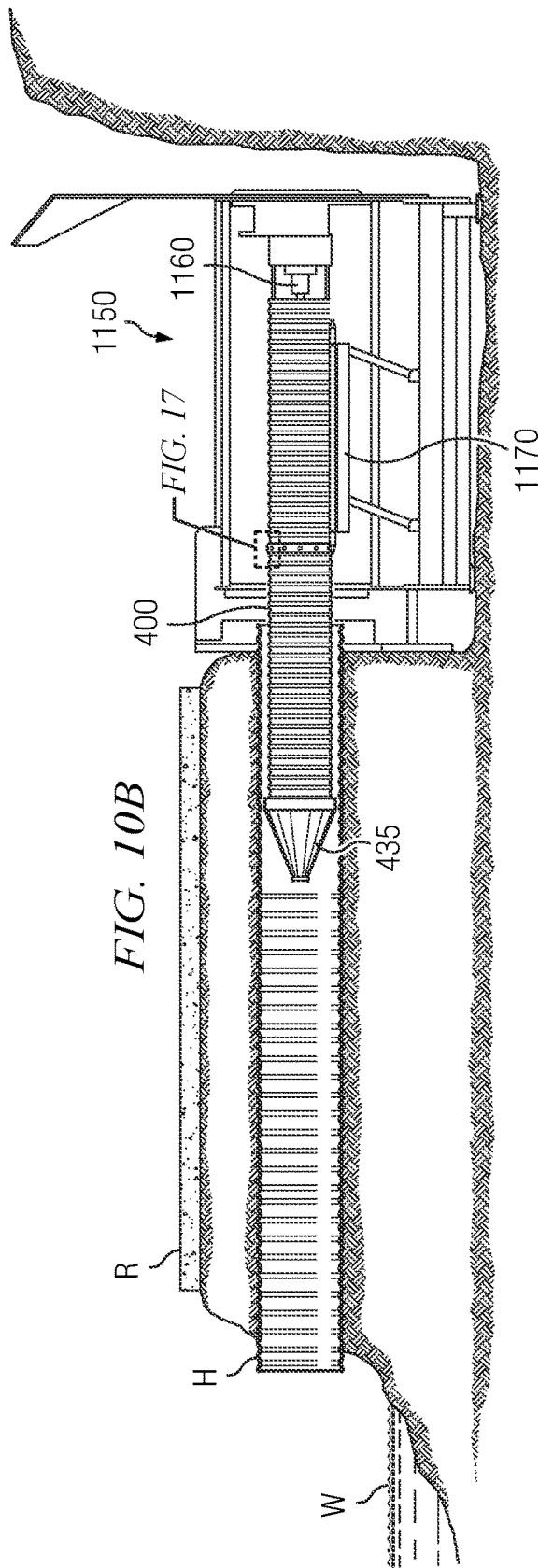

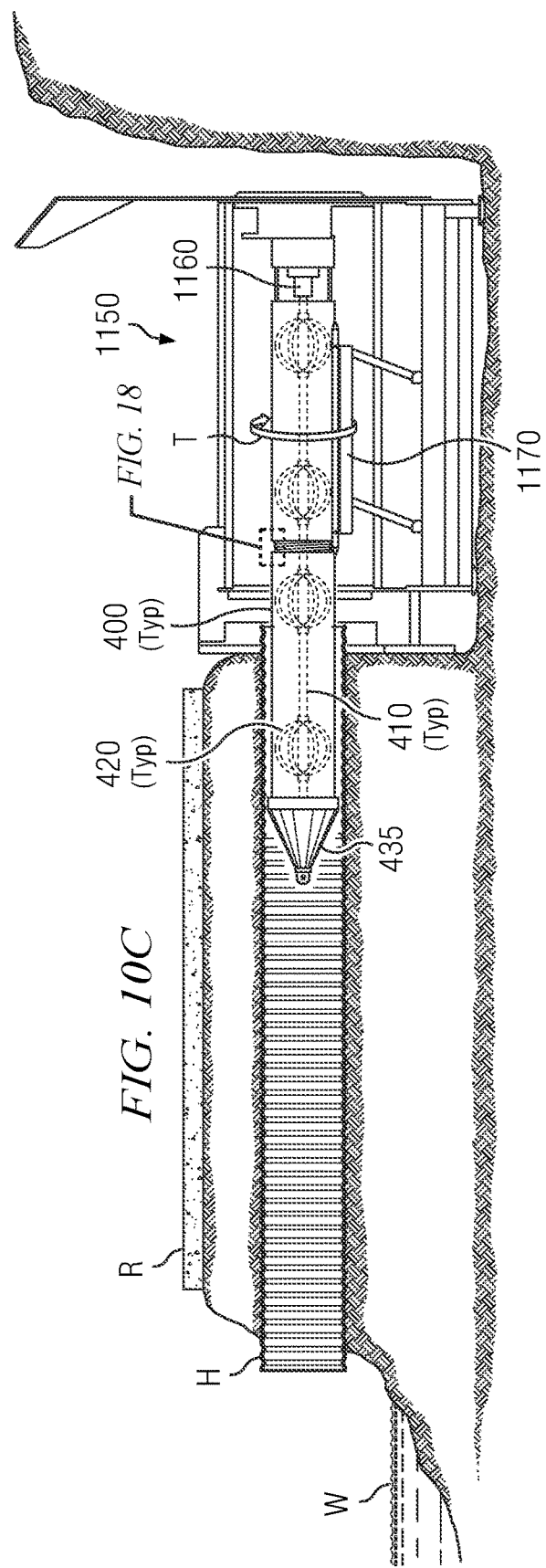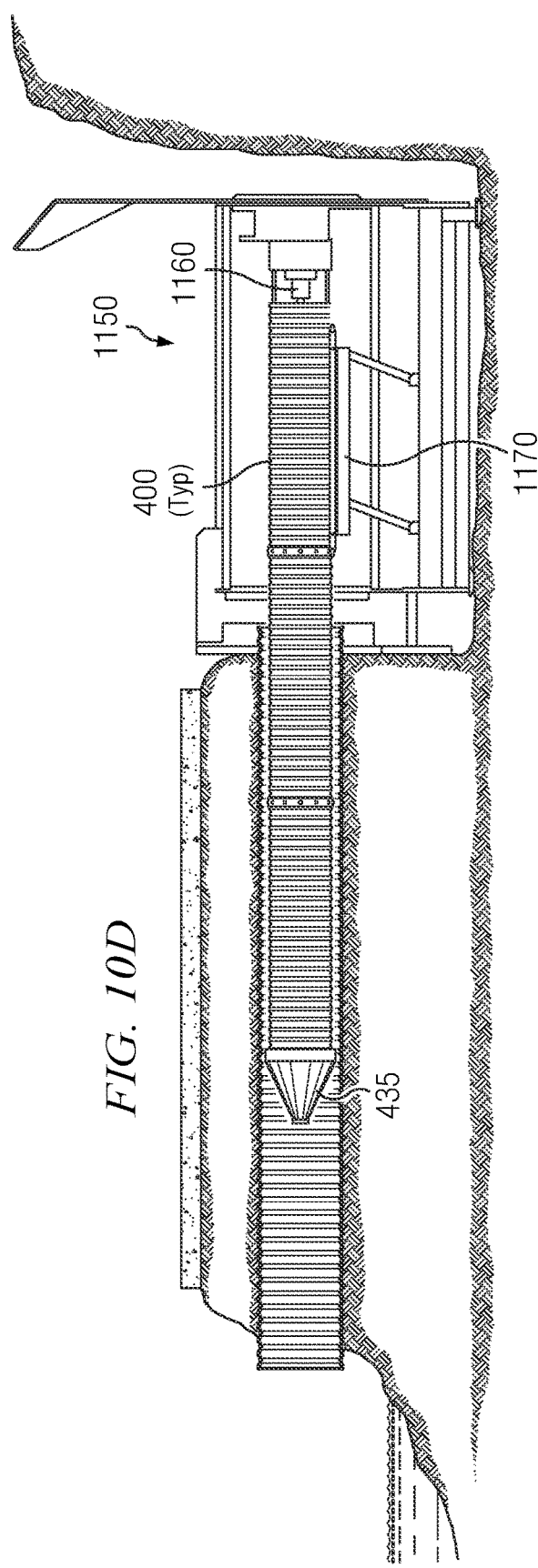

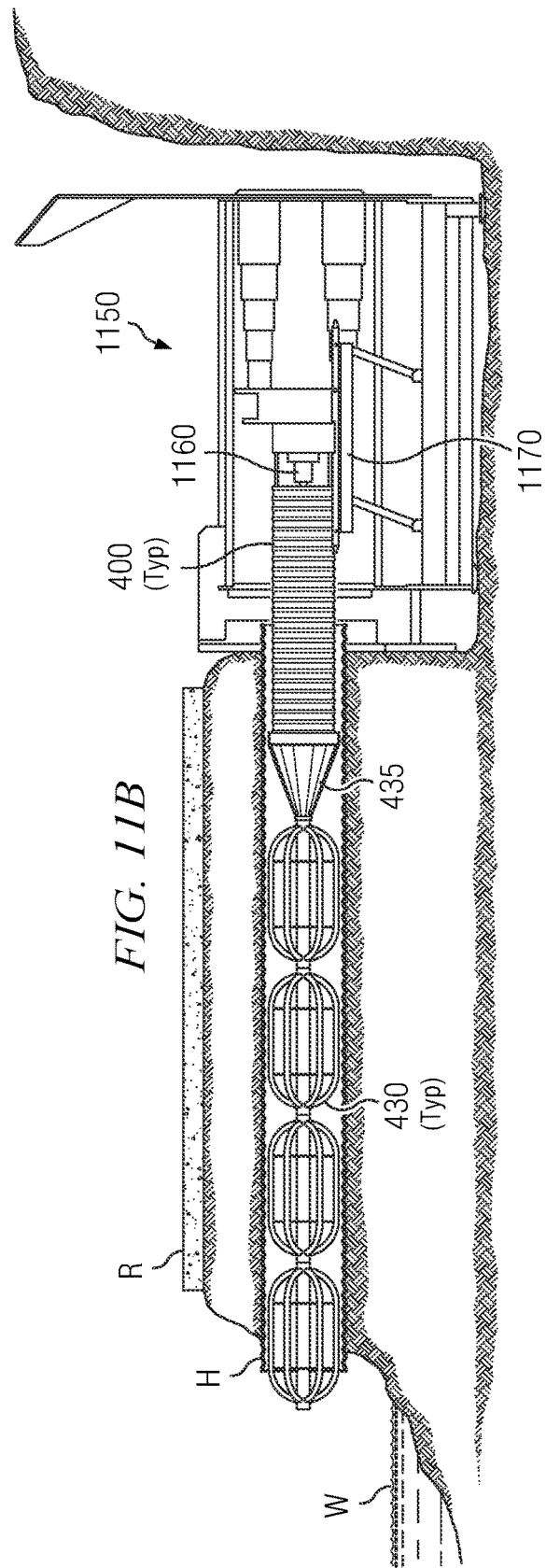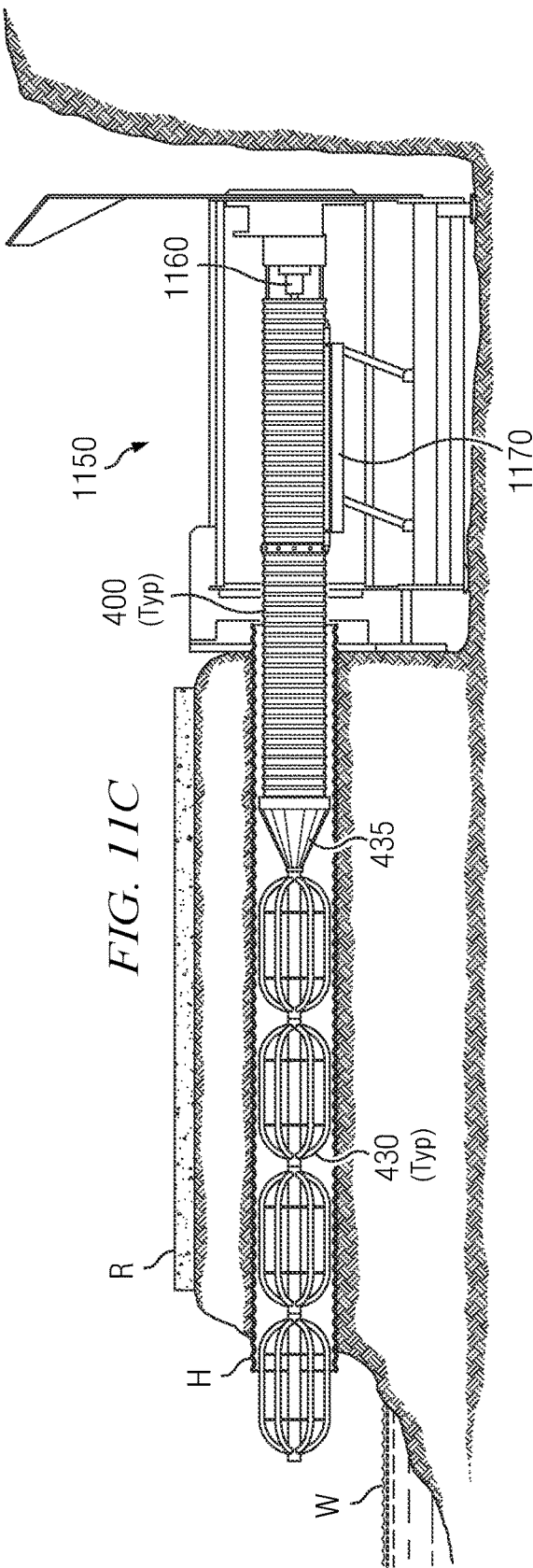

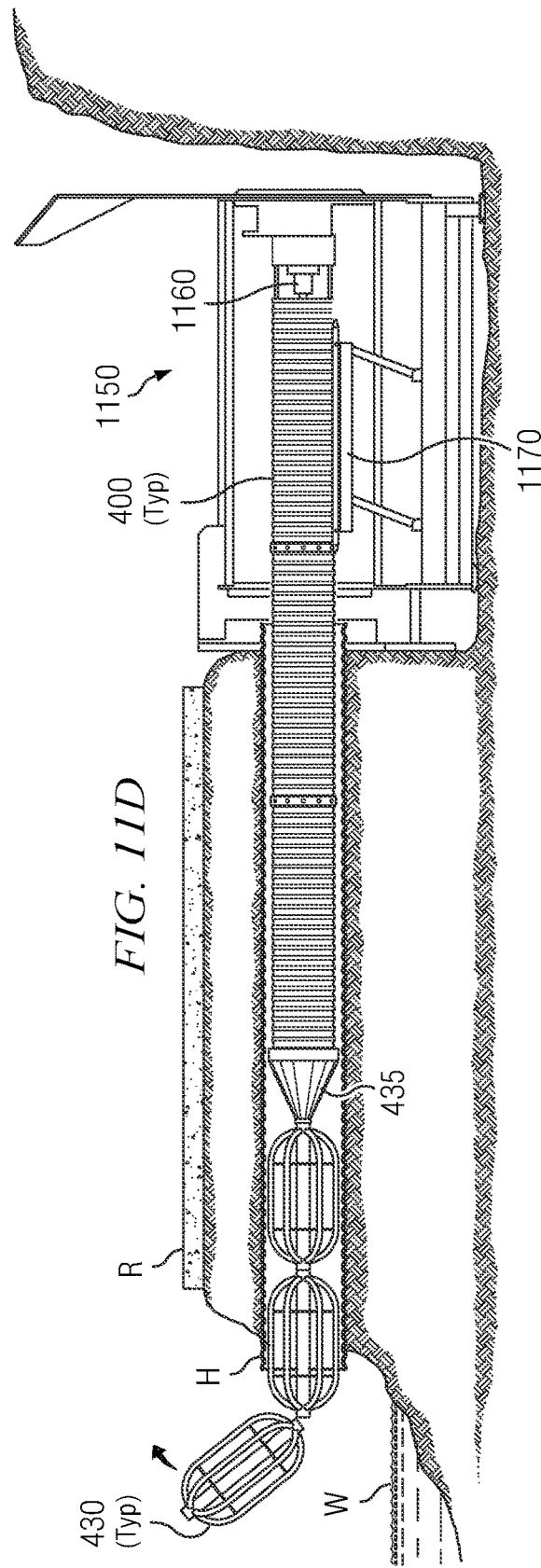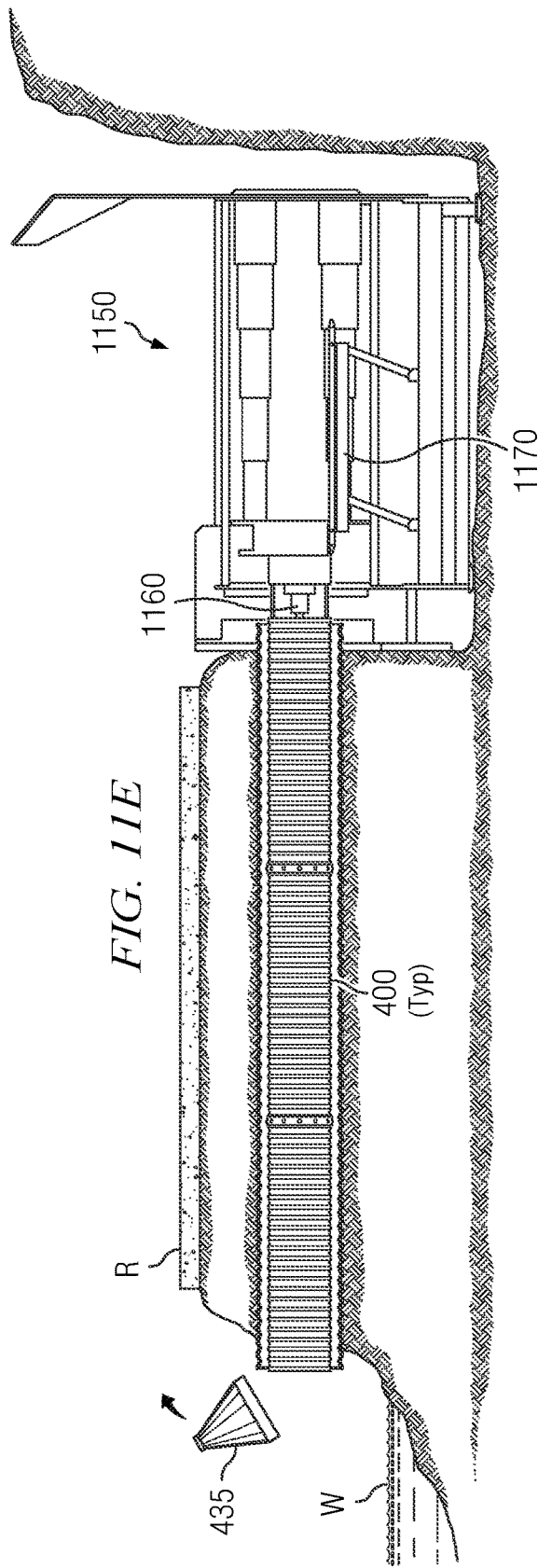

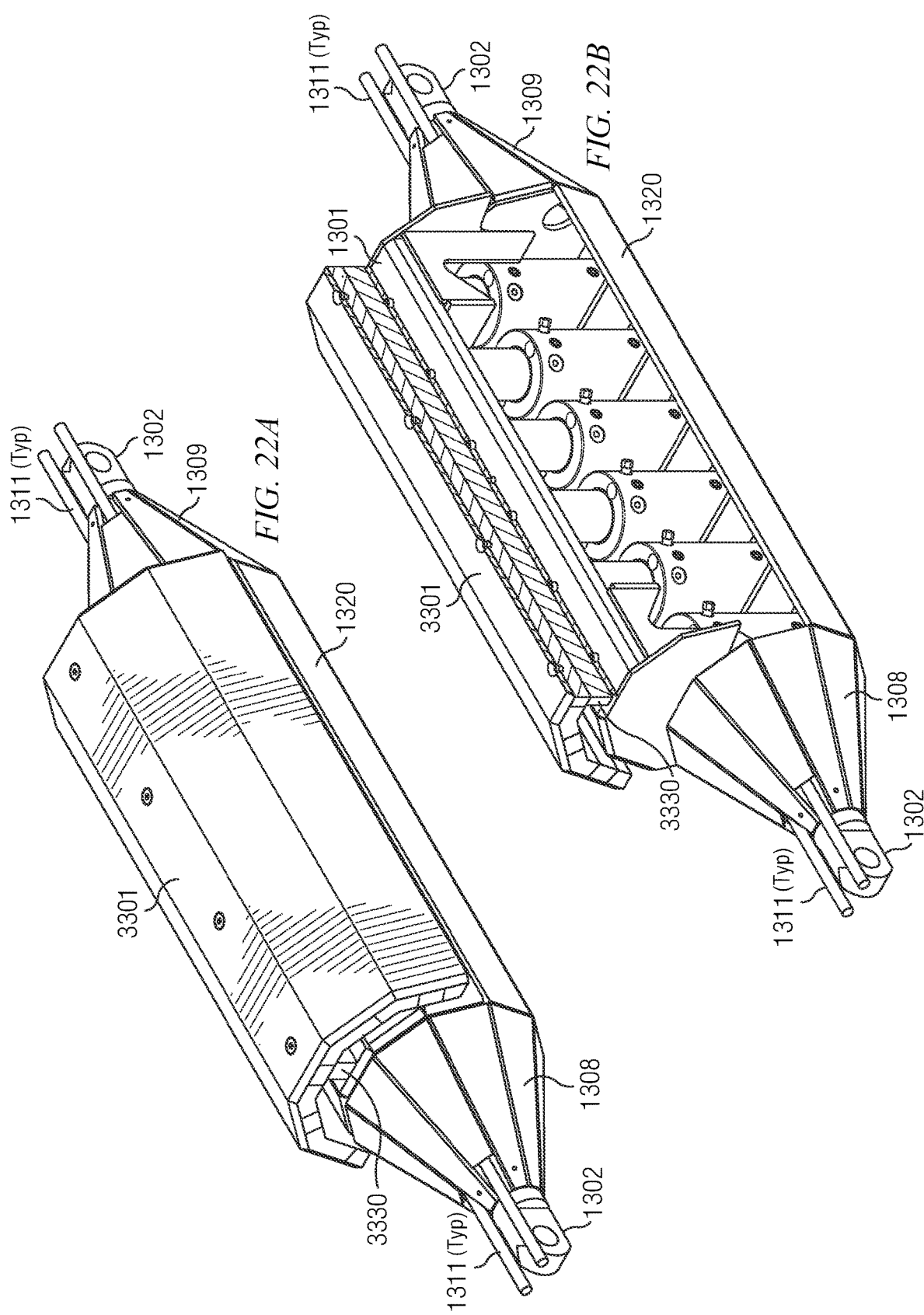

EXPANDER WITH ACCESSORIES TO ADJUST NOMINAL SIZE

PRIORITY CLAIM AND RELATED APPLICATIONS

This application is a continuation-in-part of co-pending, commonly-invented, commonly-assigned U.S. nonprovisional patent application Ser. No. 16/246,392 filed Jan. 11, 2019, which is a continuation of commonly-invented, commonly-assigned U.S. nonprovisional patent application Ser. No. 15/922,407 filed Mar. 15, 2018 (now U.S. Pat. No. 10,746,341), which in turn claims priority to and the benefit of commonly-invented, commonly-assigned U.S. provisional patent application Ser. No. 62/471,389 filed Mar. 15, 2017. This application claims priority to, and the benefit of, Ser. No. 16/246,392, Ser. No. 15,922,407 and Ser. No. 62/471,389, and incorporates the entire disclosures of Ser. Nos. 16/246,392, 15/922,407 and 62/471,389 herein by reference. This application is further related to commonly-invented and commonly-assigned U.S. patent application Ser. No. 14/732,565 filed Jun. 5, 2015 (hereafter, the "Prior Application"), now U.S. Pat. No. 9,175,798 issued Nov. 3, 2015. The entire disclosure of the Prior Application is also incorporated herein by reference as if fully set forth herein.

FIELD OF THE DISCLOSURE

This disclosure is directed generally to a method for refurbishing buried expandable pipes without open cut replacement (i.e., without digging the pipe out of the ground), where such pipes are located in confined spaces, such as under roads in mountain passes with steep inclines on one side and open waterways nearby on the other side.

BACKGROUND

The term "expandable" is used as a defined term of art throughout this disclosure. By "expandable", this disclosure refers to culverts and pipes that, when cut longitudinally in situ underground, may then be radially expanded, preferably nondestructively, by separation and widening of the longitudinal cut, so that the expanded pipe (or expanded "host" pipe as sometimes referred to herein) may then receive a new inner liner pipe whose internal diameter is at least the same as, if not larger than, the internal diameter of the original unrefurbished host pipe. It is expected that many culverts or pipes falling within this definition will be metal, and will be corrugated or "accordion" in profile. However, the term is not limited to corrugated or accordion profiles on metal pipes or culverts.

The Prior Application, incorporated herein by reference, discloses a trenchless technology, now patented, for nondestructively refurbishing underground pipes. Generally speaking, the Prior Application describes embodiments in which a longitudinal cut is initially made in the host pipe. In some embodiments disclosed in the Prior Application, the host pipe is then radially expanded, preferably nondestructively, by separation and widening of the longitudinal cut. A new liner pipe is then inserted into the expanded host pipe. Preferably, the internal diameter of the liner pipe is at least the same as, if not larger than, the internal diameter of the original unrefurbished host pipe. Grout may then be injected into the annular space between the liner pipe and the host pipe.

The Prior Application further describes some of the problems that its disclosed technology solves, and some of the technical advantages enabled in solving such problems. While embodiments of the Prior Application have been shown to be highly serviceable, and indeed highly advantageous, improvements have been identified in deployments where the host pipe is located, for example, under roads in mountain passes with steep inclines on one side and open waterways nearby on the other side. Such locations may often present additional access challenges in deploying the embodiments of the Prior Application. As is shown on FIG. 1, host pipe H is buried beneath road R with steep incline SI on one side and waterway W on the other side. In the exemplary environment illustrated on FIG. 1, access to host pipe H on the waterway W side is from above only. Access to host pipe H on the other side is very limited by steep incline SI. It will be appreciated that, for example, the location of host pipe H presents challenges to installing a new liner pipe inside host pipe H if the liner pipe is approximately the same length as host pipe H. There is not enough room on the steep incline SI side to insert a full-length liner into the host pipe H from the incline side, and waterway W prevents practical insertion of a full-length liner into host pipe H from the water side.

Conventional prior art solutions to the above-described access challenges present additional problems. For example, a "cured in place" or "CIPP" method is known, in which a collapsible liner, or "sock" is unrolled into host pipe H and then expanded with steam and cured onto the inside of host pipe H. Such CIPP solutions lack the structural integrity of a rigid liner pipe solution, and their robustness against cracking and leaking in service is not as good as a rigid liner pipe solution.

SUMMARY OF DISCLOSED TECHNOLOGY AND TECHNICAL ADVANTAGES

This disclosure describes enhanced embodiments of the trenchless underground pipe refurbishment technology described in the Prior Application. Embodiments of methods and apparatus described in this disclosure solve the problem of inserting a liner pipe into the host pipe in deployments where physical space limitations make insertion of a full-length liner pipe impractical, if not impossible. According to the embodiments described in this disclosure, a confined space insertion tool (hereafter, a "pusher box") enables the new inner liner pipe to be inserted into the host pipe in concatenated sections.

Functionally, the pusher box manipulates rods of predetermined length into and out of the host pipe once the pusher box has been positioned, leveled and stabilized at one end of the host pipe. Functions performed by the pusher box on the rods include inserting and retracting the rods from the host pipe, rotating a rod string, and raising/lowering a rod string with respect to the host pipe. With particular reference to inserting and retracting, the pusher box inserts rods in a concatenated string. Once the pusher box has inserted one rod into the pipe, the next rod is concatenated to the trailing end of the previously-inserted rod before being pushed in, and so on. Retraction of the concatenated rod string is the reverse operation. The pusher box pulls the rod string out so that the rods can be removed from the string one at a time. A rod is disconnected from the retracted string as it emerges, allowing the next rod in the string to be retracted.

The rods may preferably be used first in the host pipe cutting phase, in which a longitudinal cut is made in the host pipe to facilitate nondestructive expansion of the host pipe via separation of the cut. Some embodiments may use a self-propelled cutting tool such as described in the Prior Application. Other embodiments may use a cutting tool that is pushed into and retracted from the host pipe using rods and the pusher box as described below. In some embodiments, the cutting tool may be "pushed while cutting" by inserting rods into a concatenated rod string. In other embodiments (such as illustrated in this disclosure), the cutting tool may be "pulled while cutting" by retracting and removing rods from the string once the cutting tool has been positioned at the far end of the host pipe by rod insertion. However, this disclosure is not limited to any particular design of cutting tool or direction in which the cut is made using the rods in a rod string.

After the host pipe is cut, the rods may then preferably be used again, this time in conjunction with a pipe expansion tool in the host pipe expansion phase. Preferred embodiments include a host pipe expansion phase, although the scope of the disclosed technology is not limited in this regard. Preferred embodiments may use a pipe expansion tool such as is described in the Prior Application, or a lighter, smaller expansion tool as described in this disclosure. However, this disclosure is not limited to any particular design of expansion tool. As will be described in greater detail below, the pusher box may insert and retract a rod string connected to the pipe expansion tool, which allows the operators to stop the expansion tool at desired stations along the length of the host pipe interior in order to expand the host pipe at those stations. Additionally, the pusher box may rotate the rod string while the pipe expansion tool is attached at a remote end. As a result, the pipe expansion tool may also be rotated in a controlled way at each host pipe expansion station, allowing for uniform radial expansion of the host pipe at each station. Also, as with the disclosure regarding the cutting tool immediately above, embodiments may use a "push and expand" technique on the pipe expansion tool (in which rods are inserted into the concatenated rod string), while alternative embodiments may use a "pull and expand" technique (in which the rods are retracted and removed from the rod string once the pipe expansion tool has been positioned at the far end of the host pipe via rod insertion). This disclosure is not limited to any particular design of pipe expansion tool or direction in which host pipe is expanded using the rods in a rod string.

Note also that not all embodiments of an expansion phase require a cutting phase. The scope of this disclosure includes some embodiments (not described herein in detail) in which expansion is sufficient to "smooth out" the wavy profile of a corrugated host pipe. Embodiments for expanding a host pipe in this fashion are described in the Prior Application, incorporated by reference herein. Once expansion of a host pipe is complete in these "non-cut" embodiments, a liner pipe may be inserted into the host pipe in sections, consistent with the liner pipe insertion phase described below in this disclosure.

Once the expansion phase is complete, the pusher box, in conjunction with the rods, then enables the liner pipe to be inserted into the expanded host pipe in sections. Preferably, each liner pipe section is approximately the same length as one of the rods. Away from the pusher box, a rod is inserted into a liner pipe section, and is centered and frictionally stabilized within the liner pipe section with wireframe centering balls that are attached to the rod along the rod's length. The wireframe centering balls are sized and shaped to frictionally engage the internal surface of the liner pipe so that the liner pipe section may be inserted into the host pipe along with the rod. Advantageously, the liner pipe sections arrive at the pusher box in "cartridge" form, with a length of liner pipe already made up with the rods and wireframe centering balls pre-deployed inside. The cartridges may be of any length suitable for the application, but are preferably selected from within a range from about 3 feet to about 7 feet in length.

Currently preferred embodiments of the liner pipe itself are a rigid liner pipe. More preferably, the liner pipe comprises galvanized corrugated metal pipe ("CMP"), although the scope of this disclosure is not limited in this regard. Examples of other suitable rigid liner pipe constructions include, without limitation, galvanized metal, aluminized steel, or asphalt coated steel pipe (corrugated or plain), or plastic, ceramic or a fiber reinforced resin compound pipe (corrugated or plain).

The pusher box inserts the liner pipe sections one by one into the host pipe. As noted, the liner pipe sections are inserted by the rods. As with the host pipe expansion phase, the pusher box inserts rods (this time with liner pipe sections attached) in a concatenated string. Once the pusher box has completed insertion of one rod into the pipe, the next rod is concatenated to the trailing end of the previously-inserted rod before being pushed in. Each successive liner pipe section is also concatenated to the trailing end of the previously-inserted liner pipe section before insertion by its corresponding rod.

The leading ends of the first rod and the first liner pipe section in the string are preferably attached to a conically-shaped steel head, such that the steel head leads the entire string of rods into the host pipe with concatenated liner pipe sections attached to the steel head. The steel head, with its dead weight and conical shape, assists the pusher box with smooth insertion of the entire concatenated string of rods/liner pipe sections into the host pipe. In particular, the steel head protects the leading edge of the first liner pipe section from snagging against corrugations and minor peripheral obstructions in the interior of the host pipe. Embodiments herein of the steel head also advantageously provide a vibrator that vibrates the steel head and the first rods/liner pipe sections in the string against the host pipe interior as they are inserted into the host pipe. Alternatively, steel head embodiments may provide an impact hammer on board to generate a jolting force. This vibration or jolting further assists the pusher box with smooth insertion of the entire concatenated string of rods/liner pipe sections into the host pipe. It will thus be appreciated that in preferred embodiments deploying an attached steel head, the pusher box is effectively pushing the steel head into the host pipe via the rods, and the liner pipe sections are being "dragged along for the ride". That is, compressive force from the pusher box pushes the steel head further into the host pipe via thrust through successive concatenated rods. As the steel head moves further into the pipe, the steel head drags the attached concatenated liner pipe sections behind it, even though the liner pipe sections are also disposed about the rods via friction connection through the wireframe centering balls. The concatenated liner pipe sections are thus subjected to a tensile force as they are dragged into the host pipe, rather than to a compressive force from a "push" into the host pipe via the rods. In this way, the liner pipe sections are in lower jeopardy of buckling or collapsing compressively in response to the "push" force on the rods from the pusher box.

Once all of the liner pipe sections have been inserted into the host pipe by the pusher box, and the steel head has emerged from the host pipe at the far end, the steel head may be disconnected from the rod string and the concatenated liner pipe sections, and then removed from the host pipe at the far end. The pusher box then retracts the rod string, with the wireframe centering balls attached. The pusher box pulls the rod string out so that the rods can be removed from the string one at a time. A rod is disconnected from the retracted string as it emerges, allowing the next rod in the string to be retracted, and so on. In some embodiments, a combination of the dead weight of the entire liner pipe as now deployed in the host pipe, plus the frictional resistance of the entire length of liner pipe against the host pipe interior, is sufficient to hold the liner pipe in place while the rod string is retracted from the liner pipe with wireframe centering balls attached. In other embodiments, it may be preferable to initially disconnect only the rod string from the steel head, and leave the liner pipe temporarily connected to the steel head. In such embodiments, the dead weight and frictional resistance of the liner pipe as attached to the steel head at the far end of the host pipe will enable the rod string, with wireframe centering balls attached, to be retracted from the liner pipe without dislodging the liner pipe from within the host pipe. Once the rods and wireframe centering balls are completely retracted, the liner pipe may then be disconnected from the steel head at the far end of the host pipe. The steel head may be taken away, leaving the liner pipe in place in the host pipe.

Once the rod string is removed entirely from the host pipe, the annular space between the host pipe and liner pipe may be injected with grout. Alternatively, grouting may be done before the rod string is removed to provide yet further immobilization of the liner pipe during retraction of the rods and wireframe centering balls.

It should be noted that use of the wireframe centering balls in this disclosure is not limited to the above-described process of inserting a liner pipe in the host pipe. Although not specifically illustrated and described below, the scope of this disclosure includes optionally including the wireframe balls as centering devices on the rod string during host pipe cutting and expansion phases. Throughout the disclosed pipe refurbishment process, the centering function of the wireframe balls provides several advantages, including:

(a) Stabilizing the rods inside the liner pipe during insertion. As will be described below, in preferred embodiments the compression "push" delivered by the pusher box to insert the liner pipe into the host pipe may be up to 85,000 lbs. The wireframe centering balls stabilize the rod string to minimize lateral deflection of the rods under such a push load.

(b) Centralizing the compression force during liner pipe insertion. As noted above, the compression force is preferably focused through to the steel head at the leading end of the liner pipe as it is inserted into the host pipe. The steel head then pulls the liner pipe into the host pipe.

(c) When used in the cutting phase, centralizing the path of the cutting tool during the host pipe cutting phase, thereby encouraging a true longitudinal cut.

(d) When used in the expansion phase, centralizing the path of the pipe expansion tool during the host pipe expansion phase, thereby encouraging controlled rotation and uniform expansion at each station.

According to a first aspect, therefore, embodiments of the disclosed technology provide a method for refurbishing an existing pipe, the method comprising the steps of: (a) providing an existing host pipe; (b) inserting a concatenated string of liner pipe sections inside the host pipe, step (b) further including: (b1) providing a plurality of cartridges, each cartridge including (1) a liner pipe section, (2) at least one rod and (3) at least one centering ball, wherein each rod and centering ball is received inside the liner pipe section such that each rod is stabilized within the liner pipe section via frictional contact between each centering ball and the liner pipe section; (b2) inserting a first cartridge into the host pipe; (b3) concatenating the at least one rod in the first cartridge to the at least one rod in the second cartridge; (b4) concatenating the liner pipe section on the first cartridge to the liner pipe section on the second cartridge; and (b5) inserting the second cartridge into the host pipe; and (c) withdrawing the rods and centering balls from within the concatenated string of liner pipe sections.

In other embodiments, concatenating the liner pipe section on the first cartridge to the liner pipe section on the second cartridge is accomplished by a connection technique selected from the group consisting of: (a) clamping; (b) bolting; (c) riveting; (d) gluing with adhesive; and (e) welding.

In other embodiments, concatenating the liner pipe section on the first cartridge to the liner pipe section on the second cartridge is accomplished by making a threaded connection therebetween.

In other embodiments, the method may comprise, prior to step (b), the steps of: (aa) providing an expander, the expander having a longitudinal expander axis, the expander adapted to generate outward radial force perpendicular to the longitudinal expander axis when the expander is actuated to expand; (ab) moving the expander along a path inside the host pipe, the path having stations at which the expander stops; (ac) expanding the host pipe during step (ab), step (ac) further including, at each station: (ac1) stopping the expander; (ac2) responsive to outward radial force from the expander, increasing an interior diameter of the host pipe; and (ac3) moving the expander to the next station. In other embodiments, the method may further comprise rotating the expander about the longitudinal expander axis and repeating step (ac2). In other embodiments, step (ab) further comprises concatenating a plurality of capsules into a string thereof, wherein the string of capsules is inserted into the host pipe to follow the expander as it moves.

In other embodiments, an annular space forms between the host pipe and the concatenated string of liner pipe sections, and the method further comprises: (d) at least partially filling the annular space with grout. In other embodiments, the method may further comprise the steps of stabilizing the concatenated string of liner sections with stabilization measures before step (d) and removing the stabilization measures after step (d).

In other embodiments, the method may comprise, prior to step (b), the step of making a longitudinal cut in the host pipe. The method may further comprise inserting a plurality of capsules into the host pipe as the longitudinal cut is made, wherein the capsules are in a concatenated string thereof.

In other embodiments, the first cartridge has a leading end and a trailing end as inserted into the host pipe, and a steel head is connected to the leading end of the first cartridge such that the at least one rod in the first cartridge is connected to the steel head. The steel head may be conically shaped. The first cartridge may also be connected to the steel head. In other embodiments, the steel head includes a vibrator, and step (b) further includes vibrating the steel head during insertion. In other embodiments, the steel head includes an impact hammer, and step (b) further includes jolting the steel head during insertion.

According to a second aspect, embodiments of the disclosed technology provide a method for refurbishing an existing pipe, the method comprising the steps of: (a) providing an existing host pipe; (b) providing an expander, the expander having a longitudinal expander axis, the expander adapted to generate outward radial force perpendicular to the longitudinal expander axis when the expander is actuated to expand; (c) moving the expander along a path inside the host pipe, the path having stations at which the expander stops; (d) expanding the host pipe during step (c), step (d) further including, at each station: (d1) stopping the expander; (d2) responsive to outward radial force from the expander, increasing an interior diameter of the host pipe; and (d3) moving the expander to the next station; (e) inserting a concatenated string of liner pipe sections inside the host pipe, step (e) further including: (e1) providing a plurality of cartridges, each cartridge including (1) a liner pipe section, (2) at least one rod and (3) at least one centering ball, wherein each rod and centering ball is received inside the liner pipe section such that each rod is stabilized within the liner pipe section via frictional contact between each centering ball and the liner pipe section; (e2) inserting a first cartridge into the host pipe, wherein the first cartridge has a leading end and a trailing end as inserted into the host pipe, and in which a steel head is connected to the leading end of the first cartridge such that the at least one rod in the first cartridge is connected to the steel head and the liner pipe section on the first cartridge is also connected to the steel head; (e3) concatenating the at least one rod in the first cartridge to the at least one rod in the second cartridge; (e4) concatenating the liner pipe section on the first cartridge to the liner pipe section on the second cartridge; and (e5) inserting the second cartridge into the host pipe; and (f) withdrawing the rods and centering balls from within the concatenated string of liner pipe sections.

According to a third aspect, embodiments of the disclosed technology provide a pusher box, comprising: at least one front plate opposing at least one back plate; a rod connector carriage wherein the rod connector carriage is disposed to travel between the at least one front plate and the at least one back plate, the rod connector carriage including a rod connector, the rod connector positioned on the rod connector carriage facing the at least one front plate; the rod connector carriage further including a rod rotator, wherein the rod rotator is disposed to selectively rotate the rod connector; at least one extend piston interposed between the rod connector carriage and the at least one back plate, wherein extension of the at least one extend piston causes the rod connector carriage to travel towards the at least one front plate; at least one retract piston interposed between the rod connector carriage and the at least one front plate, wherein extension of the at least one extend piston causes the rod connector carriage to travel away from the at least one front plate; an elevator positioned under the rod connector carriage, wherein the elevator is disposed so that, when a workpiece is placed on the elevator, the elevator supports the workpiece at a desired elevation with respect to the rod connector carriage; and at least one front horizontal stabilizer and at least one back horizontal stabilizer, the at least one front horizontal stabilizer and the at least one back horizontal stabilizer disposed so that, when the pusher box is received in an excavation, actuation of the at least one front horizontal stabilizer against the excavation and actuation of the at least one back horizontal stabilizer against the excavation stabilizes the pusher box horizontally within the excavation.

In other embodiments according to the third aspect, the pusher box further comprises a pusher box frame, wherein the at least one front plate and the at least one back plate are ultimately attached to the pusher box frame, and in which the elevator includes: a cradle; an elevator piston; and a plurality of elevator guide bars, wherein each elevator guide bar is rotatably connected at a first end to the cradle and at a second end to the pusher box frame; wherein the cradle is disposed to be raised and lowered by corresponding extension and retraction of the elevator piston such that the cradle is maintained substantially horizontal during said raising and lowering via cooperating rotation of the elevator guide bars.

In other embodiments according to the third aspect, the at least one extend piston includes four extend pistons.

In other embodiments according to the third aspect, the at least one retract piston includes two retract pistons.

In other embodiments according to the third aspect, selected ones of the at least one front plate include front plate reinforcement.

In other embodiments according to the third aspect, selected ones of the at least one back plate include back plate reinforcement.

In other embodiments according to the third aspect, the pusher box further comprises a front horizontal stabilizer piston, and in which the front horizontal stabilizer piston actuates the at least one front horizontal stabilizer against the excavation.

According to a fourth aspect, embodiments of the disclosed technology provide a pusher box, comprising: at least one front plate opposing at least one back plate; a rod connector carriage wherein the rod connector carriage is disposed to travel between the at least one front plate and the at least one back plate, the rod connector carriage including a rod connector, the rod connector positioned on the rod connector carriage facing the at least one front plate; the rod connector carriage further including a rod rotator, wherein the rod rotator is disposed to selectively rotate the rod connector; at least one extend piston interposed between the rod connector carriage and the at least one back plate, wherein extension of the at least one extend piston causes the rod connector carriage to travel towards the at least one front plate; at least one retract piston interposed between the rod connector carriage and the at least one front plate, wherein extension of the at least one extend piston causes the rod connector carriage to travel away from the at least one front plate; an elevator positioned under the rod connector carriage, wherein the elevator is disposed so that, when a workpiece is placed on the elevator, the elevator supports the workpiece at a desired elevation with respect to the rod connector carriage; at least one front horizontal stabilizer, at least one back horizontal stabilizer, and at least one vertical stabilizer; the at least one front horizontal stabilizer and the at least one back horizontal stabilizer disposed so that, when the pusher box is received in an excavation, actuation of the at least one front horizontal stabilizer against the excavation and actuation of the at least one back horizontal stabilizer against the excavation stabilizes the pusher box horizontally within the excavation; and the at least one vertical stabilizer disposed so that, when the pusher box is received in the excavation, actuation of the at least one vertical stabilizer against the excavation levels the pusher box within the excavation.

According to a fifth aspect, embodiments of the disclosed technology provide a pusher box, comprising: a pusher box frame; at least one front plate opposing at least one back plate, wherein the at least one front plate and the at least one back plate are ultimately attached to the pusher box frame; a rod connector carriage wherein the rod connector carriage is disposed to travel between the at least one front plate and the at least one back plate, the rod connector carriage including a rod connector, the rod connector positioned on the rod connector carriage facing the at least one front plate, wherein the rod connector is disposed to connect to a rod deployed inside a pipe section workpiece; at least one extend piston interposed between the rod connector carriage and the at least one back plate, wherein extension of the at least one extend piston causes the rod connector carriage to travel towards the at least one front plate; at least one retract piston interposed between the rod connector carriage and the at least one front plate, wherein extension of the at least one extend piston causes the rod connector carriage to travel away from the at least one front plate; and an elevator positioned under the rod connector carriage, wherein the elevator is disposed so that, when the workpiece is placed on the elevator, the elevator supports the workpiece at a desired elevation with respect to the rod connector carriage.

In other embodiments according to the fifth aspect, the elevator includes: a cradle; an elevator piston; and a plurality of elevator guide bars, wherein each elevator guide bar is rotatably connected at a first end to the cradle and at a second end to the pusher box frame; wherein the cradle is disposed to be raised and lowered by corresponding extension and retraction of the elevator piston such that the cradle is maintained substantially horizontal during said raising and lowering via cooperating rotation of the elevator guide bars.

In other embodiments according to the fifth aspect, the at least one extend piston includes four extend pistons.

In other embodiments according to the fifth aspect, the at least one retract piston includes two retract pistons.

In other embodiments according to the fifth aspect, the rod connector carriage further includes a rod rotator, the rod rotator disposed to selectively rotate the rod connector. In some embodiments, rotation of the rod rotator may be enabled by a rod rotator motor. In other embodiments, rotation of the rod rotator may be enabled by at least one rod rotator piston.

In other embodiments according to the fifth aspect, selected ones of the at least one front plate include front plate reinforcement.

In other embodiments according to the fifth aspect, selected ones of the at least one back plate include back plate reinforcement.

In other embodiments according to the fifth aspect, the pusher box further comprises at least one front horizontal stabilizer and at least one back horizontal stabilizer, the at least one front horizontal stabilizer and the at least one back horizontal stabilizer disposed so that, when the pusher box is received in an excavation, actuation of the at least one front horizontal stabilizer against the excavation and actuation of the at least one back horizontal stabilizer against the excavation stabilizes the pusher box horizontally within the excavation. The pusher box may further comprise a front horizontal stabilizer piston, in which the front horizontal stabilizer piston actuates the at least one front horizontal stabilizer against the excavation.

In other embodiments according to the fifth aspect, the pusher box further comprises at least one vertical stabilizer, the at least one vertical stabilizer disposed so that, when the pusher box is received in an excavation, actuation of the at least one vertical stabilizer against the excavation levels the pusher box within the excavation.

According to a sixth aspect, embodiments of the disclosed technology provide an expander, comprising: a chassis; a floating pad, the floating pad disposed to be displaced relative to the chassis by at least one retractable and extendable piston, such that retraction and extension of the at least one piston is configured to transition the expander between a fully-retracted state and a fully-extended state, wherein the expander has a first expansion range between the fully-retracted state and the fully-extended state; and a floating pad jacket disposed to be removably attached to the floating pad, such that the floating pad jacket increases the first expansion range of the expander to a second expansion range when the floating pad jacket is attached to the floating pad.

In other embodiments according to the sixth aspect, the expander further includes a spacer, the spacer disposed to be selectively interposed between the floating pad and the floating pad jacket, such that the spacer and floating pad jacket increase the first expansion range of the expander to a spaced expansion range when the floating pad jacket is attached to the floating pad with the spacer interposed therebetween.

In other embodiments according to the sixth aspect, the expander further includes a chassis jacket disposed to be removably attached to the chassis, such that the chassis jacket increases the first expansion range of the expander to a third expansion range when the chassis jacket is attached to the chassis.

In other embodiments according to the sixth aspect, the expander further includes a first cone positioned at a first end of the chassis.

In other embodiments according to the sixth aspect, the expander further includes a second cone positioned at a second end of the chassis.

In other embodiments according to the sixth aspect, the expander further includes a first cone jacket disposed to be removably attached to the first cone.

In other embodiments according to the sixth aspect, the expander further includes first and second cone jackets each disposed to be removably attached to the first and second cones respectively.

In other embodiments according to the sixth aspect, the first cone jacket is an assembly of multiple cone parts.

In other embodiments according to the sixth aspect, at least one piston is configured to be extended and retracted independently.

According to a seventh aspect, embodiments of the disclosed technology provide an expander, comprising: a chassis; a floating pad, the floating pad disposed to be displaced relative to the chassis by at least one retractable and extendable piston, such that retraction and extension of the at least one piston is configured to transition the expander between a fully-retracted state and a fully-extended state, wherein the expander has a first expansion range between the fully-retracted state and the fully-extended state; a floating pad jacket disposed to be removably attached to the floating pad, such that the floating pad jacket increases the first expansion range of the expander to a second expansion range when the floating pad jacket is attached to the floating pad; and a spacer, the spacer disposed to be selectively interposed between the floating pad and the floating pad jacket, such that the spacer and floating pad jacket increase the first expansion range of the expander to a spaced expansion range when the floating pad jacket is attached to the floating pad with the spacer interposed therebetween.

In other embodiments according to the seventh aspect, the expander further includes a chassis jacket disposed to be removably attached to the chassis, such that the chassis jacket increases the first expansion range of the expander to a third expansion range when the chassis jacket is attached to the chassis.

In other embodiments according to the seventh aspect, the expander further includes a first cone positioned at a first end of the chassis.

In other embodiments according to the seventh aspect, the expander further includes a second cone positioned at a second end of the chassis.

In other embodiments according to the seventh aspect, the expander further includes a first cone jacket disposed to be removably attached to the first cone.

In other embodiments according to the seventh aspect, the expander further includes a first and second cone jackets each disposed to be removably attached to the first and second cones respectively.

In other embodiments according to the seventh aspect, the first cone jacket is an assembly of multiple cone parts.

In other embodiments according to the seventh aspect, at least one piston is configured to be extended and retracted independently.

According to an eighth aspect, embodiments of the disclosed technology provide an expander, comprising: a chassis; a floating pad, the floating pad disposed to be displaced relative to the chassis by at least one retractable and extendable piston, such that retraction and extension of the at least one piston is configured to transition the expander between a fully-retracted state and a fully-extended state, wherein the expander has a first expansion range between the fully-retracted state and the fully-extended state; a first cone positioned at a first end of the chassis and a second cone positioned at a second end of the chassis; a floating pad jacket disposed to be removably attached to the floating pad, such that the floating pad jacket increases the first expansion range of the expander to a second expansion range when the floating pad jacket is attached to the floating pad; a chassis jacket disposed to be removably attached to the chassis, such that the chassis jacket increases the first expansion range of the expander to a third expansion range when the chassis jacket is attached to the chassis; and first and second cone jackets each disposed to be removably attached to the first and second cones respectively; wherein an exterior surface of the expander is substantially continuous when: (1) the floating pad jacket, the chassis jacket and the first and second cone jackets are all attached to the floating pad, chassis and first and second cones respectively, and (2) the expander is in the fully-retracted state.

In other embodiments according to the eighth aspect, at least one of the first and second cone jackets is an assembly of multiple cone parts.

In other embodiments according to the eighth aspect, at least one piston is configured to be extended and retracted independently.

It is therefore a technical advantage of the disclosed technology to enhance the patented trenchless pipe refurbishment described in the Prior Application for deployments in a confined space at one end of the host pipe, where inserting a full length liner pipe is impractical (if not impossible). In preferred embodiments, a liner pipe is inserted in sections into an expanded host pipe, bringing advantages of the Prior Application's disclosed embodiments to confined space deployments. Further, by inserting the liner pipe in sections from one end, the amount of work that must be done in a confined space is minimized. The disclosed confined space technology has particular application to refurbishment of pipes or culverts under roads in mountain passes, where there are often steep inclines on one side of the road and open waterways nearby on the other side of the road. Nearly all of the refurbishment work can be done in a confined space off-road on the incline side, minimizing work required near the waterway, and avoiding the need to close the road completely during refurbishment. It will be understood, however, that the scope of this disclosure is not limited to such applications with steep inclines on one side of a road and open waterways nearby on the other side of the road. Other applications, without limitation, may be when insufficient access to the host pipe for refurbishment is caused by the presence of private property nearby, where egress onto such private property is prohibited.

Another technical advantage of the disclosed technology is that its "open barrel" design allows for liner pipe sections to arrive at the pusher box in "cartridge" form, with rods and wireframe centering balls already pre-loaded inside, such that the rod/liner pipe section assemblies are ready for immediate insertion into the host pipe. This feature further minimizes the amount of work that must be done in a confined space.

A further technical advantage is that, when space in the deployment allows, "cartridges" of rod/ball/liner pipe sections may be made up beforehand using off-the-shelf commercial inventory lengths of liner pipe (typically in ranges from about 3 feet to 7 feet in length). In this way, the cost of the cartridges may be standardized and optimized.

Another technical advantage of the disclosed technology is that the pusher box provides multifunctional hydraulic components. This multifunctional feature allows the pusher box to stay in place and perform multiple tasks during the entire pipe refurbishment process. Keeping the pusher box in place throughout the entire operation again minimizes and optimizes the amount of work that must be done in a confined space.

Another technical advantage of the disclosed technology is that expansion forces on the host pipe are controlled and perpendicular to the host pipe wall. Issues with the host pipe folding up like an accordion during expansion and/or liner pipe insertion are obviated. Embodiments of the disclosed technology are also non-destructive to the host pipe and preserve wherever possible the integrity of the host pipe, so that the host pipe may continue to contribute to operational longevity once the pipe refurbishment job is finished.

Embodiments of the disclosed technology further expand the outside diameter of the host pipe by separating the host pipe either side of a controlled longitudinal cut, leaving the host pipe larger in diameter than before. Introducing the inner liner pipe may thus, in certain applications, preserve the operational diameter of the pipe once the refurbishment job is finished. This retention of operational diameter may be highly advantageous in applications where pipe flow or capacity is important.

Another advantage of the disclosed technology is that in presently preferred embodiments, the host pipe is completely expanded before the inner liner pipe is introduced. In the prior art, and particularly in pipe bursting techniques that are destructive to the host pipe, the inner liner pipe is generally inserted to follow right behind the bursting tool as the tool moves along the host pipe. Causing the inner liner pipe to follow right behind the bursting tool avoids premature collapse of the surrounding soil into the tunnel void created by the burst host pipe. However, coordination of deployment of the inner liner pipe right behind the pipe bursting can make the logistics of the job difficult. Further, should there be an unintended collapse of the surrounding soil before the inner liner pipe can provide support, the inner liner pipe can become stuck, putting success of the job in jeopardy.

By contrast, preferred embodiments of the disclosed technology fully expand the host pipe, and substantially retain the host pipe's structural integrity, before the inner liner pipe is introduced. In some embodiments, the expanded host pipe may also be temporarily stabilized via the introduction of capsules. The capsules are removed as the liner pipe sections are inserted. Since, in preferred embodiments, the host pipe is completely ready to receive the inner liner pipe, and is still supporting the surrounding soil, the inner liner pipe sections can be deployed quickly and efficiently. The disclosed technology is thus predictive of a much higher job success rate. Moreover, unlike refurbishment methods of the prior art (such as pipe bursting), embodiments of the disclosed technology create an annular space in which grout can be deployed, further enhancing the strength, performance and longevity of the finished refurbishment job.

The grout (or other material) injected into the annular space between the host pipe and new liner pipe provides additional advantages over conventional trenchless methods, which typically omit this step. First, it secures the new liner pipe in position so it does not move or settle. Next, the grout fills voids in the soil under the host pipe, reducing the likelihood of pipe deflections from differential settlement. The grout also fills voids in the soil above the host pipe, which reduces point loads and impacts caused if those voids collapse (which is a major source of operational deflection and collapse of culverts). The grout also distributes point loading on the host pipe/liner pipe construction, which may deter future cracking during service.

A further advantage of the disclosed technology is that in some embodiments, a "jacketed" expander may increase the expansion range of the same expander in an otherwise "unjacketed" condition. Jacket pieces of user-selected thicknesses may be removably attached to desired ones of the floating pad, chassis or cones on the expander so as to increase the expansion range of the expander in an unjacketed condition. This allows the same expander to be used in a range of nominal diameter host pipes, including host pipes whose inside diameter might be beyond the expansion reach of the unjacketed expander. Jacket options disclosed herein also include a spacer that may be selectively interposed between the floating pad and the floating pad jacket, such that the spacer and floating pad jacket increase the expansion range of the expander when the floating pad jacket is attached to the floating pad with the spacer interposed therebetween.

Looking at expander embodiments disclosed herein more generally, the general rounded shape with two rod connectors at opposing ends allows a pulling function in either direction once the expander is deployed in a host pipe. Access from either end is advantageous when retrieving the expander in the event of an unforeseen collapse in host pipe, or in the event of a tool failure.

A further advantage of expander technology generally disclosed herein is that in preferred embodiments, the rod connectors permit infinite rotation and longitudinal placement of the expander within the host pipe. Re-rounding of a host pipe is thereby facilitated. A dent (local collapse) within a host pipe can be remediated via the infinite expander rotation and longitudinal placement functionality. The solid cones at either end of the expander can further initially encourage a dent outward during the pulling motion immediately before the hydraulically-actuated floating pad is brought to bear.

The foregoing has outlined rather broadly some of the features and technical advantages of the disclosed trenchless pipe refurbishment technology, including pusher box technology and expander technology, in order that the detailed description that follows may be better understood. Additional features and advantages of the disclosed technology may be described. It should be appreciated by those skilled in the art that the conception and the specific embodiments disclosed may be readily utilized as a basis for modifying or designing other structures for carrying out the same inventive purposes of the disclosed technology, and that these equivalent constructions do not depart from the spirit and scope of the technology as described.

BRIEF DESCRIPTION OF THE DRAWINGS

For a more complete understanding of the embodiments described in this disclosure, and their advantages, reference is made to the following detailed description taken in conjunction with the accompanying drawings, in which:

FIGS. 3A through 3G illustrate in more detail a currently preferred embodiment of pusher box 1150 as shown on FIGS. 2A and 2B, in which: FIGS. 3A and 3B are general exterior views; FIG. 3C depicts pusher box 1150 in an extended state with exterior features removed; FIG. 3D depicts pusher box 1150 in a retracted state with one retract piston 1192 omitted for clarity; FIGS. 3E and 3F depict pusher box 1150 in a retracted state with extend pistons 1191 and retract piston 1192 omitted for clarity; and FIG. 3G is a view of pusher box 1150 in a partially extended state, illustrated with an exemplary liner pipe section 400;

FIGS. 6A and 6B depict one exemplary embodiment of a first expander tool 300 that may be used in embodiments of the disclosed technology; and FIGS. 6C through 6F are "freeze frame" views depicting a first exemplary embodiment of an expansion of host pipe H;

FIGS. 8A and 8B are "freeze frame" views depicting a second exemplary embodiment of an expansion of host pipe H;

FIGS. 10A through 10E are "freeze frame" views depicting a first exemplary embodiment of insertion of concatenated liner pipe sections 400 into an expanded host pipe H;

FIGS. 11A through 11E are "freeze frame" views depicting a second exemplary embodiment of insertion of concatenated liner pipe sections 400 into an expanded host pipe H;

FIG. 12 illustrates a section through liner pipe sections 400 resident inside host pipe H;

FIG. 13 illustrates grouting of annular space AS;

FIGS. 22A and 22B depict expander 1300 from FIGS. 19A and 19B equipped with a second embodiment of jacket accessories;

DETAILED DESCRIPTION

For the purposes of the following disclosure, FIGS. 1 through 24 should be viewed together. Any part, item, or feature that is identified by part number on one of FIGS. 1 through 24 has the same part number when illustrated on another of FIGS. 1 through 24.

Figure 1:
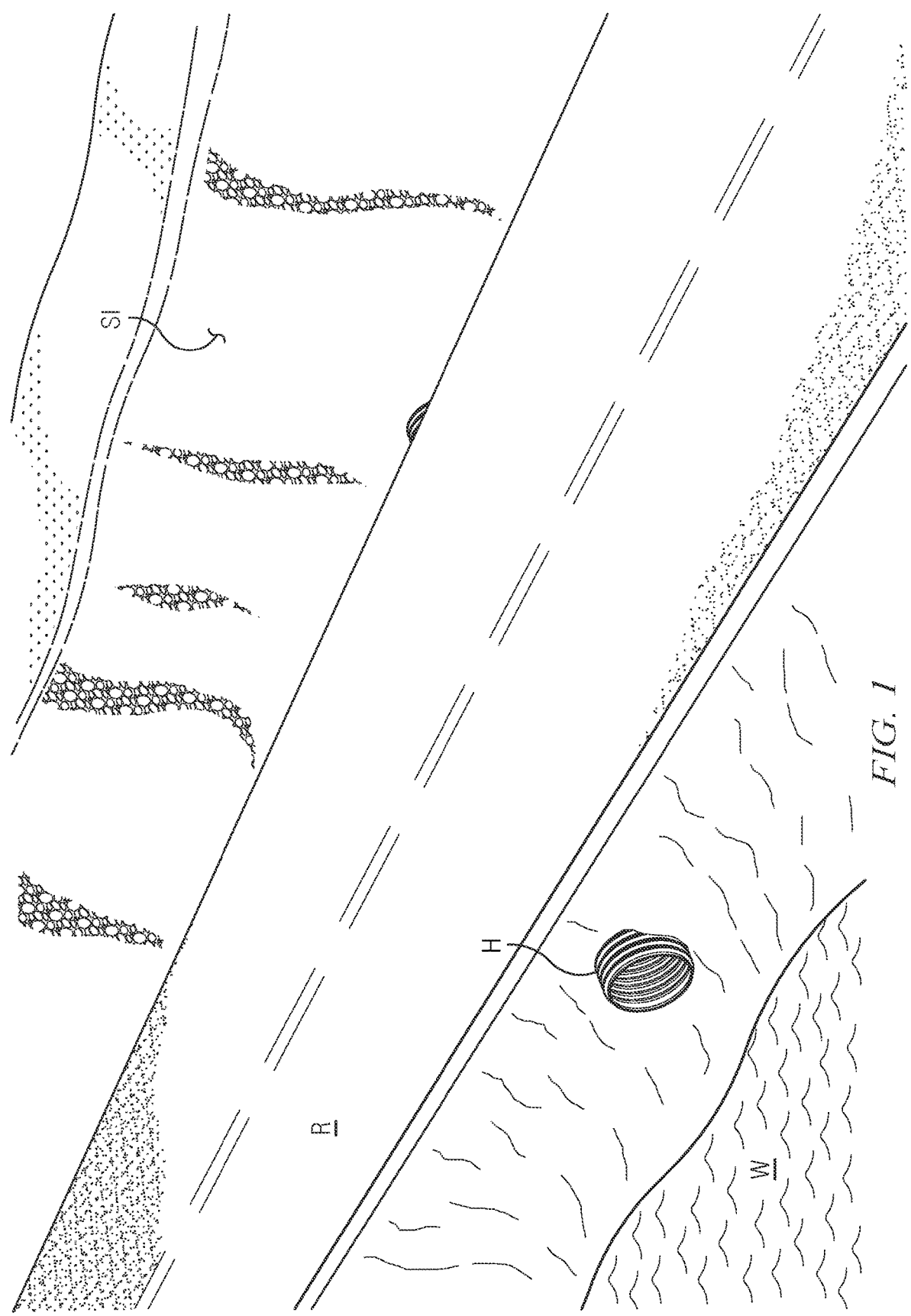
FIG. 1 is a view of an exemplary confined space environment in which deployment of the disclosed technology is applicable.

As noted above in the "Background" section, FIG. 1 illustrates an exemplary environment in which the disclosed technology is advantageous to refurbish the underground host pipe H. To recap, host pipe H on FIG. 1 is buried beneath road R with steep incline SI on one side and waterway W on the other side. In the environment illustrated on FIG. 1, access to host pipe H on the waterway W side is from above only. Access to host pipe H on the other side is very limited by steep incline SI. In some instances, host pipe H may be up to 80 feet long, making insertion of a new one-piece liner pipe into host pipe H impractical, if not impossible.

Figure 2A:
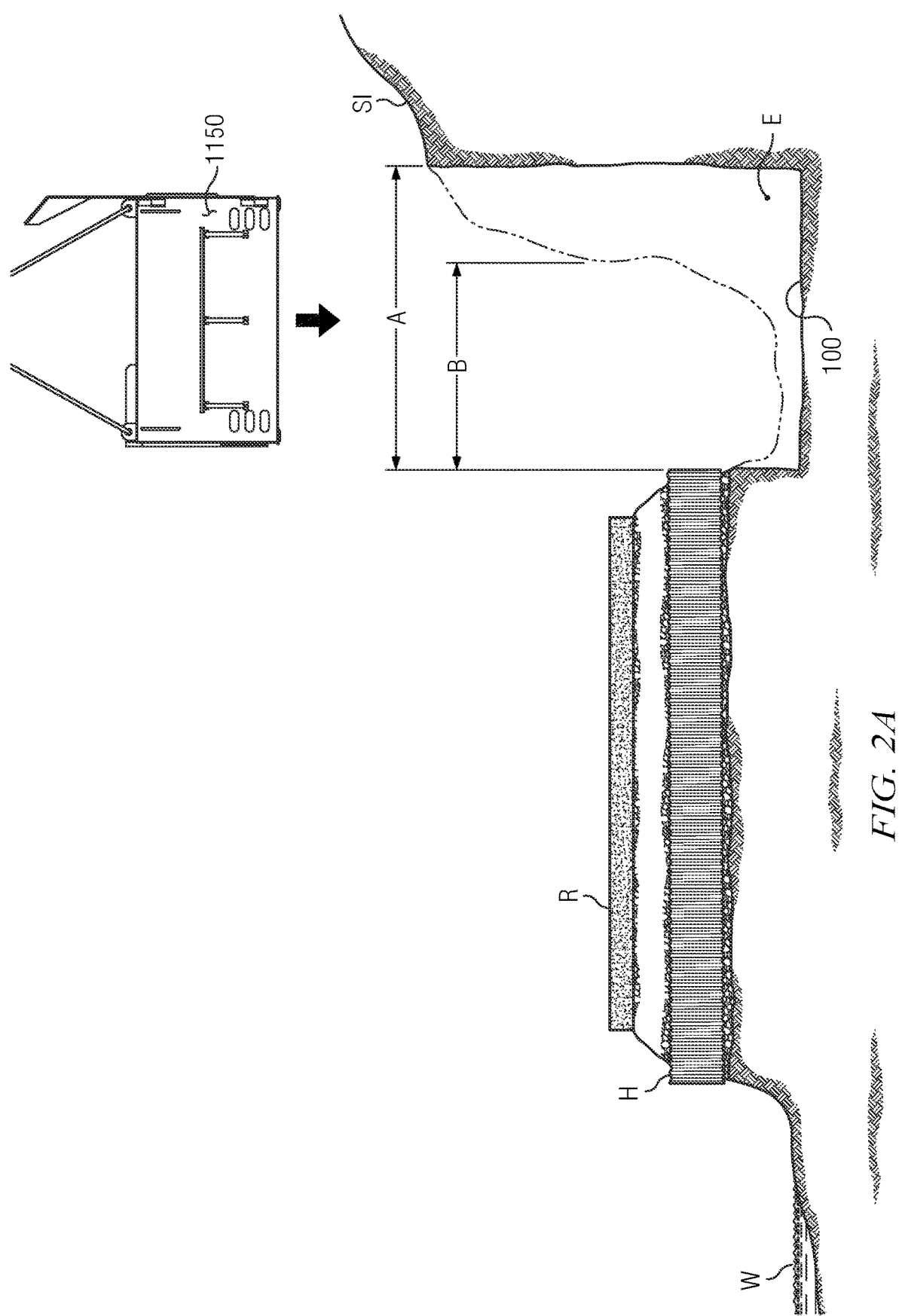
FIGS. 2A and 2B depict an excavation E including excavation pad 100 on which to deploy the pusher box 1150.
Figure 2B:
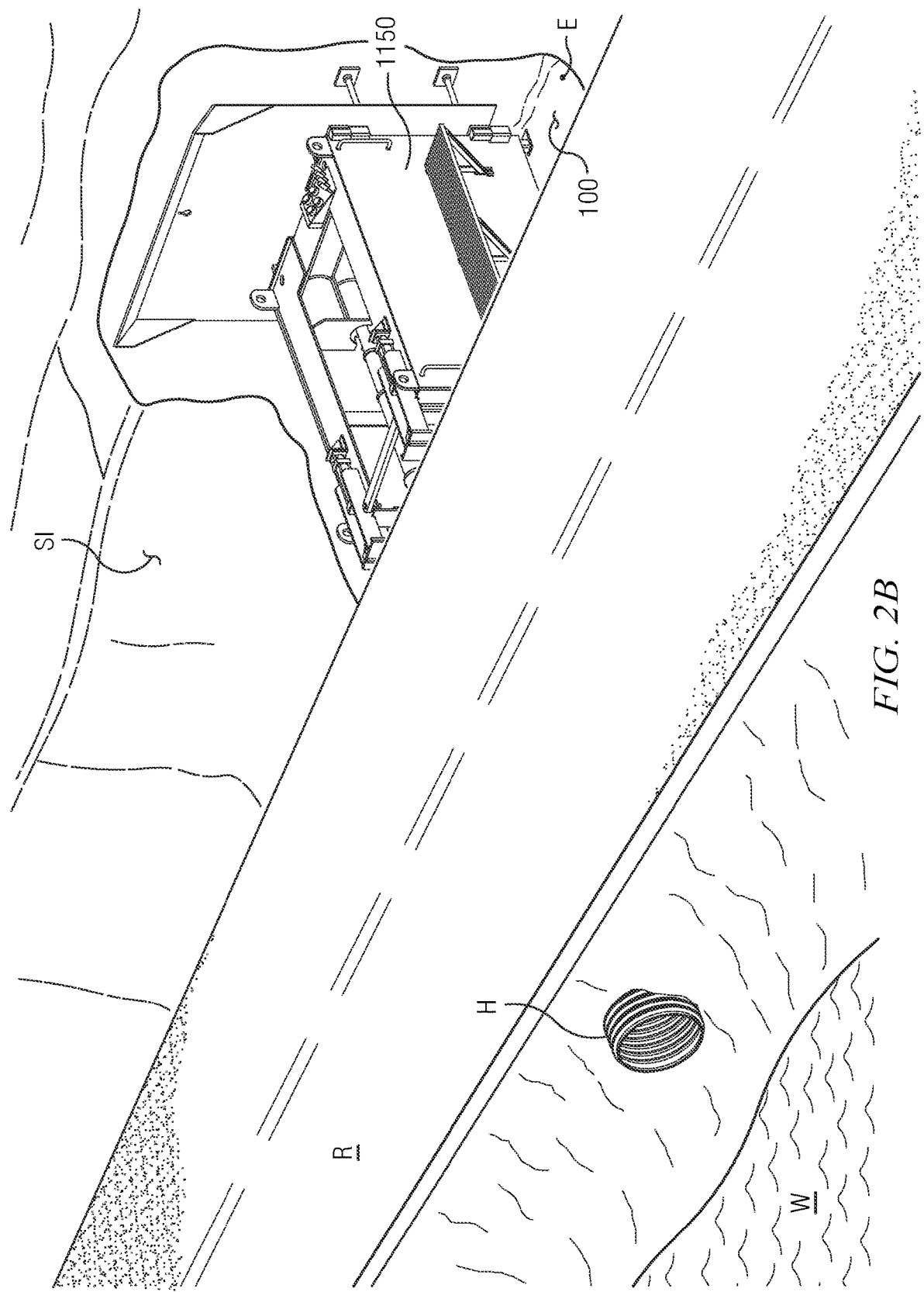

FIGS. 2A and 2B illustrate an excavation E that may be needed on the steep incline SI side of road R to facilitate some deployments of the disclosed technology. It will be appreciated from FIG. 2A that access is needed to the steep incline SI end of host pipe H, even though such access is in a confined space. It will be further appreciated from FIG. 2A that in exemplary mountain highway deployments such as illustrated on FIG. 1, existing roadside ditches on the steep incline SI side of road R may be of limited width B (for example, only 3 feet to 6 feet wide). FIG. 2A illustrates that in order to accommodate pusher box 1150 (as described in more detail below), embodiments of which may be 9 feet to 10 feet in length, steep incline SI may need to be excavated to extended width A around host pipe H (for example, 10 feet to 12 feet). Further, FIG. 2A shows that in illustrated embodiments, sufficient depth of excavation E is required to set pusher box 1150 at a correct elevation to service host pipe H. Excavation E is made to provide such clearance and depth. In some deployments (not illustrated) a retaining wall or other safety measure may be deployed to stabilize steep incline SI in the presence of excavation E. Also, as shown on FIG. 2A, the bottom of excavation E advantageously provides a leveled and compacted excavation pad 100 on which to set, level and stabilize pusher box 1150. FIG. 2B shows pusher box 1150 positioned in excavation E ready to service host pipe H.

Figure 3A:
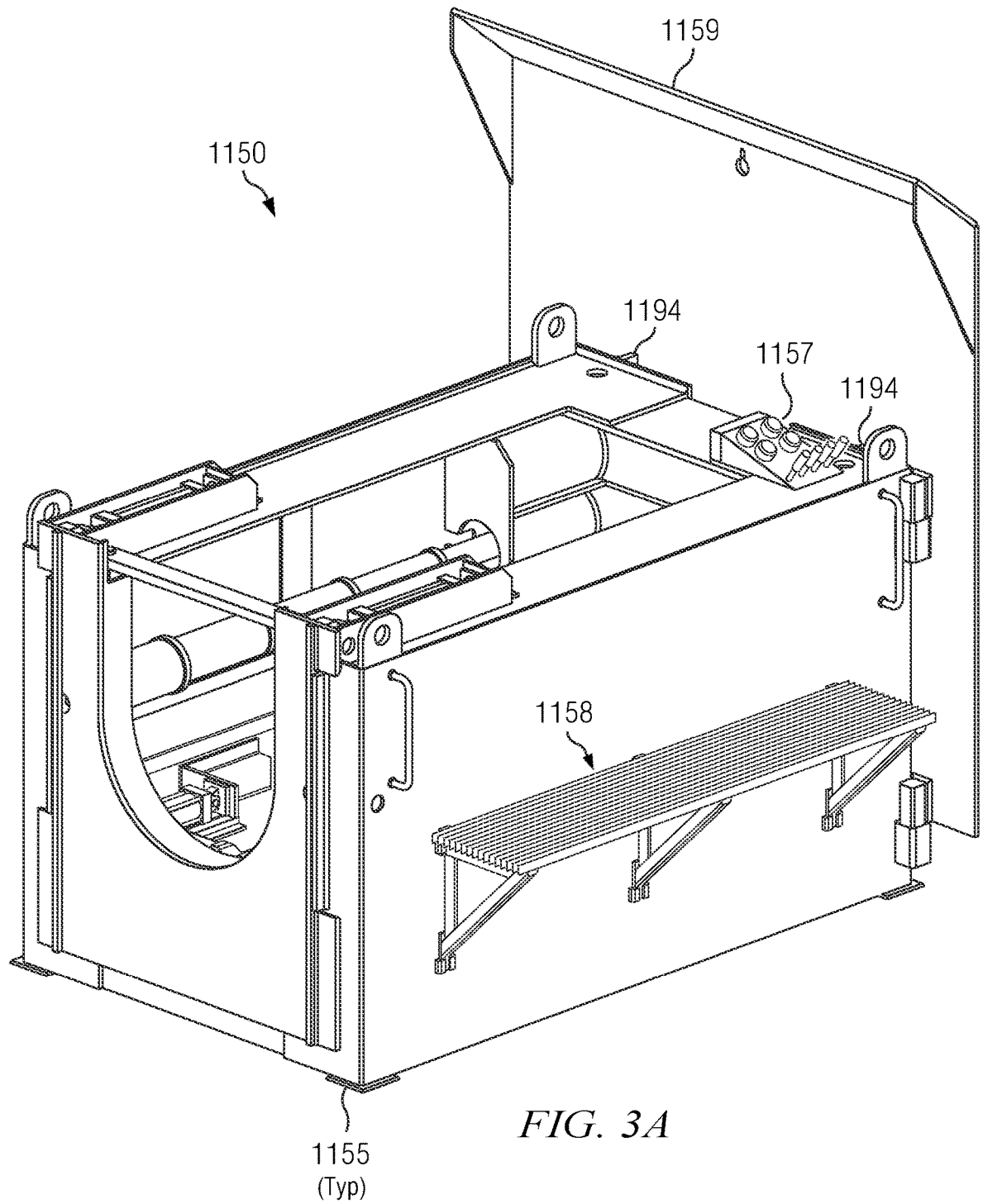
Figure 3B:
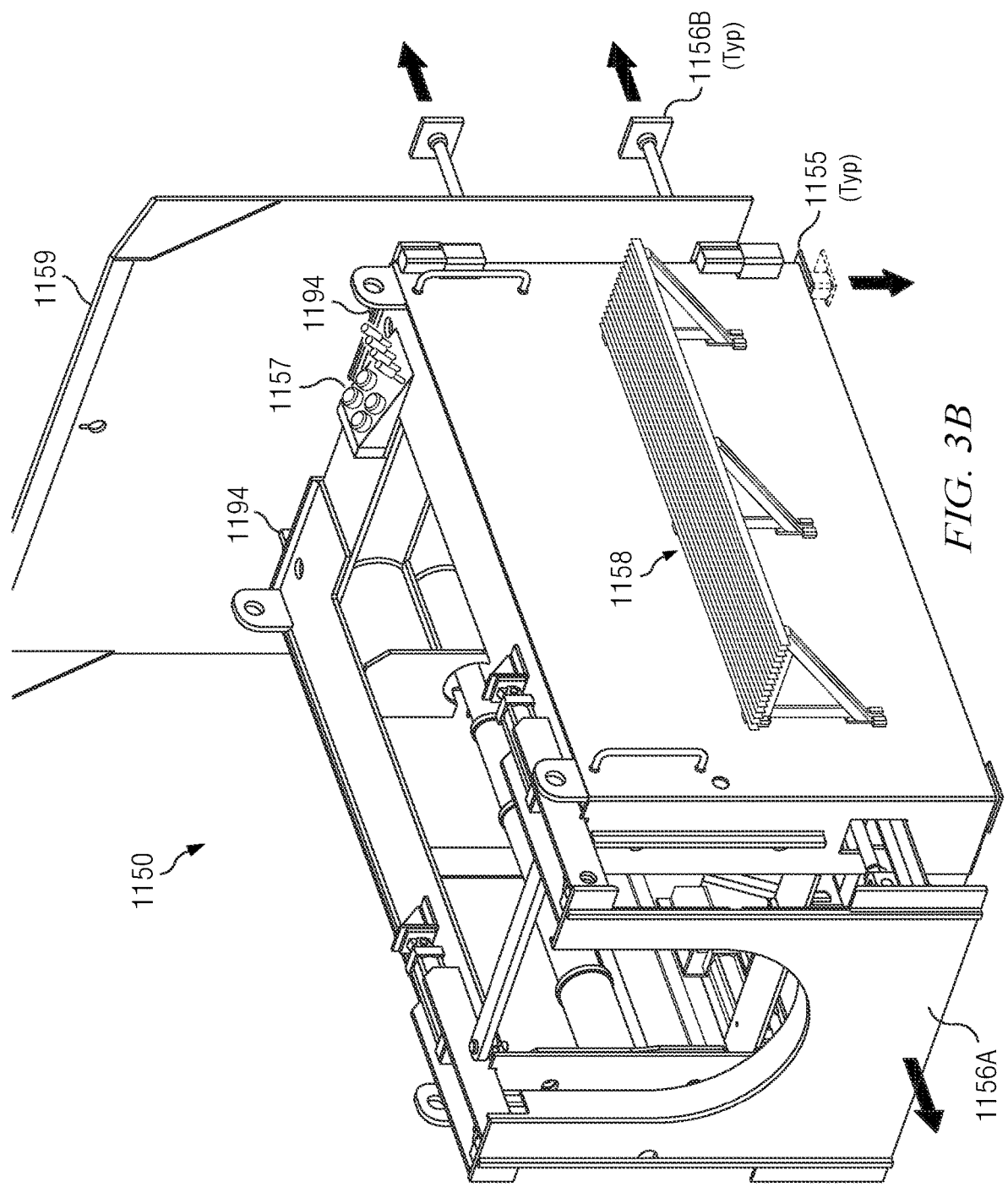
Figure 3C:
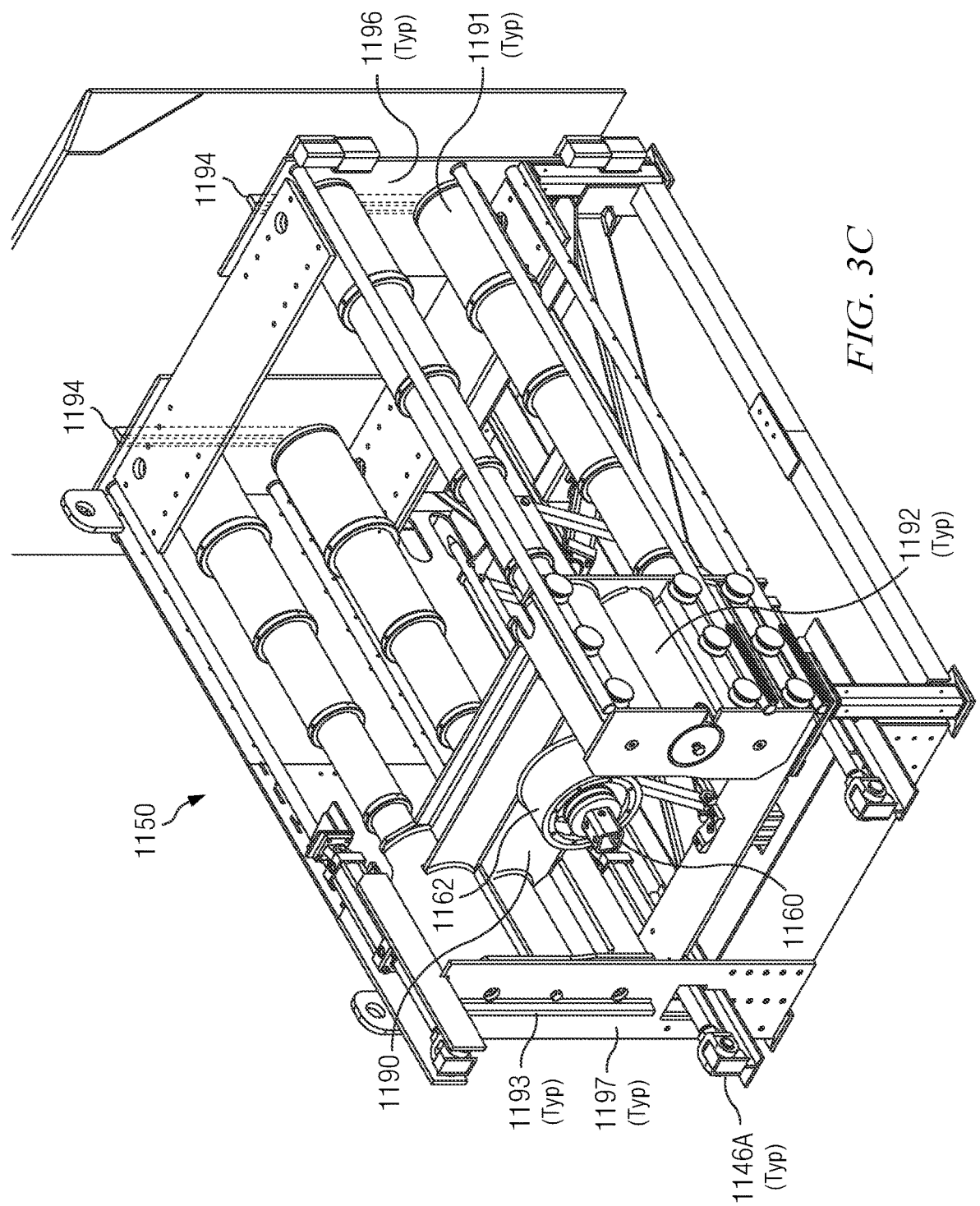
Figure 3D:
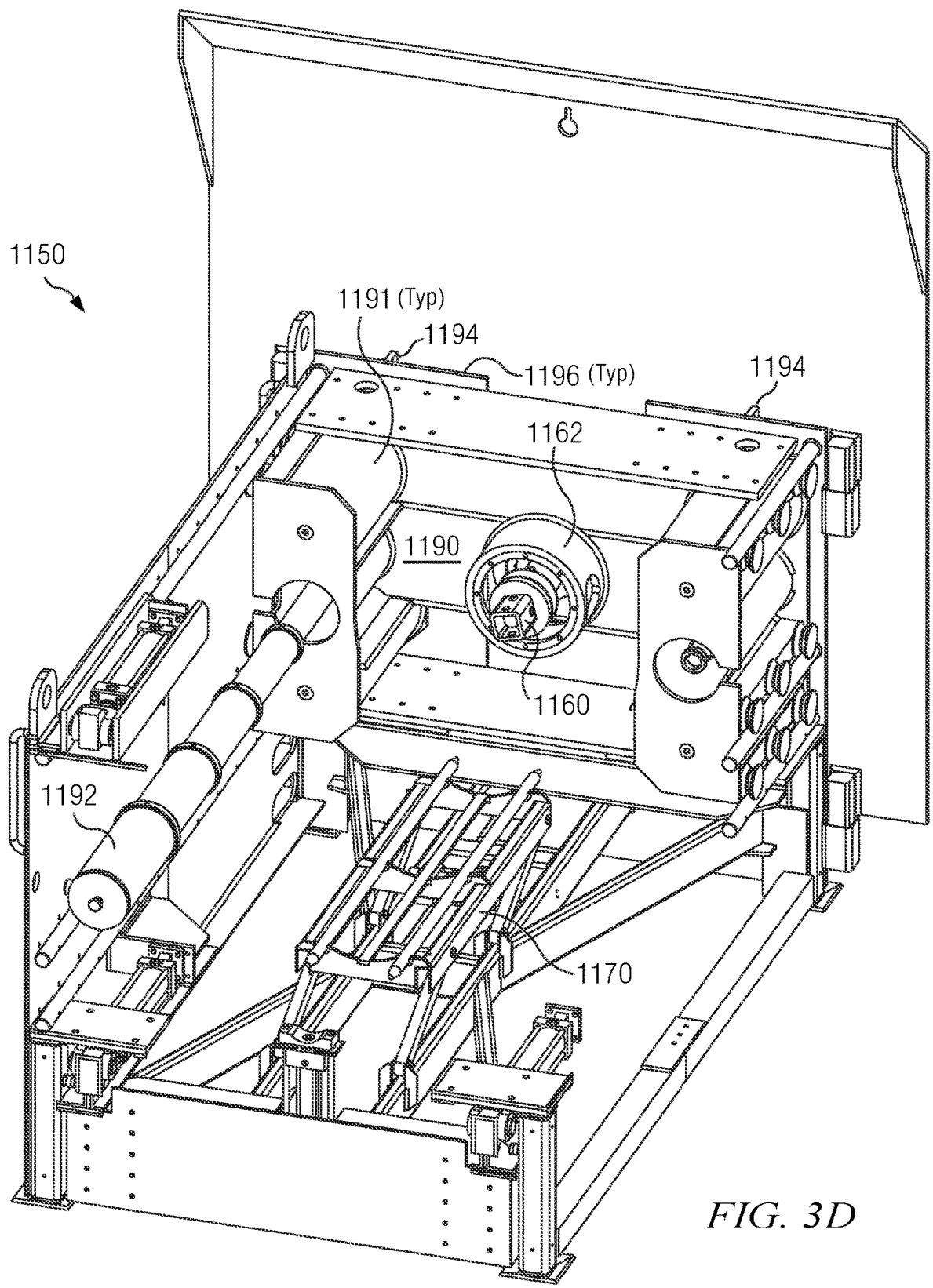
Figure 3E:
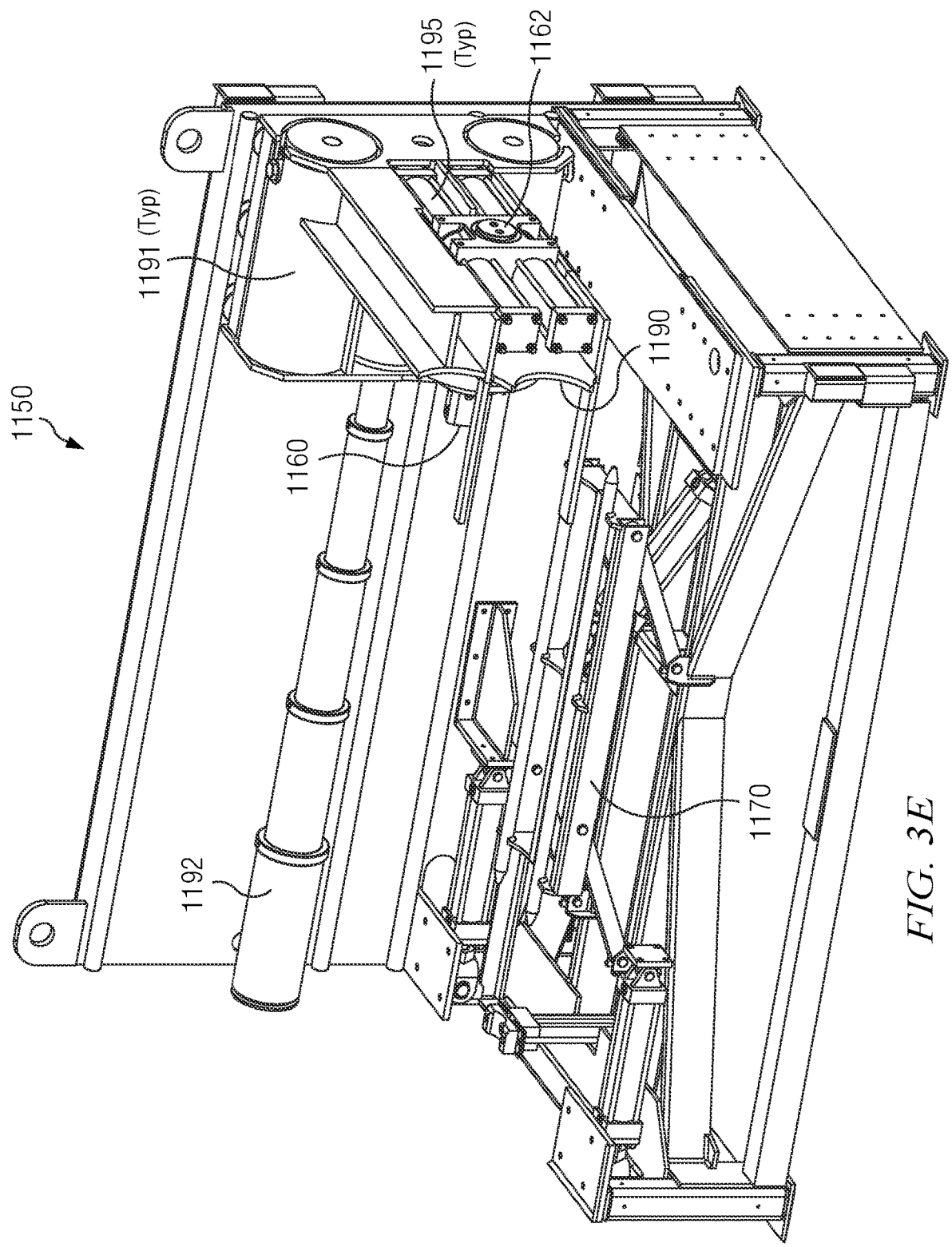
Figure 3F:
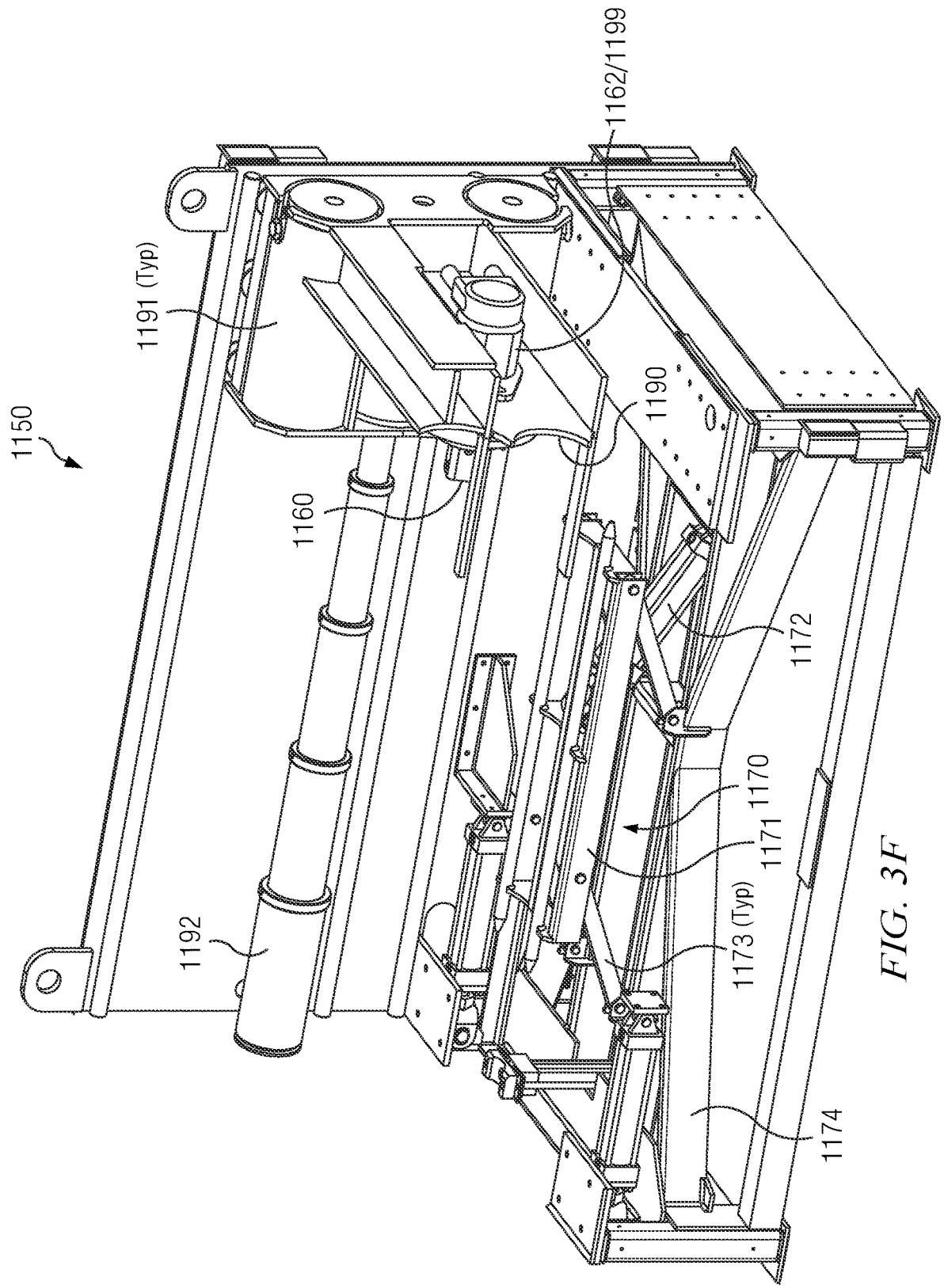
Figure 3G:
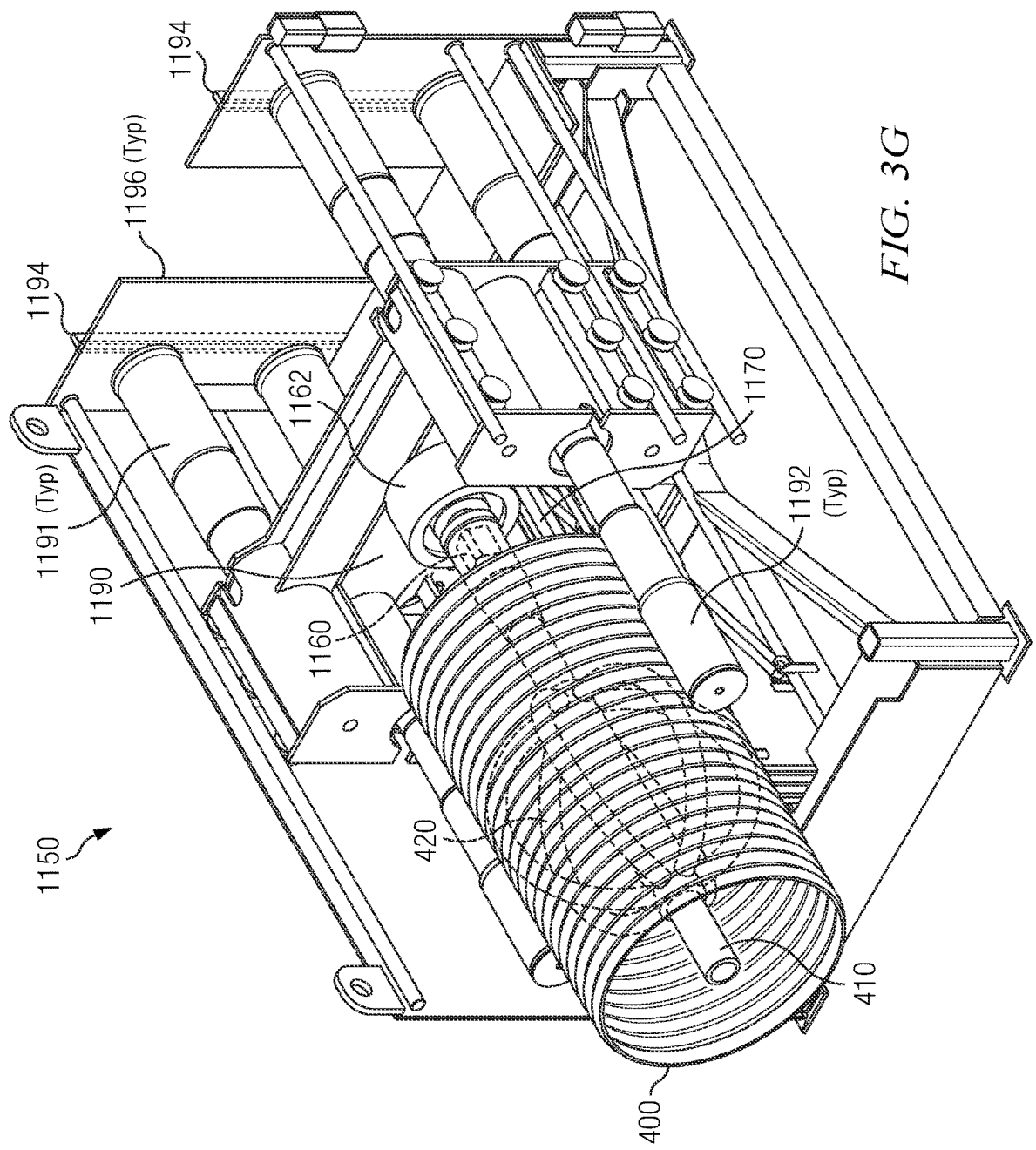

FIGS. 3A through 3G illustrate in more detail a currently preferred embodiment of pusher box 1150 as shown on FIGS. 2A and 2B. FIGS. 3A and 3B are general exterior views. FIGS. 3C through 3F are various views with some parts omitted to enable the internals of pusher box 1150 to be seen more clearly. FIG. 3C depicts pusher box 1150 in an extended state with exterior features removed. FIG. 3D depicts pusher box 1150 in a retracted state with one retract piston 1192 omitted for clarity. FIGS. 3E and 3F depict pusher box 1150 in a retracted state with extend pistons 1191 and retract piston 1192 on the foreground side omitted for clarity. FIG. 3G is a view of pusher box 1150 in a partially extended state, illustrated with an exemplary liner pipe section 400 in order to describe pusher box 1150's features with respect to handling liner pipe sections 400.

As noted, FIGS. 3A and 3B are general exterior view of a currently preferred embodiment of pusher box 1150. Preferred embodiments of pusher box 1150 weigh about 16,000 lbs, and are designed to deliver up to about 85,000 lbs of horizontal force in order to insert a liner pipe in sections into host pipe H. Given these metrics, it will be appreciated that careful positioning, leveling, alignment and stabilization of pusher box 1150 to address host pipe H will assist smooth operation of pusher box 1150. Referring also to FIGS. 2A and 2B, vertical stabilizers 1155 on FIGS. 3A and 3B extend and retract (advantageously, under hydraulic power) to level pusher box 1150 on excavation pad 100 and to set pusher box 1150 to address host pipe H at the correct elevation and azimuth/angle. Front and back horizontal stabilizers 1156A and 1156B on FIG. 3B extend to stabilize pusher box 150 against the surrounding vertical excavation walls depicted in excavation E on FIGS. 2A and 2B. Front and back horizontal stabilizers 1156A and 1156B are again advantageously hydraulically powered. In the illustrated embodiment of FIG. 3B, front horizontal stabilizer 1156A is a U-shaped plate and is positioned in excavation E on FIG. 2A such that host pipe H is located in the "U". This feature on front horizontal stabilizer 1156A assists with positioning pusher box 1150 to address host pipe H at the correct elevation and azimuth/angle.

FIGS. 3A and 3B also depict other exterior features of the illustrated embodiment of pusher box 1150. Control panel 1157 is positioned for an operator/controller to stand on step 1158 and be sheltered by protective shoring 1159 from any loose debris that may fall from above.

FIGS. 3C through 3G should be viewed together to understand features of the illustrated embodiment of pusher box 1150. Looking at FIGS. 3C, 3D, 3E and 3F together, pusher box 1150 includes pusher box frame 1174, and front plates 1197 opposing back plates 1196. Front plates 1197 and back plates 1196 are ultimately connected to pusher box frame 1174. Pusher box 1150 further provides rod connector 1160 on rod connector carriage 1190. Rod connector 1160 is disposed to connect to a rod deployed inside a pipe section workpiece (such as rod 410 deployed inside liner pipe section 400 as described further below). Pusher box 1150 further provides extend and retract pistons 1191 and 1192 for extending and retracting rod connector carriage 1190, rod rotator 1162 for rotating rod connector 1160, and elevator 1170 for supporting the workpiece at a desired elevation with respect to rod connector carriage 1190 while rod connector carriage 1190 extends or retracts, and/or while rod connector 1160 rotates.

Referring to FIGS. 3C and 3D, the illustrated embodiment of pusher box 1150 provides rod connector 1160 with a hollow non-circular profile, which allows for greater torque when rotating a rod attached thereto (as further described below). Rod connector 1160 is attached to rod connector carriage 1190 via rod rotator 1162. Rod rotator 1162 is described in greater detail below with reference to FIGS. 3E and 3F. On FIGS. 3C and 3D, however, it will be seen that rod connector carriage 1190 moves within pusher box 1150 between an extended state on FIG. 3C and a retracted state on FIG. 3D.

FIGS. 3C and 3D depict extend pistons 1191 positioned between pusher box back plates 1196 and rod connector carriage 1190. It will be seen on FIGS. 3C and 3D that when extend pistons 1191 are extended, extend pistons 1191 push rod connector carriage 1190 away from back plates 1196, causing rod connector carriage 1190 to travel away from back plates 1196. It will be further understood that retract pistons 1192 retract while extend pistons 1191 extend. Pusher box 1190 thus moves into an extended state as illustrated on FIG. 3C.

It will be further seen on FIGS. 3C and 3D that the converse occurs to move pusher box 1150 into a retracted state. FIGS. 3C and 3D depict retract pistons 1192 positioned between pusher box front plates 1197 and rod connector carriage 1190. When retract pistons 1192 are extended, retract pistons 1192 push rod connector carriage 1190 away from front plates 1197, causing rod connector carriage 1190 to travel away from front plates 1197. It will be further understood that extend pistons 1191 retract while retract pistons 1192 extend. Pusher box 1190 thus moves into a retracted state as illustrated on FIG. 3D.

It will be appreciated that as deployed, embodiments of pusher box 1150 will be more likely to face demand for a heavier "extend" load and a lighter "retract" load. For this reason, the illustrated embodiment of pusher box 1150 provides four (4) extend pistons 1191 and two (2) retract pistons 1192, although the scope of this disclosure is not limited in either of these regards.

In some embodiments (not illustrated), pusher box 1150 may include percussive measures deployed to encourage extension of extend pistons 1191 and/or retraction of retract pistons 1192 in displacing rod connector carriage 1190. Alternatively, the percussive measures may be deployed to encourage displacement of rod connector carriage 1190 directly. Such percussive measures may include (without limitation) one or more impact hammers, jars or vibrators, preferably driven hydraulically or pneumatically. The percussive measures, whether embodied as impact hammers, jars, vibrators or otherwise, are preferably positioned to jolt rod connector carriage 1190 into displacement against frictional drag of rods 410/liner pipe sections 400 against the host pipe H interior as rods 410/liner pipe sections 400 are inserted into the host pipe H.

The embodiment of pusher box 1150 illustrated on FIG. 3C also shows front plate reinforcement 1193 provided on front plates 1197. Similarly, as also shown on at least FIGS. 3C and 3G, back plate reinforcement 1194 is provided on back plates 1196. Such front and back plate reinforcement 1193, 1194 gives front and back plates 1197 and 1196 additional rigidity in order to deter front and back plates 1197 and 1196 from bending in response to extension of retract and extend pistons 1192 and 1191 under operational loads.

With reference to FIG. 3C and then FIG. 3B, it will be noted that front horizontal stabilizer plate 1156A on FIG. 3B has been omitted from FIG. 3C to enable the internals of the illustrated embodiment of pusher box 1150 to be viewed. FIG. 3C depicts front horizontal stabilizer pistons 1146A, which will be understood to actuate horizontal motion of front horizontal stabilizer plate 1156A depicted on FIG. 3B.

FIGS. 3D, 3E and 3F further show elevator 1170 deployed under the travel of rod connector carriage 1190. As noted above, elevator 1170 is configured to support a workpiece (such as liner pipe section 400 as described further below) at a desired elevation with respect to rod connector carriage 1190 while rod connector carriage 1190 extends or retracts, and/or while rod connector 1160 rotates. In the illustrated embodiment of pusher box 1150 on FIGS. 3D, 3E and 3F, elevator 1170 is preferably a cradle arrangement that may be hydraulically raised and lowered from underneath. As shown in detail on FIG. 3F, currently preferred embodiments of elevator 1170 include cradle 1171 disposed to be raised and lowered by corresponding extension and retraction of elevator piston 1172. Elevator 1170 further includes a plurality of elevator guide bars 1173, wherein each elevator guide bar 1173 is preferably rotatably pinned at a first end to cradle 1171 and at a second end to pusher box frame 1174. When cradle 1170 raised and lowered by corresponding extension and retraction of elevator piston 1172, cradle 1171 is maintained substantially horizontal during said raising and lowering via cooperating rotation of elevator guide bars 1174.

As noted above, FIGS. 3C and 3D show rod connector 1160 is attached to rod connector carriage 1190 via rod rotator 1162. FIGS. 3E and 3F illustrate two alternative embodiments of rod rotator 1162. On the embodiment of FIG. 3E, opposing rod rotator pistons 1195 cooperatively extend and retract above/below rod connector 1160. In this way, opposing 180-degree directions of rotation combine to provide 360-degree absolute positioning for rod connector 1160. On the embodiment of FIG. 3F, rod rotator motor 1199 rotates rod connector 1160. Rod rotator motor 1199 may be any suitable motor, such as hydraulic or electric, and the scope of this disclosure is not limited in this regard.

FIG. 3G is a view of the illustrated embodiment of pusher box 1150 in a partially extended state. In FIG. 3G, pusher box 1150 is illustrated with an exemplary liner pipe section 400. FIG. 3G depicts liner pipe section 400 supported from underneath on elevator 1170. In exemplary deployments according to this disclosure, rod 410 and wireframe centering balls 420 would be provided inside liner pipe section 400 (see FIGS. 4A and 4B and associated disclosure below), but are omitted for clarity on FIG. 3G. Rod 410 would be connected to rod connector 1160 in such exemplary deployments. It will thus be appreciated that travel of rod connector carriage 1190 between an extended and a retracted state as shown on FIG. 3G will cause corresponding extension or retraction of liner pipe section 400 (or corresponding extension/retraction of any other workpiece to which rod connector 1160 may be attached via rods 410). Likewise, rotation of rod rotator 1162 will cause corresponding rotation of liner pipe section 400 (or corresponding rotation of any other workpiece to which rod connector 1160 may be attached via rods 410).

Figure 4A:
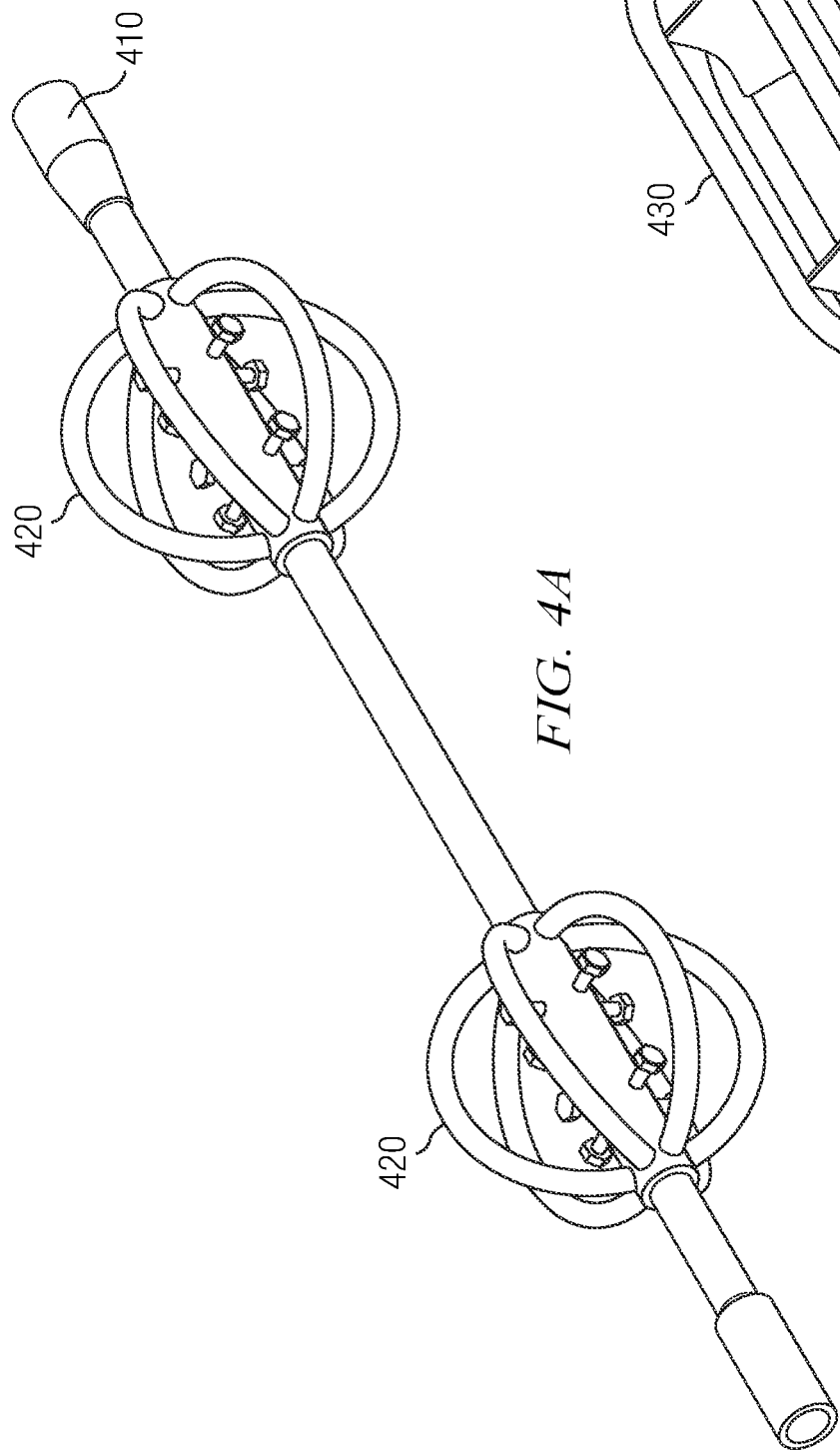
FIGS. 4A and 4B illustrate embodiments of rod 410 in combination with wireframe centering balls 420.
Figure 4C:
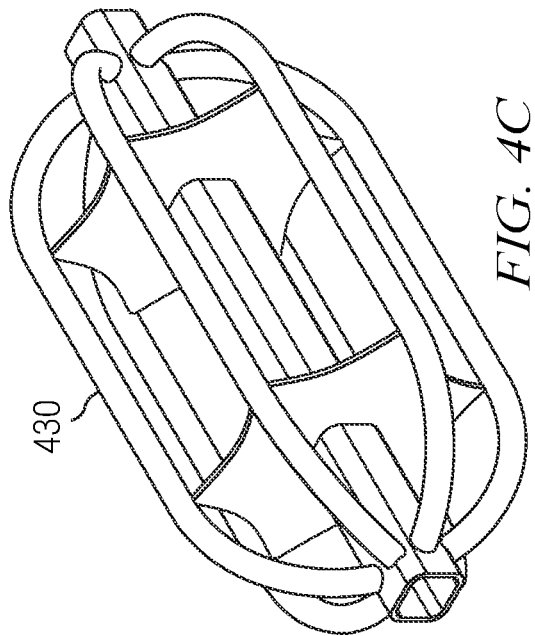
FIG. 4C illustrates capsule 430.
Figure 4B:
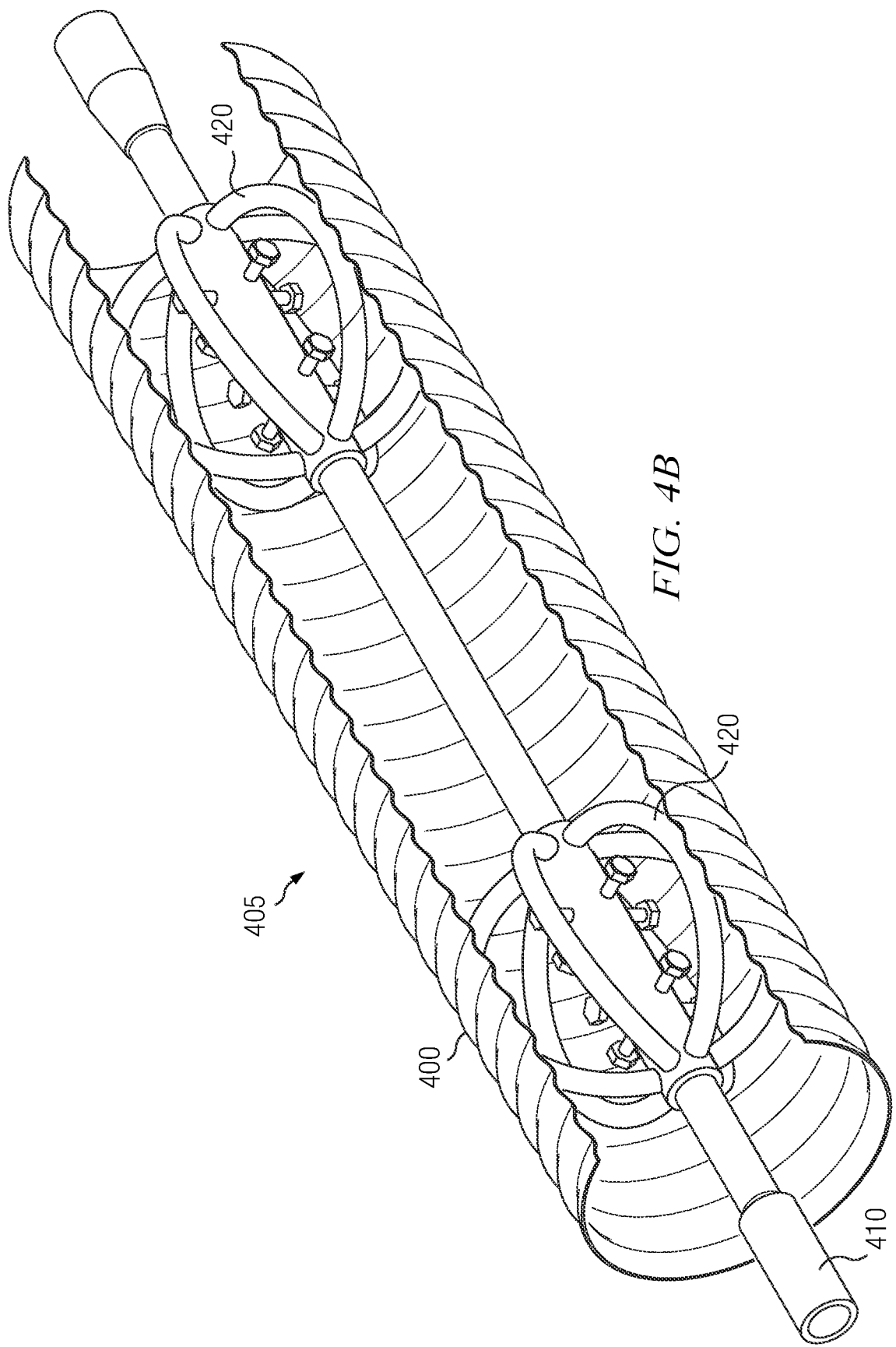

FIGS. 4A and 4B illustrate rod 410 in combination with wireframe centering balls 420. As also described elsewhere in this disclosure, rods 410 may be concatenated into a string thereof as rods 410 are inserted, preferably one at a time, into host pipe H by pusher box 1150. Conversely, rods 410 may be disconnected from a string thereof as rods are retracted, preferably one at a time, out of host pipe H by pusher box 1150. Rods 410 may be joined together end-to-end via any suitable hardware, such as bolts, pins or threaded connections, and this disclosure is not limited in this regard. Likewise, rods 410 may be joined to rod connector 1160 on pusher box 1150 by any suitable hardware.

Wireframe centering balls 420 provide stability to concatenated strings of rods 410, especially when such strings of rods 410 are under compressive load while being "pushed" by pusher box 1150. It will be understood that there may be some applications where wireframe centering balls 420 are not needed. However, preferred embodiments of the disclosed technology deploy rods 410 in conjunction with wireframe centering balls 420. In embodiments of the disclosed technology described below in which strings of rods 410 may be deployed to insert or retract tools into host pipe H (such as to make cuts in host pipe H or expand host pipe H), wireframe centering balls 420 stabilize such strings of rods 410 directly against host pipe H. In embodiments described below in in which strings of rods 410 are deployed to insert liner pipe sections 400 into host pipe H, preferred embodiments of the disclosed technology provide cartridges 405 of rods 410 and wireframe centering balls 420 within liner pipe sections 400 as illustrated on FIG. 4B. Cartridges 405 are preferably made up offsite or away from the confined space in which the disclosed technology is deployed. However, the scope of this disclosure of the present application is not limited in this regard. Preferably, in each cartridge 405, the liner pipe section 400 is approximately the same length as one of the rods 410. Cartridge 405 may be assembled as follows: rod 410 is inserted into liner pipe section 400, and is centered and frictionally stabilized within liner pipe section 400 with wireframe centering balls 420 that are attached to rod 410 along rod 410's length. Wireframe centering balls 420 are sized and shaped to frictionally engage the internal surface of liner pipe section 400 so that liner pipe section 400 may be inserted into host pipe H by rod 410. In preferred embodiments, rods 410 are stabilized in each liner section 400 by two (2) wireframe centering balls 420, although the scope of this disclosure is not limited in this regard.

FIG. 4C illustrates capsule 430. In some embodiments described below, concatenated strings of capsules 430 may be temporarily inserted into host pipe H in order to stabilize host pipe H. Capsules 430 will be described below in more detail with reference to such embodiments in which they may be deployed.

It will be understood that the scope of this disclosure is not limited to the wireframe construction of wireframe centering balls 420 and capsules 430 illustrated on FIGS. 4A and 4B. While wireframe construction is presently preferred, any suitable construction (including solid construction and/or from materials other than metal) is considered within the scope of this disclosure. However, embodiments of wireframe centering balls 420 and capsules 430 having wireframe construction provide an additional advantage of allowing water (or other fluid) flow therethrough. This aspect can be advantageous in deployments where groundwater, rainfall, snow melt or other fluid flow through host pipe H or liner pipe sections 400 must be accounted for, and in which a buildup of such fluid behind solid embodiments of wireframe centering balls 420 or capsules 430 would be disadvantageous.

Embodiments of methods for refurbishing an existing host pipe will now be described. Generally stated, a first phase in presently preferred embodiments is to make a longitudinal cut in the host pipe. A second phase is an expansion phase, wherein the host pipe is expanded, preferably nondestructively, via separation of the longitudinal cut. A third phase is to insert liner pipe sections into the expanded host pipe. In the disclosed technology for deployments in confined spaces, sections of liner pipe are concatenated end-to-end as they are inserted into the host pipe. In some embodiments, the expansion phase and the liner pipe section insertion phase may be combined. Once the liner pipe section insertion phase is complete, the host pipe and the liner pipe (in concatenated sections) typically form an annular space between them. A fourth phase of the presently preferred embodiments is to grout the annular space.

Figure 5A:
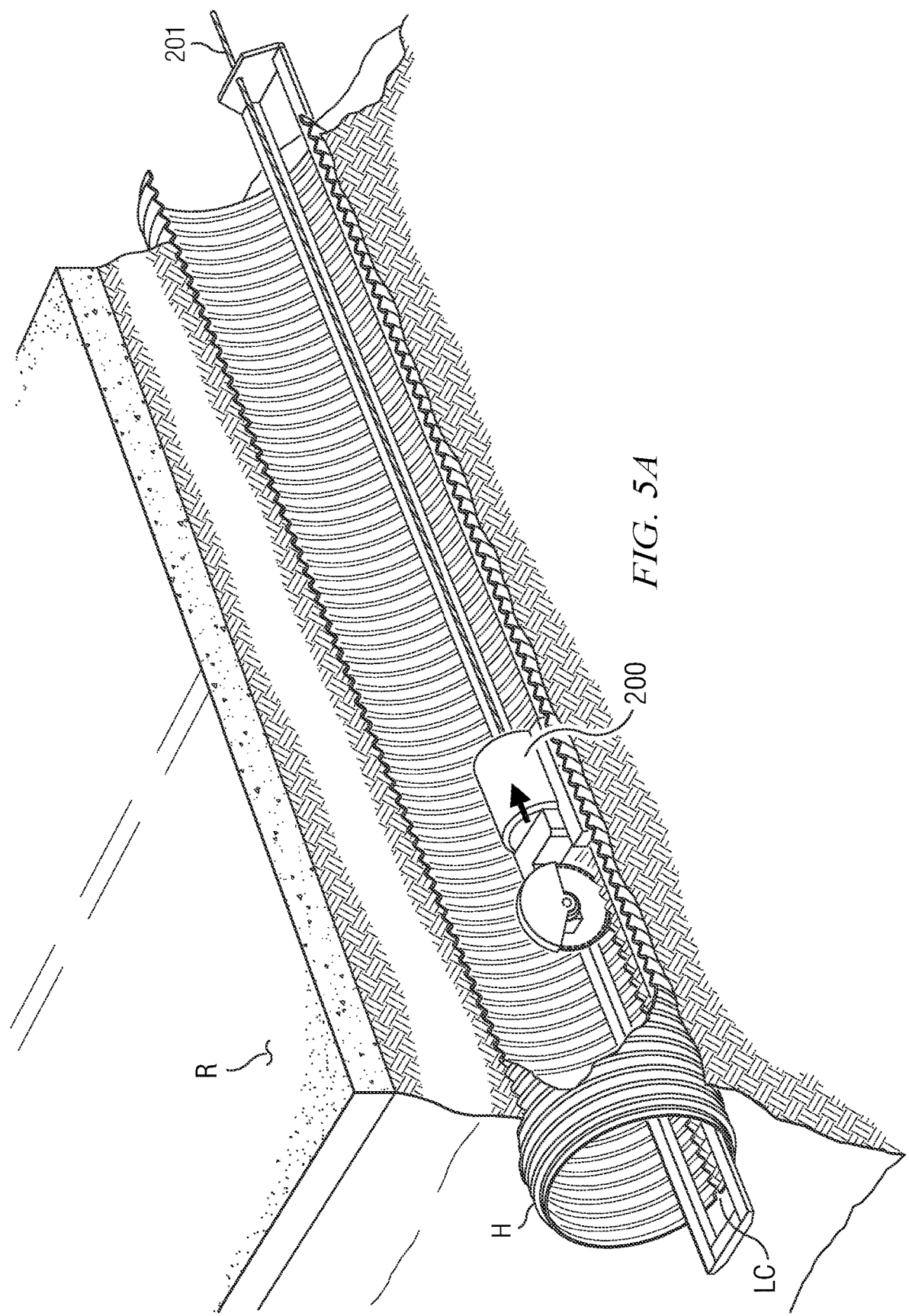
FIGS. 5A and 5B illustrate two alternative embodiments of making a longitudinal cut LC in host pipe H.
Figure 5B:
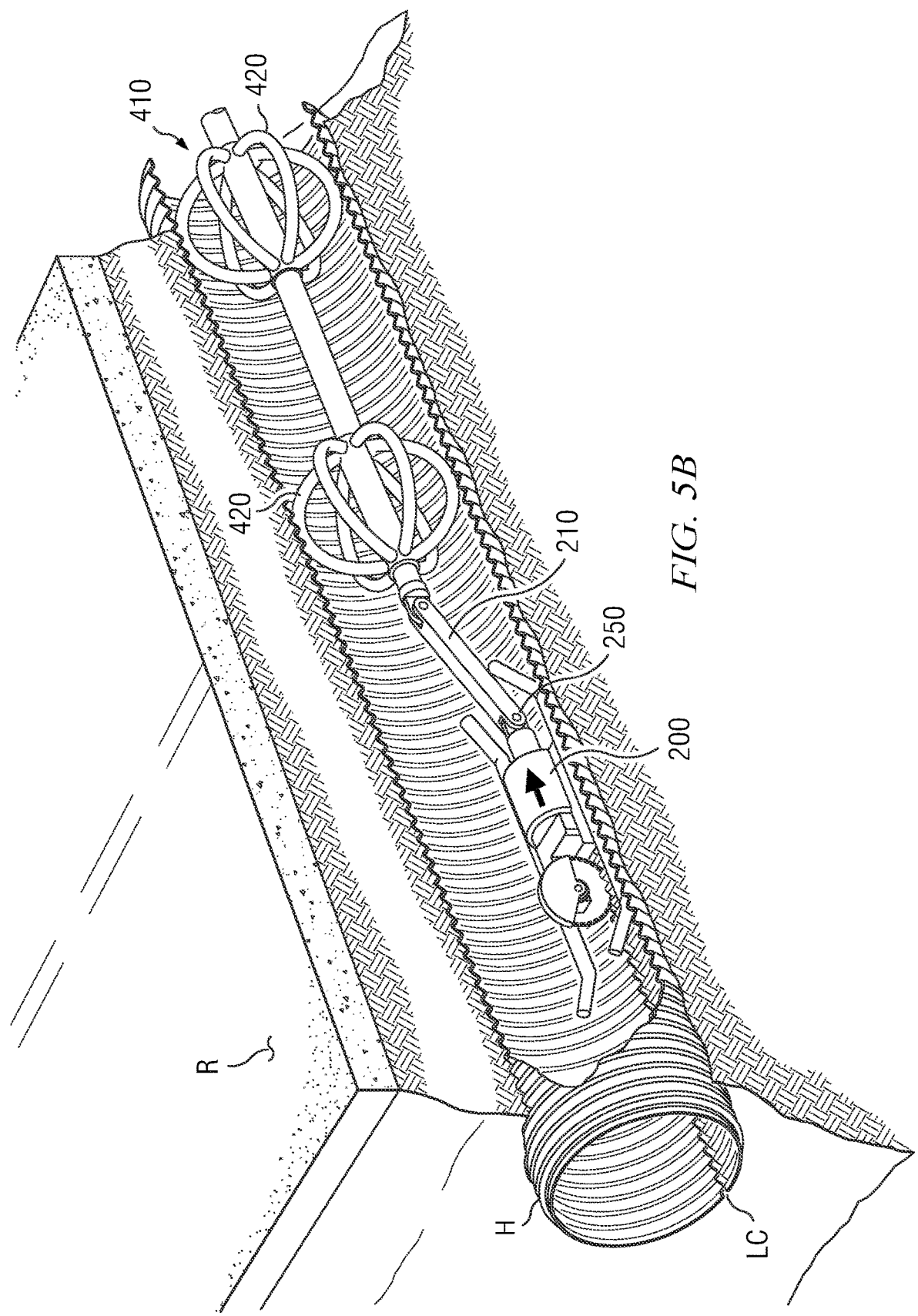

FIGS. 5 and 5B illustrate two alternative embodiments of making a longitudinal cut LC in host pipe H. FIG. 5A illustrates a longitudinal cut LC being made in host pipe H by cutting machine 200. In the embodiment depicted on FIG. 5A, cutting machine 200 is a self-propelled cutting tool running on a track as described in the Prior Application (incorporated herein by reference). Cable 201 on FIG. 5A may be used to supply cutting machine 200 with power if cutting machine 200 is self-propelled. In other embodiments, cable 201 may also be used to pull cutting machine 200 along if cutting machine 200 is not self-propelled, or if cutting machine 200 is only partially self-propelled. In other embodiments (not illustrated), cutting machine 200 may alternatively be mounted on a skid, or alternatively "skis", including horizontal sliders such as, for example, small diameter pipe or bar stock. In such embodiments, cutting machine 200 will travel along host pipe H by sliding along the bottom of the interior of host pipe H.

FIG. 5B illustrates an alternative embodiment in which cutting machine 200 is connected to concatenated rods 410 inserted and retracted by pusher box 1150. On FIG. 5B, cutting machine 200 provides cutting machine rod connector 250, to which transitional rod 210 is attached. Transitional rod 210 is connected to a concatenated string of rods 410. Rods 410 preferably have wireframe centering balls 420 attached per the disclosure above associated with FIG. 4A. It will be understood that the embodiments depicted on FIGS. 5A and 5B and in the Prior Application are exemplary, and that the scope of this disclosure is not limited as to specific cutting tools or methods with which longitudinal cut LC is made in host pipe H. For example, alternative embodiments may make longitudinal cut LC starting at the near end of host pipe H to pusher box 1150 and traveling to the far end, such as are disclosed in U.S. Provisional Patent Application Ser. No. 62/471,389, incorporated herein by reference.

In other embodiments (not illustrated), cutting tool 200 such as illustrated on FIGS. 5A and 5B may further comprise atop stabilizer. The top stabilizer is preferably affixed to the top of cutting tool 200 and is extendable and retractable vertically via pistons attached to cutting tool 200. The pistons may be hydraulic, and are preferably configured to be extended or retracted remotely (i.e. from outside host pipe H). In this way, the top stabilizer may be caused to controllably push against the top (zenith) of the interior of host pipe H as cutting tool 200 travels along host pipe H making longitudinal cut LC. This controlled push by the top stabilizer against the top of host pipe H enables an operator to keep cutting tool 200 tight and stable against the bottom of the interior of host pipe H while making longitudinal cut LC.

In other embodiments (not illustrated), cutting tool 200 such as illustrated on FIGS. 5A and 5B may include video cameras whose video feed may assist operators with cutting.

Turning now to an expansion phase, FIGS. 6A and 6B depict one exemplary embodiment of a first expander tool (or "expander") 300 that may be used in embodiments of the disclosed technology. [Note that aspects and embodiments of a second expander tool 1300 are described below with reference to FIGS. 19A through 24]. FIG. 6A illustrates expander 300 in a retracted state, with floating pad 301 in a "closed" position. Conversely, FIG. 6B illustrates expander 300 in an extended state, with floating pad 301 shown in section in an "open" position. FIG. 6B depicts expander 300 providing an expander rod connector 302 on each end. FIG. 6B further depicts the internals of expander 300, in which longitudinally disposed expander pistons 303A/B actuate rams 304A/B longitudinally away from each other. Rams 304A/B in turn displace first wedges 305A/B longitudinally against second wedges 306A/B to create axial displacement of thrust pads 307A/B. Thrust pads 307A/B are connected to floating pad 301. It will thus be understood that floating pad 301 may be extended or retracted on expander 300 by hydraulically extending or retracting expand pistons 303A/B.

It will be understood that the scope of this disclosure is not limited to expander 300 as illustrated in FIGS. 6A and 6B. The embodiment of expander 300 on FIGS. 6A and 6B is comparatively light and has a comparatively small footprint, making it useful for deployments in small diameter host pipes. It is also highly reliable, having few moving parts. Other embodiments of an expander suitable for use in the disclosed technology are described in the Prior Application (incorporated herein by reference). It will be understood that the embodiments depicted on FIGS. 6A and 6B and in the Prior Application are exemplary, and that the scope of this disclosure is not limited as to specific expanders for expanding the host pipe.

FIGS. 6C through 6F are "freeze frame" views depicting a first exemplary embodiment of an expansion of host pipe H. On FIG. 6C, expansion begins with pusher box 1150 inserting expander 300 all the way to the far end of host pipe H via concatenation of inserted rods 410. It will be appreciated that in the embodiment illustrated on FIG. 6C though 6F, expansion of host pipe H is accomplished starting at the far end of host pipe H from pusher box 1150, and then pulling expander 300 through sequential expansion stations towards pusher box 1150. However, the scope of this disclosure is not limited in this regard, and in other embodiments, expansion may start at the near end of host pipe to pusher box 1150, such as is disclosed in U.S. Provisional Patent Application Ser. No. 62/471,389, incorporated herein by reference.

Referring again to FIG. 6C, expander 300 provides expander rod connector 302, to which transitional rod 310 is attached. Transitional rod 310 is connected to a concatenated string of rods 410. Rods 410 preferably have wireframe centering balls 420 attached per the disclosure above associated with FIG. 4A.

Referring now to FIG. 6D, floating pad 301 on expander 300 is extended to expand host pipe H at a first expansion station at the far end of host pipe H from pusher box 1150. As will be described below in more detail with reference to FIGS. 7A through 7F, expansion of host pipe H preferably comprises extension and retraction of floating pad 301 at selected rotational positions about expander 300's longitudinal axis. Rotation of expander 300 is accomplished using torque on rods 410 connected to expander 300, where such torque is delivered onto rods 410 by rod rotator 1162 on pusher box 1150 (refer to disclosure above associated with FIGS. 3E and 3F, for example). FIG. 6D further shows that in some embodiments, the connection between transitional rod 310 and rods 410 may need to pivot to accommodate extension of floating pad 301 on expander 300.

Figure 6E:
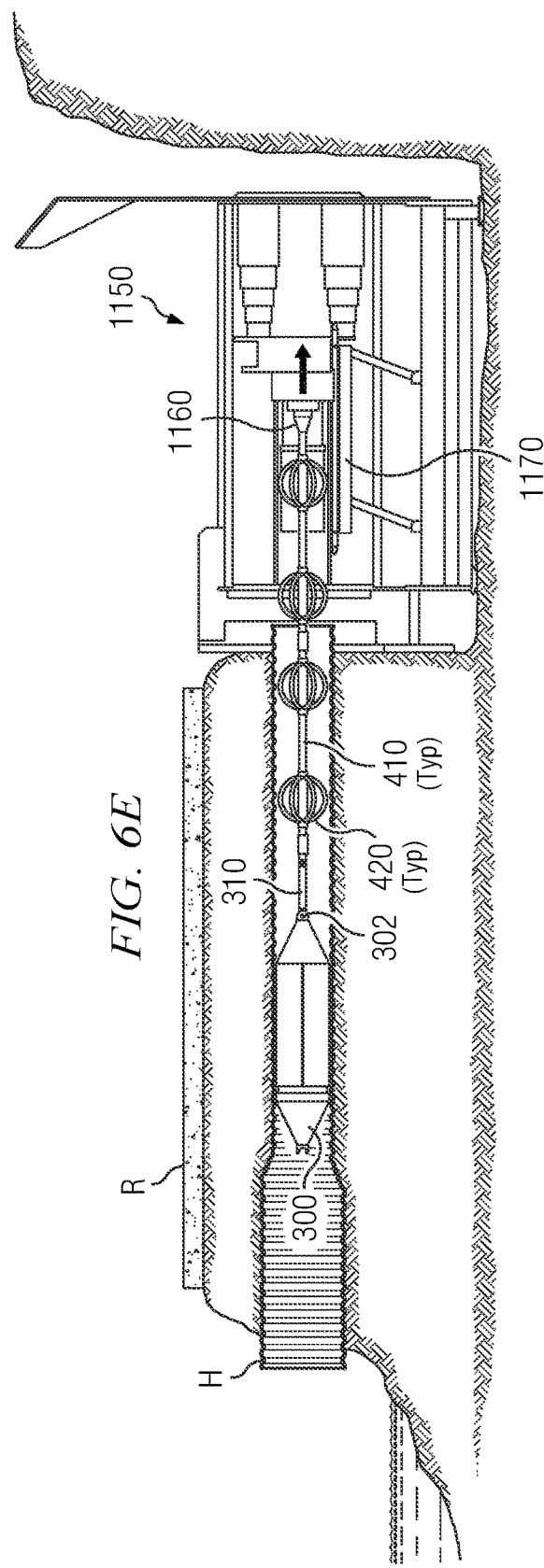
Figure 6F:
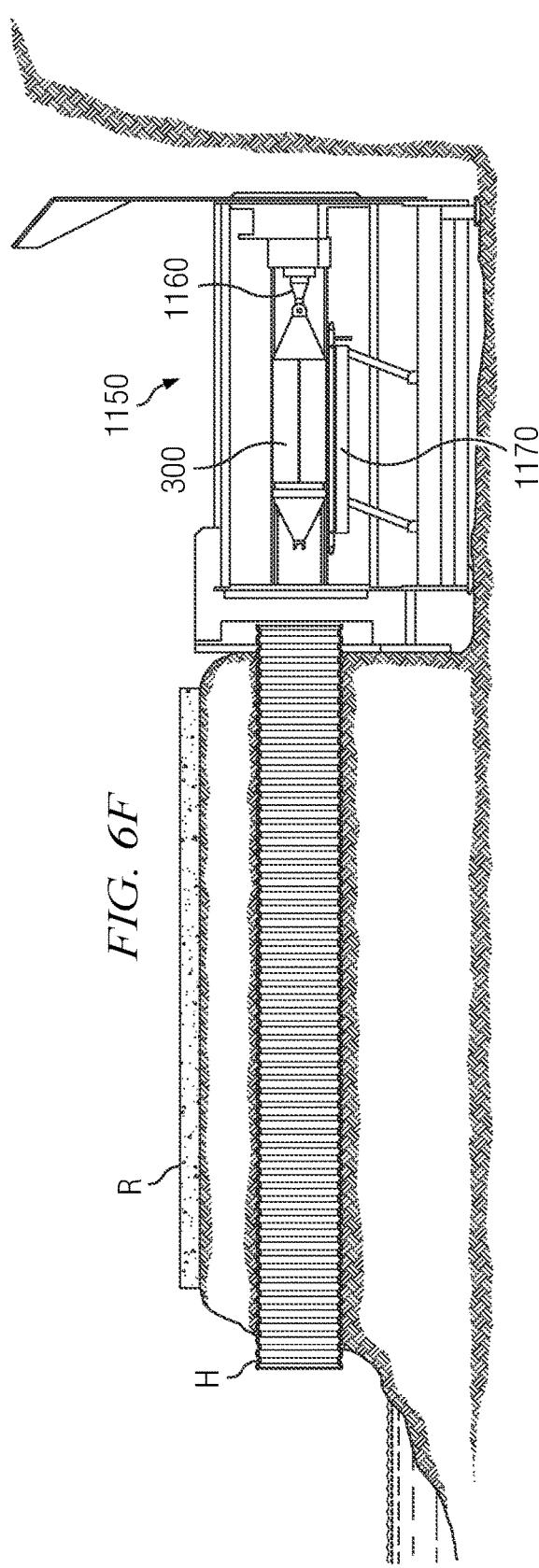

FIG. 6E illustrates expansion of host pipe H completed at a first expansion station at the far end of host pipe H from pusher box 1150, and expander 300 moved to a second expansion station by retraction of rods 410 by pusher box 1150. At this point, an expansion of host pipe H at the second expansion station will be undertaken. It will be understood that once expansion at the second expansion station is complete, expander 300 will be moved to a third expansion station by retraction of rods 410, and so on, until expansion of host pipe H is complete. FIG. 6D shows expansion of host pipe H as being complete, with expander 300 awaiting removal while supported by elevator 1170 on pusher box 1150.

Figure 7C:
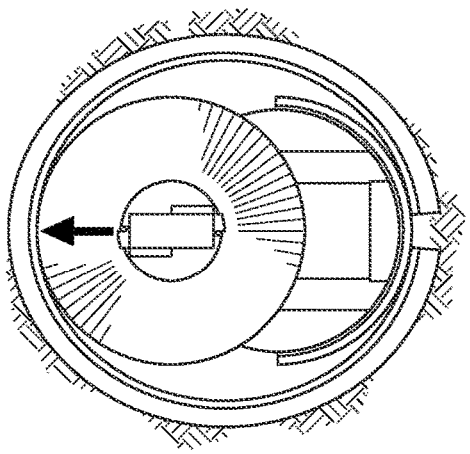
FIGS. 7A through 7F are a series of "freeze frame" illustrations depicting expansion of host pipe H.
Figure 7F:
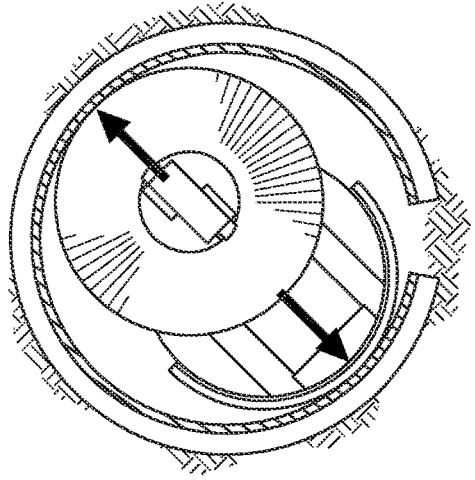
Figure 7B:
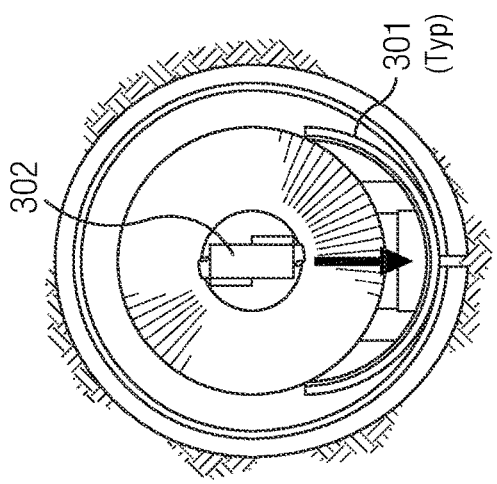
Figure 7E:
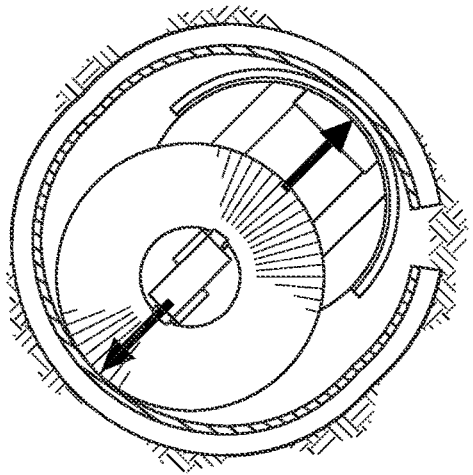
Figure 7A:
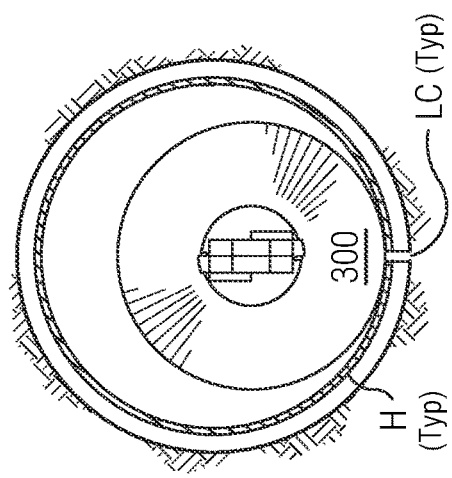

FIGS. 7A through 7F area series of "freeze frame" illustrations depicting expansion of host pipe H at an expansion station, such as illustrated, for example, on FIG. 6D. FIG. 7A though 7F will be understood to be end elevation views looking into the far end of host pipe H from pusher box 1150 on FIG. 6D, for example, during expansion.

FIG. 7A depicts expander 300 sitting in host pipe H immediately before expansion begins. Longitudinal cut LC in host pipe H is shown in an unseparated state.

In FIG. 7B, floating pad 301 on expander 300 extends to commence expansion of host pipe H. In FIG. 7C, expander 300 and floating pad 301 engage host pipe H to expand in the direction of the arrows on FIGS. 7B and 7C. Host pipe H deforms in response, causing initial separation of longitudinal cut LC. In preferred embodiments, expansion of host pipe H is done nondestructively to host pipe H. Likewise, separation of longitudinal cut LC is preferably non-elastic (i.e. plastic) separation.

Figure 7D:
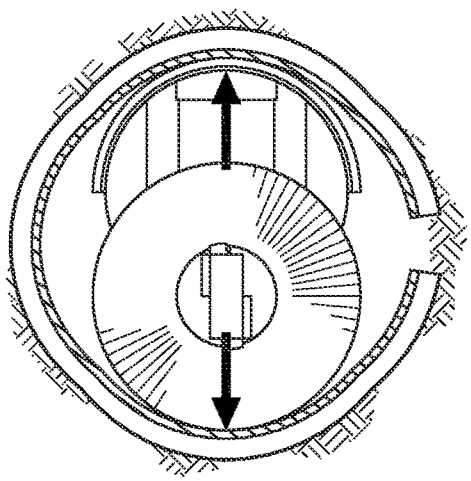

Floating pad 301 is retracted between FIGS. 7C and 7D, and then expander 300 is partially rotated to a new rotational position about expander 300's longitudinal axis. It will be understood from disclosure above that such rotation of expander 300 is responsive to torque delivered by rod rotator 1162 on pusher box 1150 and applied via rods 410 connected to expander rod connector 302. FIG. 7D depicts expansion of host pipe H at a second rotational position. Longitudinal cut LC continues to separate. Floating pad 301 is retracted again between FIGS. 7D and 7E, and expander 300 is rotated to a third rotational position. FIG. 7E depicts expansion of host pipe H at the third rotational position. Retraction, rotation and expansion continues wherein FIG. 7F depicts expansion of host pipe H at a fourth rotational position, by which time host pipe H is substantially uniformly expanded and longitudinal cut LC is separated.

While the embodiments of FIGS. 7A through 7F disclose four rotational positions from which to expand host pipe H, the scope of this disclosure is not limited in this regard. It will be understood that users will customize expansion procedures to the needs of the application, taking into account variables such as, for example, amount of host pipe expansion and longitudinal cut separation desired at each expansion station, or number of rotational positions from which to expand.

FIGS. 8A and 8B are "freeze frame" views depicting a second exemplary embodiment of an expansion of host pipe H. The embodiment illustrated on FIGS. 8A and 8B is similar to the embodiment illustrated on FIGS. 6C through 6F, except that capsules 430 are concatenated to follow expander 300 into expanded sections of host pipe H. Capsules 430 are illustrated and described above with reference to FIG. 4C. It will be understood from FIG. 8A that capsules 430 are attached to expander rod connector 302 via entry into the far end of host pipe H from pusher box 1150. Capsules 430 are concatenated into a string thereof attached to expander rod connector 302 as expander 300 moves towards pusher box 1150 (responsive to pusher box retracting rods 410). Once expander 300 has completed expansion of host pipe 300 at a first expansion station, a first capsule 430 is attached to expander 300 via connection with expander rod connector 302. As expander 300 moves towards pusher box 1150 and a second expansion station, additional capsules 430 are concatenated into a string thereof via continued entry into the far end of host pipe H. Capsules 430 may be joined together end-to-end via any suitable hardware, such as bolts, pins or threaded connections, and this disclosure is not limited in this regard. Likewise, capsules 430 may be joined to expander rod connector 302 by any suitable hardware.

FIG. 8B illustrates completion of expansion of host pipe H with a concatenated string of capsules 430 temporarily resident in the expanded host pipe H. It will be understood that the embodiment of FIGS. 8A and 8B is advantageous in deployments where the expanded host pipe H is unstable, or when collapse of expanded host pipe H is a concern. The embodiment of FIGS. 8A and 8B is advantageous when, for example, host pipe H is highly corroded and/or brittle, or the earthwork surrounding host pipe H is unstable. In such environments, capsules 430 provide additional temporary support to expanded host pipe H until a liner pipe can be introduced.

The embodiment of FIGS. 8A and 8B is further advantageous in deployments where expansion efforts are proving difficult to achieve non-elastic expansion and separation. That is, in deployments where host pipe H tends to return elastically to its unexpanded condition despite expansion efforts. Insertion of a liner pipe in such deployments might prove difficult where the liner pipe has a comparable diameter to the original, unexpanded host pipe. The introduction of capsules 430 in such deployments, such as in the embodiment illustrated on FIGS. 8A and 8B, temporarily assists maintaining expanded host pipe H at its expanded diameter until a liner pipe can be introduced.

Although not illustrated in this disclosure, deployment of capsules 430 during the cutting phase may also be useful in some embodiments where the host pipe is particularly unstable after a longitudinal cut is made (per FIGS. 5A and 5B above with associated description). With momentary reference to FIGS. 5B and 8A/8B together, a string of capsules 430 may be deployed in host pipe H behind cutting machine 200 during the cutting phase in the manner described on FIGS. 8A/8B with reference to expander 300.

Figure 9:
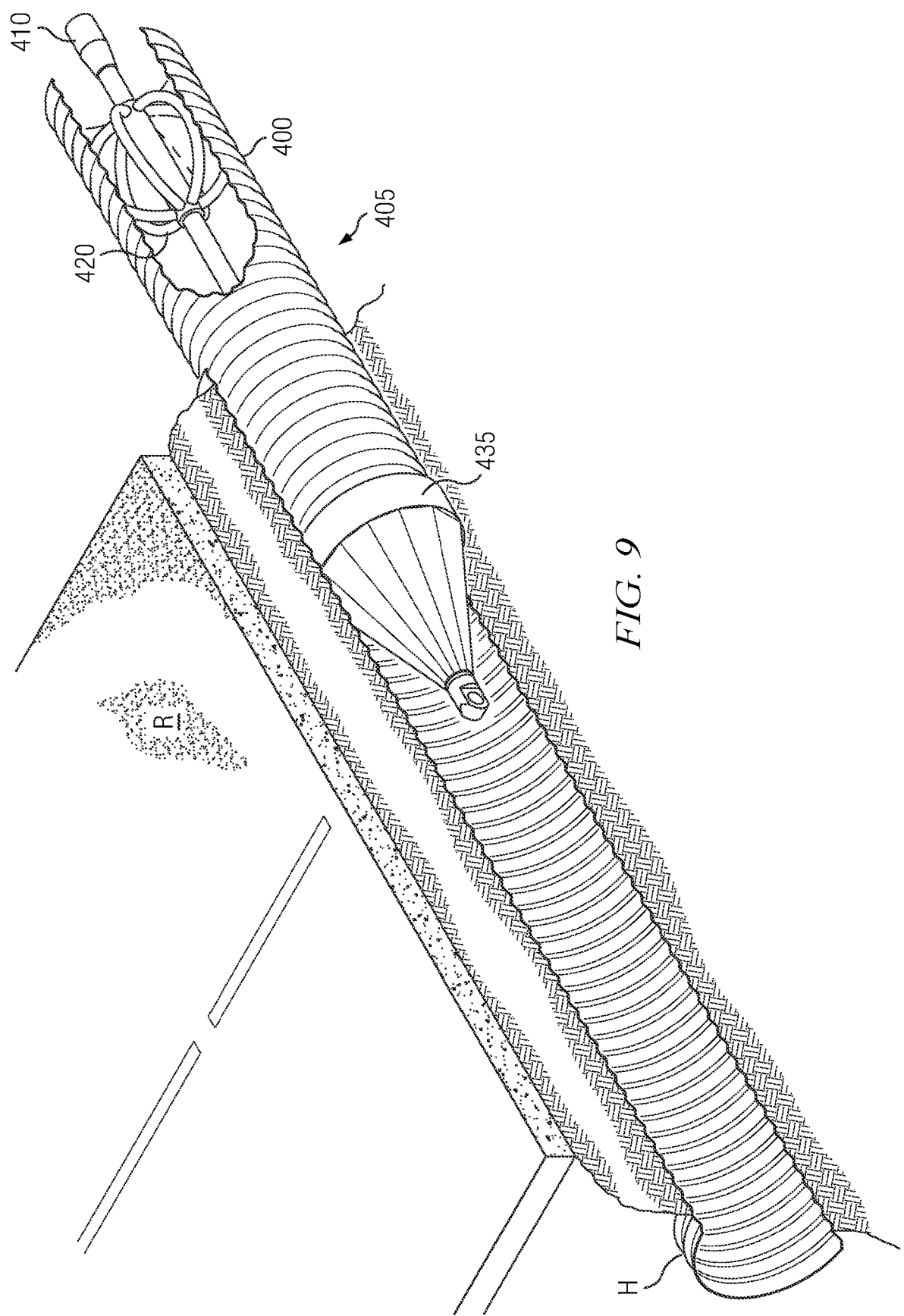
FIG. 9 illustrates steel head 435 and cartridge 405 as deployed in embodiments for inserting concatenated liner pipe section 400 into host pipe H.

FIG. 9 illustrates the interoperation of steel head 435 and cartridge 405 as deployed in embodiments of the disclosed technology for inserting concatenated liner pipe section 400 into an expanded host pipe H. It will be recalled from disclosure above associated with FIG. 4B that cartridge 405 comprises rod 410 inserted into liner pipe section 400, wherein rod 410 is centered and frictionally stabilized within liner pipe section 400 with wireframe centering balls 420. Wireframe centering balls 420 are attached to rod 410 along rod 410's length. Wireframe centering balls 420 are sized and shaped to frictionally engage the internal surface of liner pipe section 400 so that liner pipe section 400 may be inserted into host pipe H by rod 410. FIG. 9 illustrates an initial cartridge 405 for insertion into host pipe H, to which steel head 435 is attached at the leading end. In greater detail, steel head 435 is attached to rod(s) 410 inside initial liner pipe section 400, so that when pusher box 1150 (not illustrated on FIG. 9) inserts initial cartridge 405 into host pipe H by connection to rods 410, steel head 430 will be driven into host pipe H by rods 410.

Liner section 400 on FIG. 9 is also preferably connected to the periphery of steel head 430. In this way, as rods 410 drive steel head 435 into host pipe H, liner pipe sections 400 will then be dragged along by steel head 435. With further reference to the embodiment illustrated on FIG. 8, steel head 435 advantageously has a dead weight and is conically shaped. Steel head 435 thus promotes smooth insertion of an entire concatenated string of rods 410/liner pipe sections 400 into the host pipe H. In particular, steel head 435 protects the leading edge of the first liner pipe section 400 from snagging against corrugations and minor peripheral obstructions in the interior of host pipe H.

Although not specifically illustrated, one embodiment of steel head 435 advantageously provides percussive measures such as an internal vibrator, jar or impact hammer, preferably driven hydraulically or pneumatically. The percussive measures are configured to vibrate or jolt steel head 435 (and at least the leading rods 410/liner pipe sections 400 attached to steel head 435) against the host pipe H interior as they are inserted into the host pipe H, thereby encouraging movement of the string in the face of frictional drag against the interior of host pipe H. As noted above, percussive measures such as a vibrator, jar or impact hammer may also or alternatively be provided in pusher box 1150 (also not illustrated).

FIGS. 10A through 10E are "freeze frame" views depicting a first exemplary embodiment of insertion of concatenated liner pipe sections 400 into an expanded host pipe H. When insertion is complete, a concatenated string of liner pipe sections 400 is left resident in host pipe H and forms a continuous liner pipe. Liner pipe sections 400 may be made of any suitable liner pipe material, such as, without limitation, galvanized metal, aluminized steel, asphalt coated steel plastic, ceramic or a fiber reinforced resin compound. Similarly, liner pipe sections 400 may be corrugated or smooth. Liner pipe sections 400 for any given deployment may also be uniform in construction or hybrid. The scope of this disclosure is not limited in any of these regards.

Figure 10E:
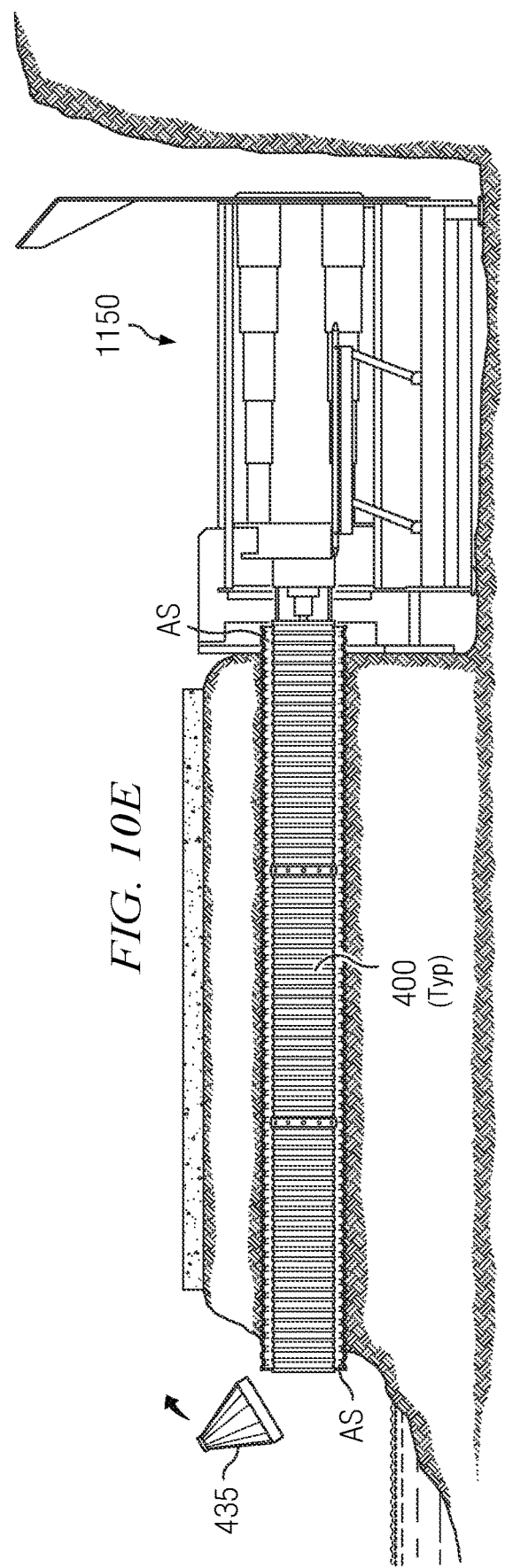

Referring first to FIG. 10A, pusher box 1150 is inserting an initial liner pipe section 400 into host pipe H. Throughout FIGS. 10A through 10E, it will be understood that liner pipes 400 are preferably inserted in the form of cartridges 405 as illustrated and described above with reference to FIG. 4B, in which liner pipe sections 400 are deployed with rods 410 and wireframe centering balls 420 assembled inside. It will be also seen and understood on FIG. 10A that initial liner pipe section 400 (and rods 410 inside liner pipe section 400, hidden from view) are connected to steel head 435 in the manner described above is in association with FIG. 9.

With continuing reference to FIG. 10A, rod connector 1160 on pusher box 1150 will be understood to be connected to rods 410 inside liner pipe section 400. Pusher box 1150 inserts steel head 435 and initial liner pipe section 400 into host pipe H as pusher box 1150 is actuated towards its extended state. Elevator 1170 on pusher box 1150 is set to a suitable height to facilitate entry of steel head 435 and initial liner pipe section 400 into host pipe H.

FIG. 10B depicts where a second liner pipe section 400 has been concatenated to the initial liner pipe section 400. Pusher box 1150 is shown in its fully retracted state It will be understood that between FIGS. 10A and 10B, pusher box 1150 was actuated to its fully extended state, whereupon rod connector 1160 was disconnected from rods 410 inside the initial liner pipe section 400. Pusher box 1150 was then retracted to its fully retracted state. A second cartridge 405 was then deployed on elevator 1170. The rods 410 in the second cartridge 405 were then connected to the rod connector 1160 at one end, and to the rods 410 inside the initial liner pipe section 400 at the other end (rod connections hidden from view on FIG. 10B).

Figure 17:
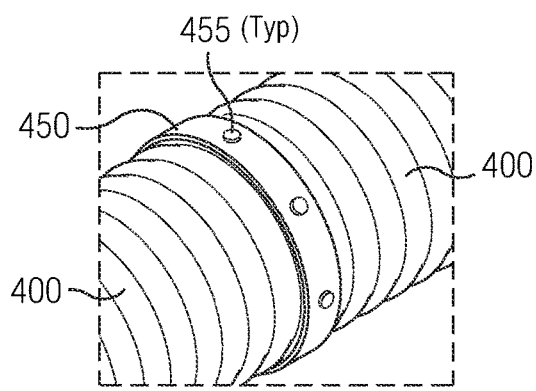
FIGS. 17 and 18 are detail views as shown on FIGS. 10B and 10C respectively.

FIG. 10B also illustrates the two illustrated liner pipe sections 400 joined together. FIG. 17 illustrates one embodiment of such joint in greater detail. In the exemplary embodiment illustrated on FIG. 17, initial and second liner pipe sections 400 are connected with a connector clamp 450 secured by bolts 455. In other embodiments, not illustrated, initial and second liner pipe sections 400 may alternatively be connected via rivets in drilled holes, or via adhesive, or via tack welds once a connection is made using temporary flanges. The scope of this disclosure is not limited in this regard.

Figure 18:
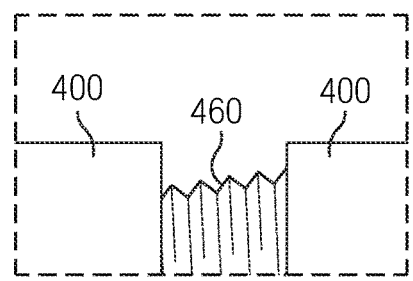
Figure 19:
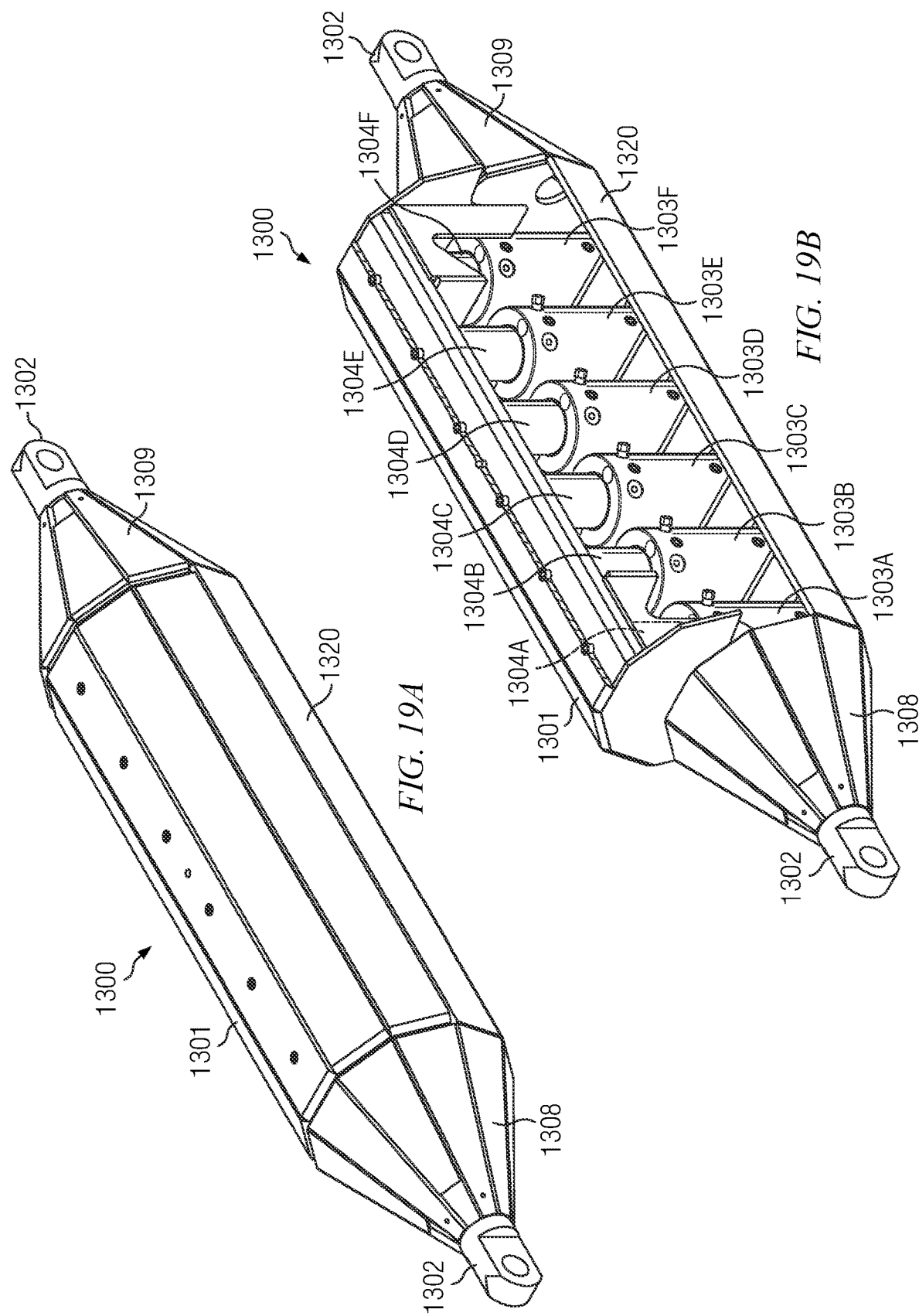
FIGS. 19A and 19B depict one exemplary embodiment of a second expander tool 1300 that may be used in embodiments of the disclosed technology.

FIG. 10C and FIG. 18 illustrate a further exemplary embodiment of joining two liner pipe sections 400 together, in which liner pipe sections 400 are threaded together via threaded connection 460. FIG. 10C illustrates rods 410 and wireframe centering balls 420 inside liner pipe sections 400. In the embodiment illustrated on FIG. 10C, rods 410 inside second liner pipe section 400 are initially only connected to rod connector 1160 on pusher box 1150. Torque T is then delivered to second liner pipe section 400 via rotation of rods 410 inside second liner pipe section by rod rotator 1162 on pusher box 1150. Rotation of rods 410 causes corresponding rotation of second liner pipe 400 via frictional contact of wireframe centering balls 420 against the inside surface of second liner pipe section 400. (Note that rod rotator 1162 is not illustrated on pusher box 1150 on FIG. 10C. Refer to FIGS. 3E and 3F above, with associated disclosure, for a discussion of the operation of embodiments of rod rotator 1162). Torque T as shown on FIG. 10C causes rotation of second liner pipe section 400 at threaded connection 460 (on FIG. 18), which in turn enables initial and second liner pipe sections 400 to be threaded together. In some embodiments, the threading together of initial and second liner pipe sections 400 will take about 2-6 revolutions of second liner pipe section 400 at threaded connection 460, although the scope if this disclosure is not limited in this regard. Once threaded connection 460 is made, rods 410 on initial liner pipe section 400 may then be connected to rods 410 on second liner pipe section.

Referring now to the exemplary embodiments illustrated on both FIGS. 10B and 10C, pusher box 1150 may be actuated towards its extended state once initial and second liner pipe sections 400 are joined together and rods 410 are connected throughout. Actuation towards pusher box 1150's extended state will cause insertion of initial and second liner pipe sections 400 (as attached to steel head 435) further into host pipe H.

Comparing FIGS. 10B and 10C to FIG. 10D, pusher box 1150 has moved to its fully extended state, rods 410 in second liner pipe section 400 have been disconnected from rod connector 1160 on pusher box 1150, pusher box 1150 has been retracted to its fully retracted state, and a third cartridge 405 has been deployed on elevator 1170. The sequence of operations described above with reference to FIG. 10B is now repeated with respect to FIG. 10D, in which rods 410 and liner pipe sections 400 are connected/joined, liner pipe sections 400 are inserted further into host pipe H via actuation of pusher box 1150 towards its fully extended state, rods 410 are disconnected from rod connector 1160, pusher box 1150 is retracted to its fully retracted state, and another cartridge 405 is introduced to pusher box 1150.

FIG. 10E illustrates completion of liner insertion operations, in which a concatenated string of liner pipe sections 400 are joined together to form a continuous liner pipe inside host pipe H. FIG. 1E shows steel head 435 being disconnected and removed from a far end of host pipe H. Although not specifically illustrated, it will be understood that rods 410 inside liner pipe sections 400 are now retracted with wireframe centering balls 420 attached. Retraction of rods 410 is essentially the reverse operation to the insertion operation described immediately above with reference to FIGS. 10B and 10D. Rod connector 1160 on pusher box 1150 is connected to rods 410 in a fully extended state. Pusher box 1150 is then retracted to its fully retracted state, which causes rods 410 to be withdrawn/retracted out of liner pipe section 400 while leaving liner pipe sections 400 resident inside host pipe H. In preferred embodiments, the dead weight of the fully concatenated string of liner pipe sections 400, plus its frictional resistance from contact with host pipe H along its entire length, will be sufficient to enable pusher box 1150 to withdraw rods 410 (with wireframe centering balls 420 attached) from liner pipe sections 400 while leaving liner pipe sections 400 resident in host pipe H. Alternatively, steel head 435 may be left attached to liner pipe sections 400 while rods 410 are withdrawn. Once pusher box 1150 reaches a fully retracted state, a first section of rods 410 (with wireframe centering balls 420 attached) may be disconnected from rod connector 1160 on pusher box 1150 at one end, and from the concatenated string of rods 410 still inside the liner pipe at the other end. Pusher box 1150 is then actuated to its fully extended state. Rod connector 1160 is then connected to a second section of rods 410 ready for a second retraction of rods 410. The process is continued until the entire string of rods 410 (with wireframe centering balls 420 attached) is retracted section by section and removed.

FIGS. 11A through 11E are "freeze frame" views depicting a second exemplary embodiment of insertion of concatenated liner pipe sections 400 into an expanded host pipe H. Generally speaking, the embodiment of FIGS. 11A through 11E is similar to the embodiment of FIG. 9 and FIGS. 10A, 10B, 10D and 10E. However, the embodiment of FIGS. 11A through 11E depicts insertion of liner pipe sections 400 in deployments when capsules 430 have been left temporarily resident in host pipe H (per the disclosure above associated with FIGS. 8A and 8B).

Figure 11A:
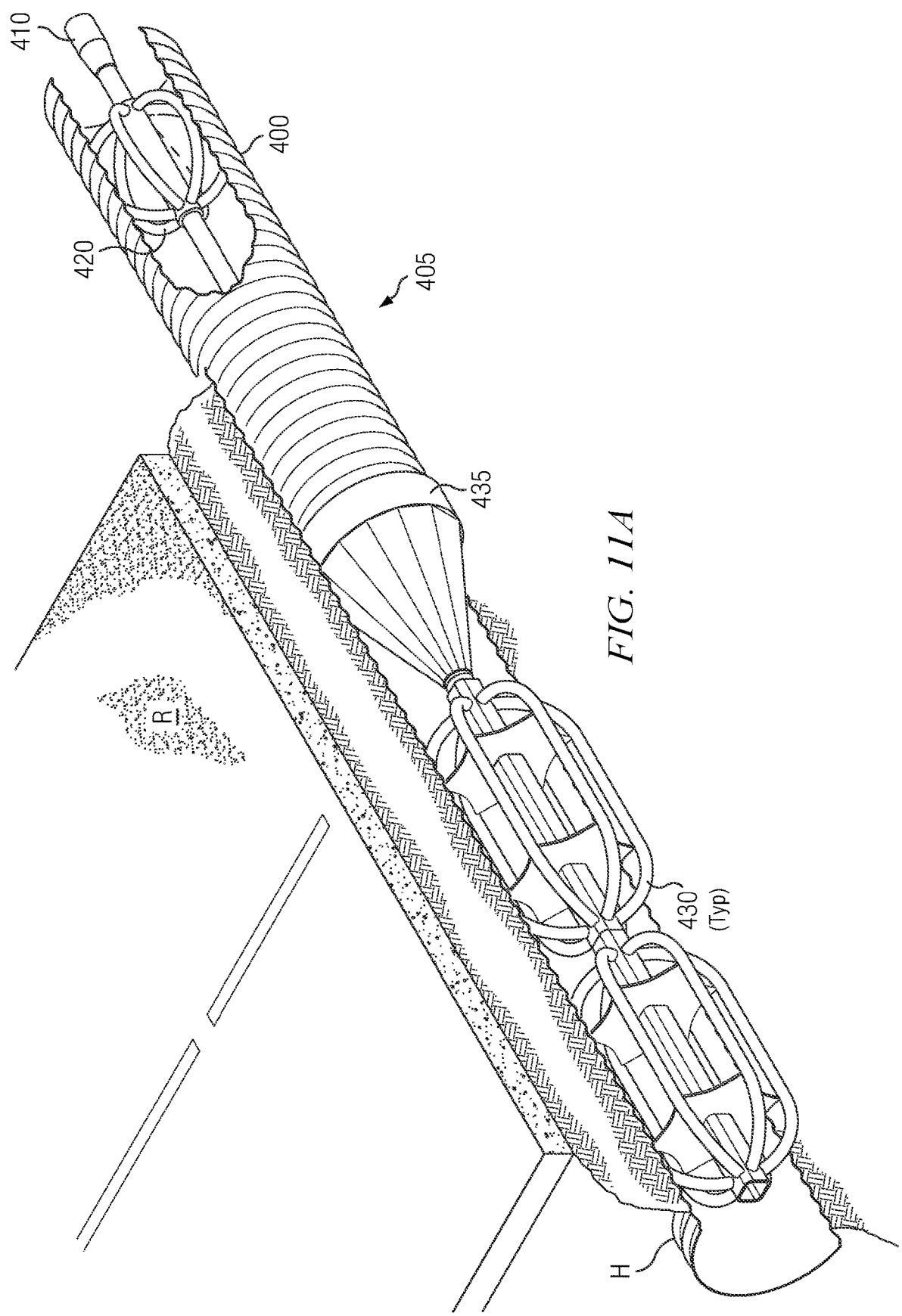

FIG. 11A is similar to FIG. 9. Capsule 405 (including rods 410 and wireframe centering balls 420 assembled inside liner pipe section 400) is shown on FIG. 11A connected to steel head 435 in the manner described above with reference to FIG. 9. Steel head 435 on FIG. 1A may optionally provide percussive measures such as a vibrator, jar or impact hammer (not illustrated) as also described above with reference to FIG. 9. FIG. 11A shows capsules 435 previously deployed in host pipe H per FIGS. 8A and 8B above and associated description.

FIGS. 11B through 11E are similar to FIGS. 10A, 10B, 10C and 10D. Liner pipe section 400 on FIGS. 11B through 11E is being inserted into host pipe H in the manner described above with FIGS. 10A, 10B, 10C and 10D. It will be appreciated on FIGS. 11B through 11D, however, that steel head 435 shunts capsules 435 out of the far end of host pipe H as liner pipe sections 400 are inserted into host pipe H. It will be understood in the embodiment illustrated on FIGS. 11A through 11E that, although not specifically illustrated, retraction of rods 410 (with wireframe centering balls 420 attached) from liner pipe sections 400 is per the description above associated with FIG. 10E.

Figures 12, 13:
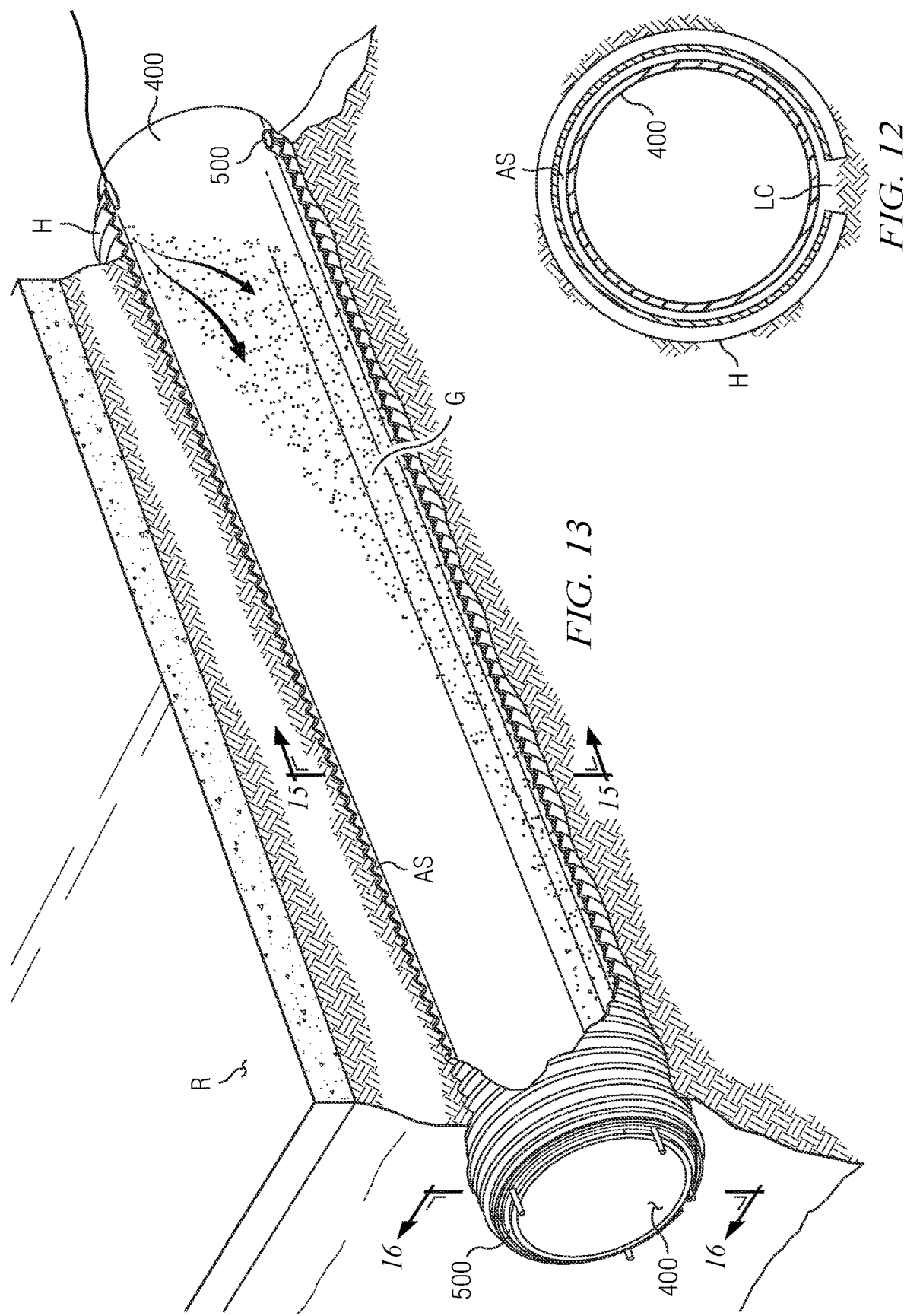

FIGS. 10E and 11E depict an annular space AS formed between liner pipe sections 400 and the host pipe H once the fully concatenated liner pipe is inserted and resident inside host pipe H. FIG. 12 illustrates a section through liner pipe sections 400 resident inside host pipe H per FIGS. 10E and 11E. FIG. 12 shows annular space AS and longitudinal cut LC (with longitudinal cut LC separated per the description above associated with FIGS. 7A through 7F).

Figure 14:
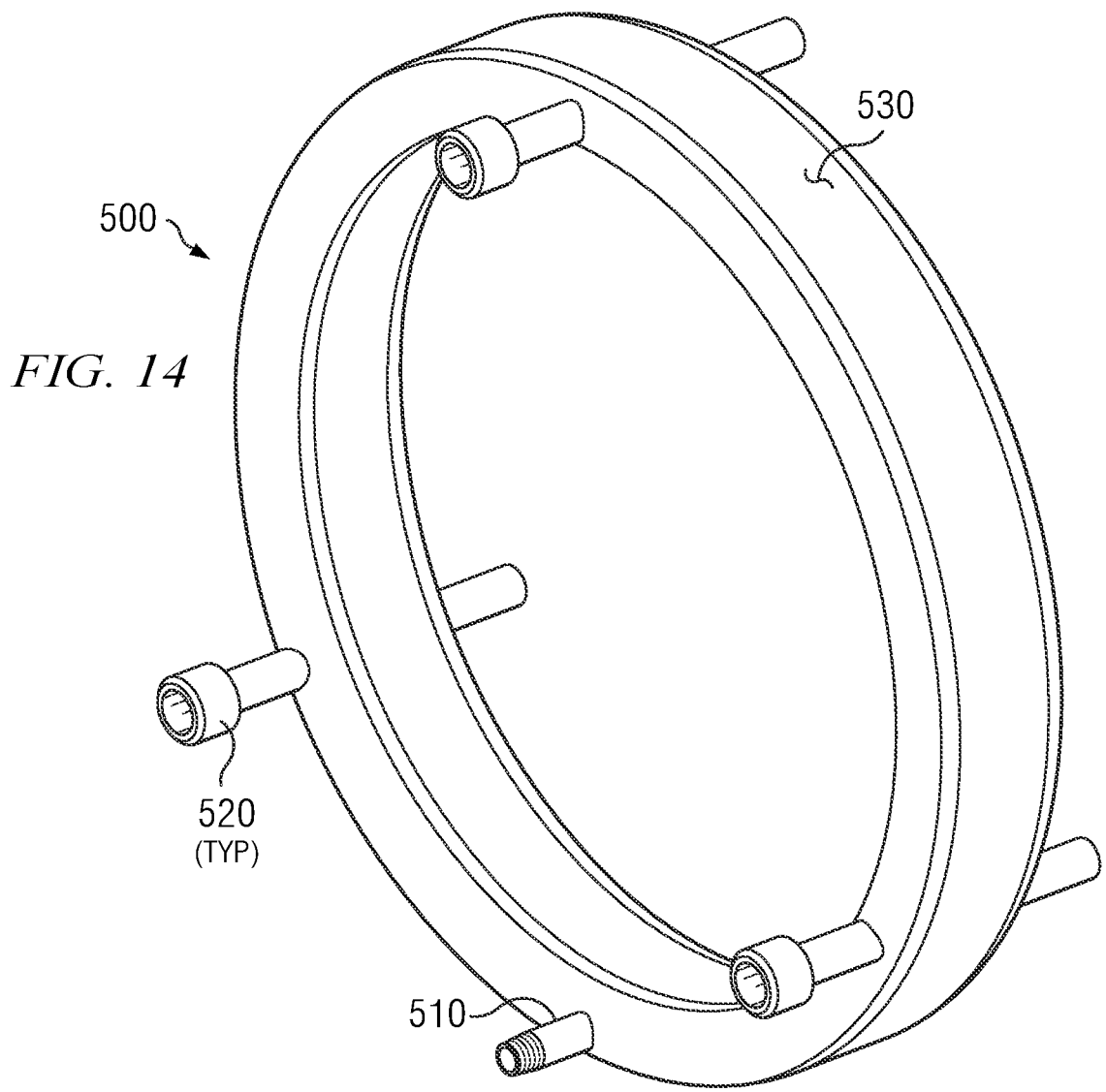
FIG. 14 illustrates inflatable bulkhead 500.
Figure 15:
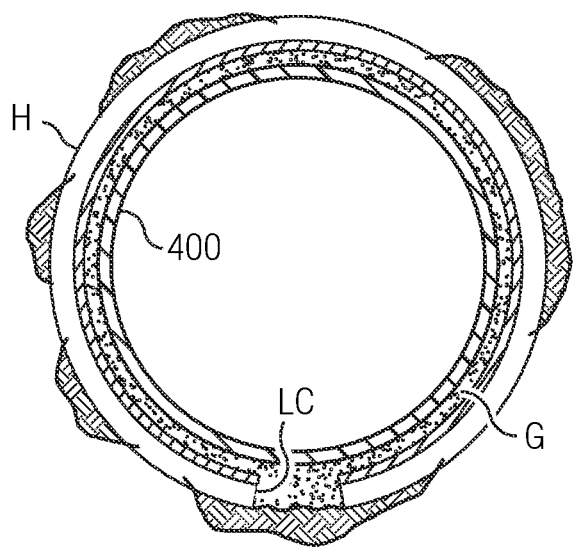
FIGS. 15 and 16 are sections as shown on FIG. 13.

FIGS. 13 and 15 illustrate grouting of the annular space AS. Grouting may be accomplished by any suitable protocol. FIGS. 13 and 15 illustrate one example of a suitable grouting protocol using specially developed inflatable bulkheads 500, illustrated on FIGS. 14 and 16, customized to dispense liquid grout into annular space AS, and then retain the grout while it cures. This disclosure is not limited, however, to the grout protocol illustrated and described with reference to FIGS. 13 and 15, or deploying the inflatable bulkheads illustrated and described with reference to FIGS. 14 and 16.

FIG. 14 depicts inflatable bulkhead 500 comprising inflatable ring 530 inflated via inflation valve 510. Inflatable ring 530 may be made from conventional inflatable materials, such as rubber or rubber composites, and inflation valve 510 is conventional. Inflatable bulkhead 500 also includes at least one (on FIG. 14, three) grout fittings 520. Grout fittings 520 pass through inflatable ring 530 and are conventionally sealed at their points of insertion through the wall of inflatable ring 530. Grout fittings 520 are adapted to allow liquid grout to pass through. They may be made of any conventional material such as brass, stainless steel, etc. Each grout fitting 520 has a connector on one end suitable for connection with a conventional liquid grout hose.

FIG. 13 depicts grout G being injected into annular space AS. Preferably, annular space AS is completely filled with grout G. However, in some embodiments, annular space AS may be at least partially filled with grout G. Inflatable bulkheads 500 are installed into annular space AS at either end of host pipe H, and thereby seal annular space AS at either end. Since inflatable bulkheads 500 are advantageously made of rubber (or a rubber-like material) and are inflatable, the same bulkhead may be used for several combinations of outside diameters of liner pipe 400 and corresponding expanded internal diameters of host pipe H. For the same reason, inflatable bulkheads 500 provide good seals of annular space AS at either end of host pipe H regardless of surface or shape irregularities at points of contact with inflatable bulkheads 500. Consistent with the disclosure immediately above with reference to FIG. 14, liquid grout G is injected into annular space AS on FIG. 13 through one inflatable bulkhead 500 via grout fittings 520. Inflatable bulkheads 500 retain grout G in annular space AS while grout G cures. Once grout G is cured, inflatable bulkheads 500 may be deflated and removed. At this point, the assembly of host pipe H, concatenated liner pipe sections 400 and grout G in annular space AS has a cross-section as shown on FIG. 15.

It will be appreciated from FIG. 13 that liquid grout G may be injected into annular space AS from either or both ends. If only injected from one end, the inflatable bulkhead 500 at the non-injection end may be a plain bulkhead without grout fittings 520, or else the grout fittings 520 at the non-injection end may be temporarily plugged.

Figure 16:
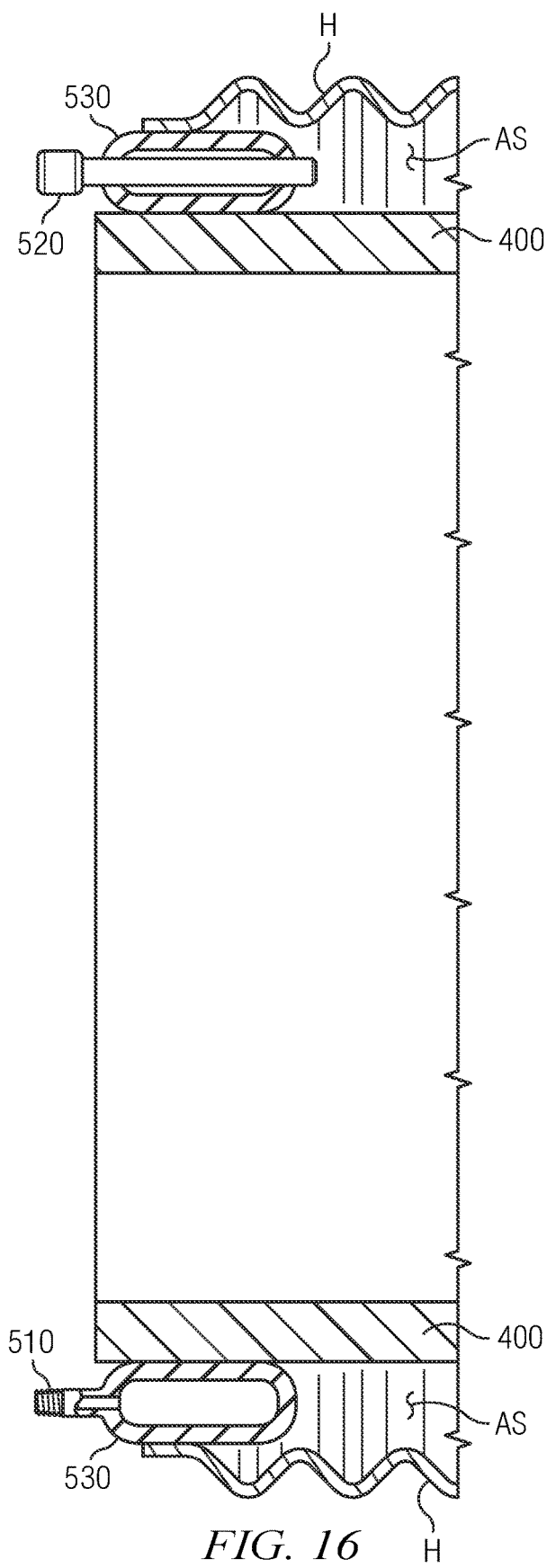

FIG. 16 is a cross-section as shown on FIG. 13, and shows the operational interface between inflatable bulkhead 500 and liner pipe section 400/host pipe H in more detail. Inflatable ring 530 is installed between liner pipe section 400 and host pipe H and inflated via inflation valve 510. Grout fitting(s) 520 dispense grout into annular space AS between liner pipe section 400 and host pipe H.

Although not specifically illustrated on FIGS. 13 through 16, it may be advantageous to stabilize concatenated liner pipe sections 400 during grouting operations. In some embodiments, such stabilization may via stabilization measures such as filling concatenated liner pipe sections 400 with water or pressurizing with air while the grout cures, in order to prevent possible deformation or even collapse of the liner pipe under the weight or pressure of the liquid grout. Once cured, the grout deters differential settlement of the host pipe/liner pipe as a unitary grouted structure. Further, with reference to FIG. 13, when fully pressurized, inflatable bulkheads 500 at either end provide strong temporary bulkheads that enable grout G to be delivered throughout annular space AS at pressure. As a result, grout G can fill all voids in annular space AS, including eroded voids that may be present in the soil barrier. It will be further understood that the term "grout" as used in this disclosure is not intended to be limited to cement-based grout. The scope of this disclosure includes any suitable injectable grout, also including, without limitation, epoxy-based grouts.

Preferred embodiments described in this disclosure have referred throughout to an embodiment of pusher box 1150 as described in detail on FIGS. 3A through 3G. It will be understood that the scope of this disclosure is not limited to such a pusher box embodiment. Alternative pusher box embodiments are within the scope of this disclosure, for example as described in U.S. Provisional Patent Application Ser. No. 62/471,389 incorporated herein by reference.

The scope of this disclosure also includes embodiments in which a host pipe expansion phase is combined with a liner pipe section insertion phase. In such embodiments, a longitudinal cut is made in the host pipe per the above disclosure. An oversized liner pipe is then inserted into the host pipe by the pusher box, in sections, with a similarly oversized conically-shaped steel head attached to a leading end of the liner pipe sections per the above disclosure. The oversized steel head expands the host pipe via separation of the longitudinal cut as it is inserted into the host pipe, and the liner pipe sections form a concatenated string thereof immediately resident in the freshly-expanded host pipe. In such embodiments, an annular space may or may not form between the host pipe and the concatenated host pipe sections. Grouting may be performed if a suitable annular space forms.

FIGS. 19A through 24 illustrate embodiments of a second expander tool (or simply, "expander") 1300 that may be used in embodiments of the disclosed technology. Expander 1300 and its embodiments depicted on FIGS. 19A through 24 are intended as alternative or supplemental expander tools to those designs and embodiments illustrated and described above in this disclosure with reference to FIGS. 6A and 6B, and in the Prior Application (Ser. No. 14/732,565) with reference to FIGS. 17A through 17D of the Prior Application disclosure. The pipe refurbishment methods described in this disclosure and in the Prior Application are not limited to any specific design of expander deployed when expanding pipe.

FIGS. 19A and 19B depict one exemplary embodiment of a second expander tool 1300 that may be used in embodiments of the disclosed technology. FIG. 19A illustrates expander 1300 in a retracted state, with floating pad 1301 in a "closed" position. FIG. 19B illustrates expander 1300 in an extended state, with floating pad 1301 shown in a substantially "open" position. FIGS. 19A and 19B depict expander 1300 providing cones 1308, 1309 on each end thereof. An expander rod connector 1302 is further attached to cones 1308, 1309 on each end of expander 1300. Cones 1308, 1309 are depicted on FIGS. 19A and 19B as flat-sided, although the scope of this disclosure is not limited in this regard. In other embodiments, cones 1308 and/or 1309 may be smooth-walled or curved-sided. Expander rod connectors 1302 on FIGS. 19A and 19B serve the same functions on expander embodiment 1300 as expander rod connectors 302 serve on expander embodiment 300, as described above in text associated with FIGS. 7A-7D, for example.

FIG. 19B further depicts the internals of expander 1300, in which six transversely disposed expander pistons 1303A-F actuate corresponding rams 1304A-F to displace floating pad 1301 in a general transverse direction towards and away from expander chassis 1320. Although expander 1300 provides six expander pistons 1303A-F in the embodiment shown on FIGS. 19A and 19B, the scope of this disclosure is not limited in this regard, and other (non-illustrated) embodiments may provide more or fewer expander pistons. It will thus be understood that floating pad 1301 is disposed to be displaced relative to chassis 1320 by extendable and retractable expander pistons 1303A-F, such that retraction and extension of expander pistons 1303A-F is configured to transition expander 1300 between a fully-retracted state and a fully-extended state. Expander 1300 thus has a first expansion range between the fully-retracted state and the fully-extended state.

Figure 20:
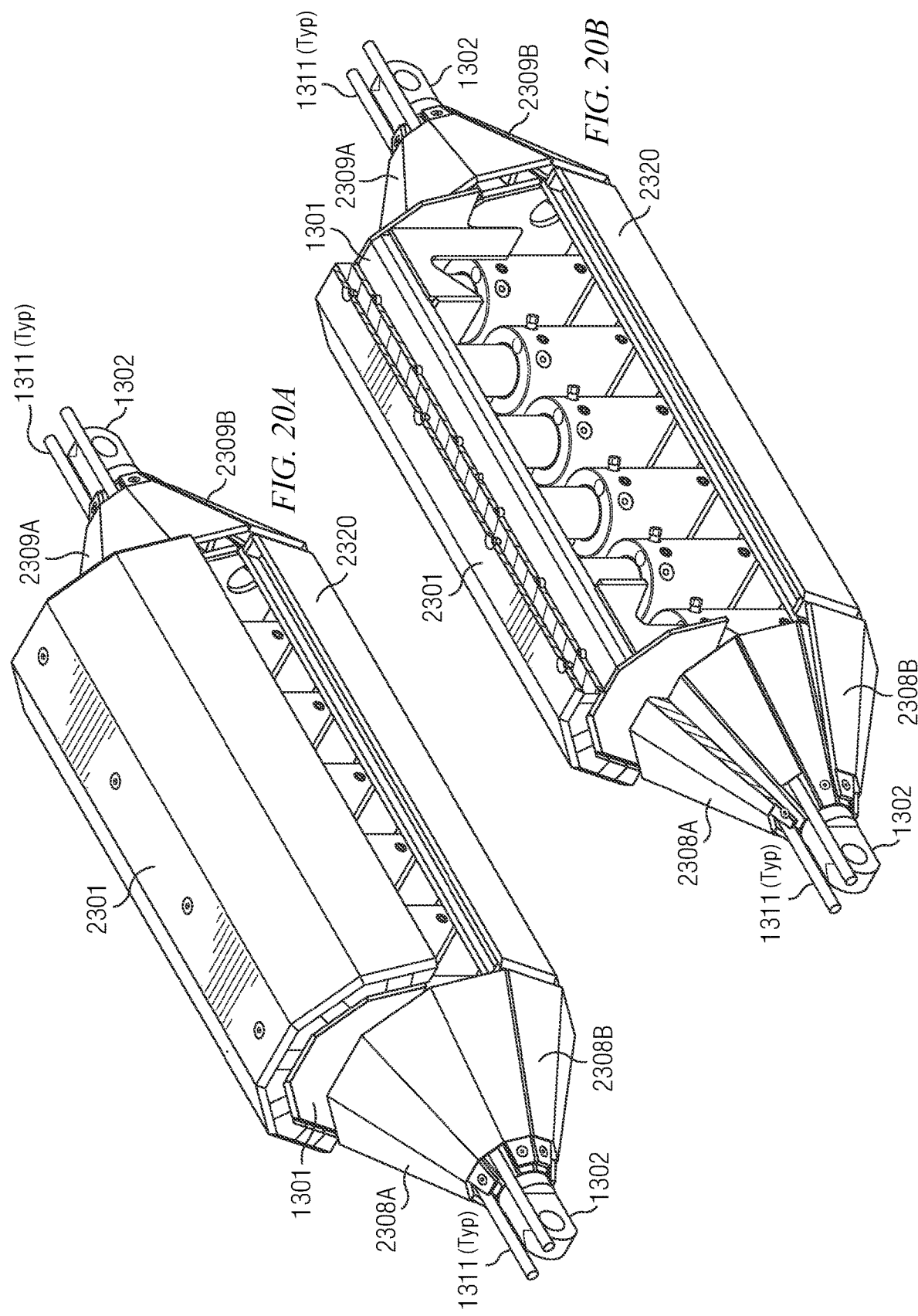
FIGS. 20A and 20B depict expander 1300 from FIGS. 19A and 19B equipped with a first embodiment of jacket accessories.

FIGS. 20A and 20B depict expander 1300 from FIGS. 19A and 19B equipped with a first embodiment of jacket accessories. As compared to an "unjacketed" expander 1300 shown on FIGS. 19A and 19B, the jacket accessories shown on FIGS. 20A and 20B are preferably of user-selectable thicknesses, and thereby alter the range of physical expansion available to expander 1300 by adding user-selectable thickness to the outside profile of an "unjacketed" expander 1300. The jacket accessories shown on FIGS. 20A and 20B thus adjust the nominal size of expander 1300 as shown on FIGS. 19A and 19B so that a same expander tool 1300 may expand larger diameter pipes with the jacket accessories attached than without. It will be further noted that the jacket accessories shown on FIGS. 20 and 20B are sized and shaped so that expander 1300 is shown as having a substantially uniform jacket thickness provided over expander 1300's entire exterior, such that an exterior surface of the "jacketed" expander 1300 on FIGS. 20A and 20B is substantially continuous in a "closed" position with floating member 1301 in a fully retracted state. It will nonetheless appreciated that the scope of this disclosure is not limited in this regard, and that other (non-illustrated) embodiments may provide only a partial set of jacket accessories to cover only a part of expander 1300's exterior, and/or jacket pieces having varying thicknesses.

Figure 21:
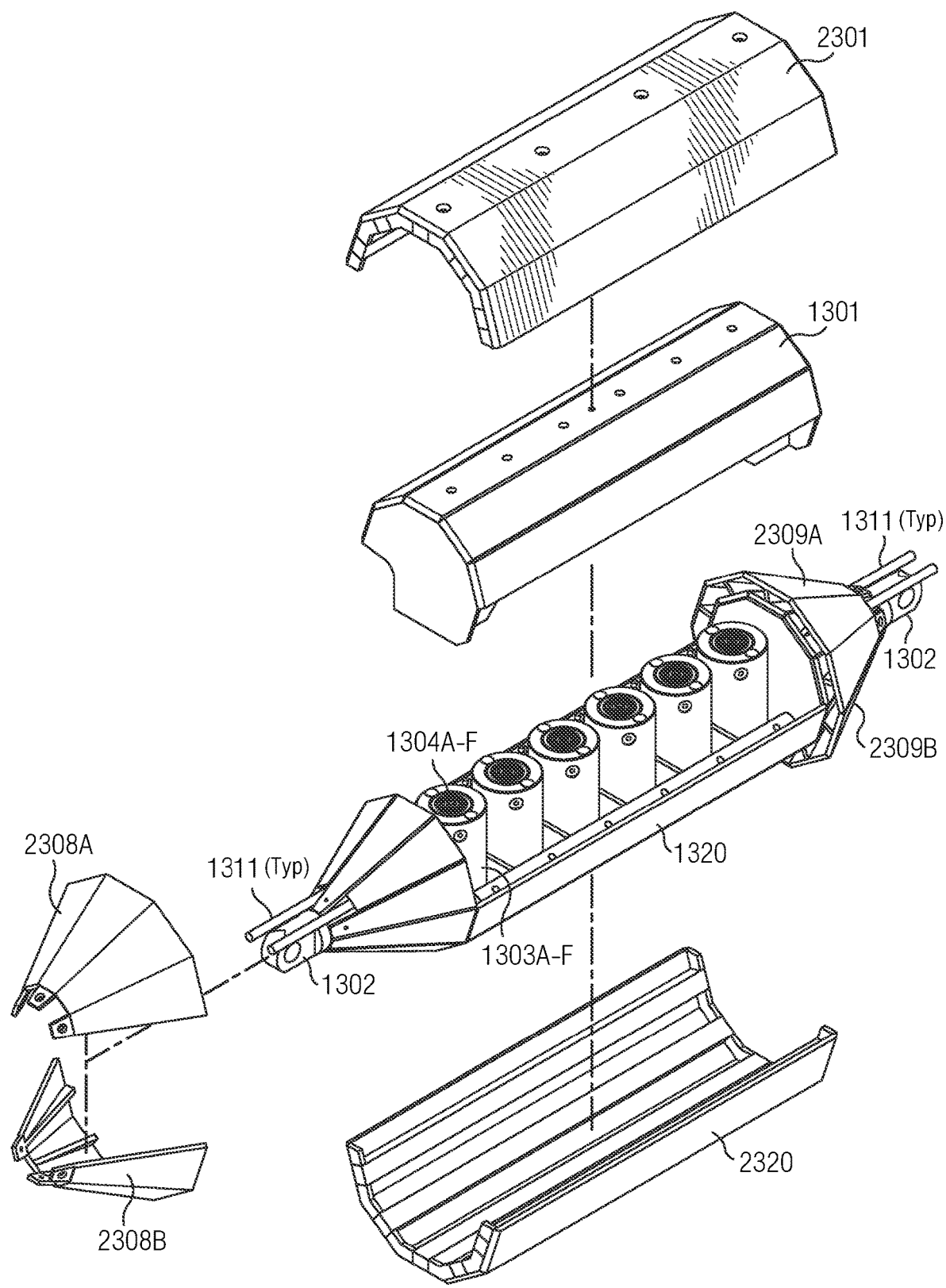
FIG. 21 is an exploded view of a "jacketed" expander 1300 from FIGS. 20A and 20B.

FIG. 20A illustrates expander 1300 in a partially extended state, with floating pad 1301 in a "partially open" position. FIG. 20B illustrates expander 1300 in more extended state, with floating pad 1301 shown in section in a "further open" position. FIG. 21 is an exploded view of a "jacketed" expander 1300 from FIGS. 20A and 20B. The jacket accessories shown on FIGS. 20A, 20B and 21 include floating pad jacket 2301 attached to floating pad 1301, chassis jacket 2320 attached to expander chassis 1320, and cone jacket pieces 2308A/B and 2309A/B attached to expander cones 1308 and 1309 respectively. Cone jacket pieces 2308A/B and 2309A/B are depicted on FIGS. 20A, 20B and 21 as flat-sided, although the scope of this disclosure is not limited in this regard. In other embodiments, cone jacket pieces 2308A/B and/or 2309A/B may be smooth-walled or curved-sided. Jacket pieces 2301, 2320, 2308A/B and 2309A/B may attach to expander 1300 via bolting or other suitable fastening, and the scope of this disclosure is not limited in regard to jacket fastening. Cone jacket pieces 2308A/B and 2309A/B are shown on FIGS. 20A, 20B and 21 in two pieces. The scope of this disclosure is not limited in this regard, however. Cone jacket pieces 2308A/B and 2309A/B may be an assembly of a single cone or multiple cone parts.

It will thus be seen from FIGS. 20A, 20B and 21 that floating pad jacket 2301 is disposed to be removably attached to floating pad 1301, such that floating pad jacket 2301 increases the first expansion range of expander 1300 to a second expansion range when floating pad jacket 2301 is attached to the floating pad. Further, FIGS. 20A, 20B and 21 illustrate chassis jacket 2320 disposed to be removably attached to chassis 1320, such that chassis jacket 2320 increases the first expansion range of expander 1300 to a third expansion range when chassis jacket 2320 is attached to chassis 1320. Further, FIGS. 20A, 20B and 21 illustrate cone jackets 2308A/B and 2309A/B each disposed to be removably attached to cones 1308, 1309 respectively. FIG. 20A shows that in the illustrated embodiment, an exterior surface of expander 1300 is substantially continuous when: (1) floating pad jacket 2301, chassis jacket 2320 and cone jackets 2308A/B and 2309A/B are all attached to floating pad 1301, chassis 1320 and cones 1308, 1309 respectively, and (2) expander 1300 is in the fully-retracted state.

FIGS. 22A and 22B depict expander 1300 from FIGS. 19A and 19B equipped with a second embodiment of jacket accessories. FIG. 22A illustrates expander 1300 in a retracted state, with floating pad 1301 hidden and in a "closed" position. FIG. 22B illustrates expander 1300 in an extended state, with floating pad 1301 shown in a substantially "open" position. In embodiments illustrated in FIGS. 22A and 22B, spacer 3330 is disposed to be selectively interposed between floating pad 1301 and floating pad jacket 3301, such that spacer 3330 and floating pad jacket 3301 increase the first expansion range of expander 1300 to a spaced expansion range when floating pad jacket 3301 is attached to floating pad 1301 with spacer 3330 interposed therebetween. It will be appreciated that thicknesses of floating pad jacket 3301 and spacer 3330 may be of a user-selectable size. As compared to an "unjacketed" floating pad 1301 shown on FIGS. 19A and 19B, therefore, the thickness of floating pad jacket 3301 plus the thickness of spacer 3330 on FIGS. 22A and 22B alter the range of physical expansion available to expander 1300 by adding user-selectable thickness to the outside profile of an "unjacketed" floating pad 1301. The jacket accessories shown on FIGS. 22A and 22B thus adjust the effective nominal size of expander 1300 as shown on FIGS. 19A and 19B so that a same expander tool 1300 may expand larger diameter pipes with the jacket accessories attached than without.

Floating pad jacket 3301 and spacer 3330 on FIGS. 22A and 22B may attach to floating pad 1301 via bolting or other suitable fastening, and the scope of this disclosure is not limited in regard to such fastening. Embodiments of spacer 3330 are further not limited to the "bar stock" embodiment illustrated on FIGS. 22A and 22B. Other non-illustrated embodiments may provide spacer 3330 using structural steel sections such as "I", "C" or "T"-beams instead, for example. Other non-illustrated spacer 3330 embodiments may be non-continuous, or may have openings provided therein to optimize weight vs. structural strength. Other non-illustrated spacer 3330 embodiments may be a hybrid of the foregoing options. The scope of this disclosure is not limited in any of these regards.

Figure 23A:
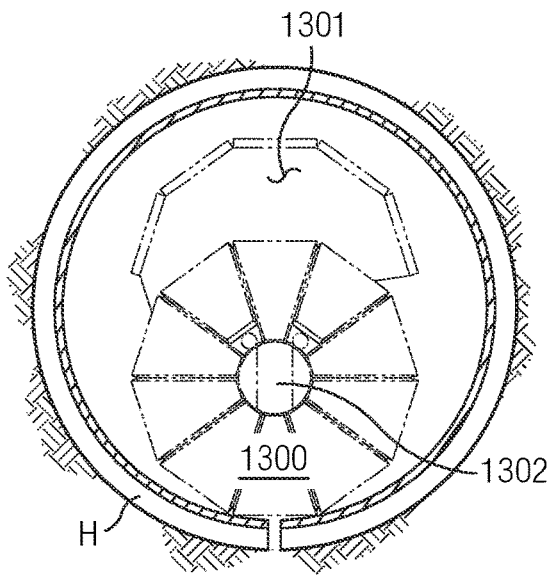
FIGS. 23A through 23D are end views within host pipe H illustrating expansion using expander 1300 from FIGS. 19A and 19B with and without accessories embodiments such as depicted on FIGS. 20A, 20B, 22A and 22B.
Figure 23B:
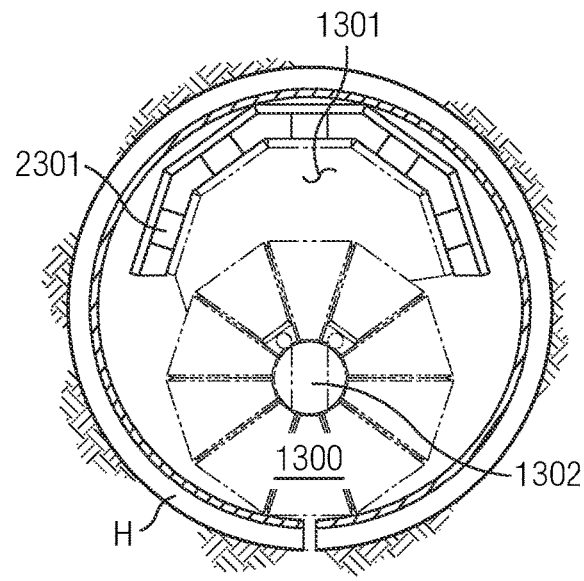
Figure 23C:
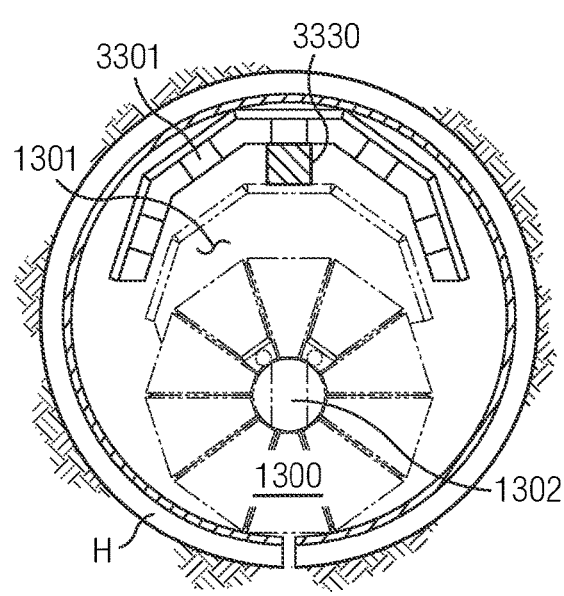
Figure 23D:
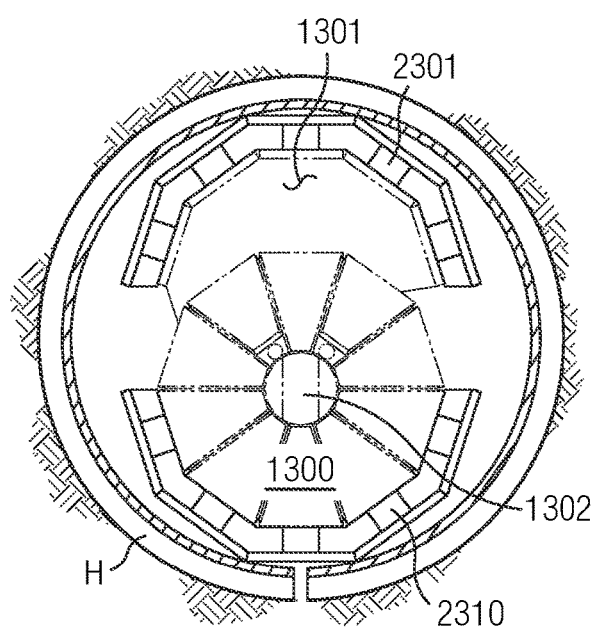

FIGS. 23A through 23D are end views within host pipe H illustrating expansion options using expander tool (or "expander") 1300 from FIGS. 19A and 19B with and without accessories embodiments such as depicted on FIGS. 20A, 20B, 22A and 22B. FIGS. 23A through 23D should be viewed in conjunction with FIGS. 7A through 7F and associated disclosure above. FIG. 23A illustrates expander 1300 from FIGS. 19A and 19B by itself. FIG. 23D illustrates expander 1300 equipped with a first embodiment of jacket accessories per FIGS. 20A, 20B and 21. FIG. 23C illustrates expander 1300 equipped with a second embodiment of jacket accessories per FIGS. 22A and 22B. FIG. 23B illustrates expander 1300 equipped with a third embodiment of jacket accessories. The embodiment of FIG. 23B is similar to the embodiment of FIGS. 23C, 22A and 22B, except that spacer 3330 on FIGS. 23C, 22A and 22B is omitted. It will be seen that in each case on FIGS. 23B through 23D, as compared to an "unjacketed" expander 1300 shown on FIG. 23A, the "jacketed" expander 1300 shown on FIGS. 23B through 23D comprise jacket pieces user-selectable thicknesses, and thereby alter the range of physical expansion available to expander 1300 by adding user-selectable thickness to the outside profile of an "unjacketed" expander 1300. The jacket accessories shown on FIGS. 23B through 23D thus adjust the nominal size of expander 1300 as shown on FIG. 23A so that a same expander tool 1300 may expand larger diameter pipes with the jacket accessories attached than without.

Figure 24:
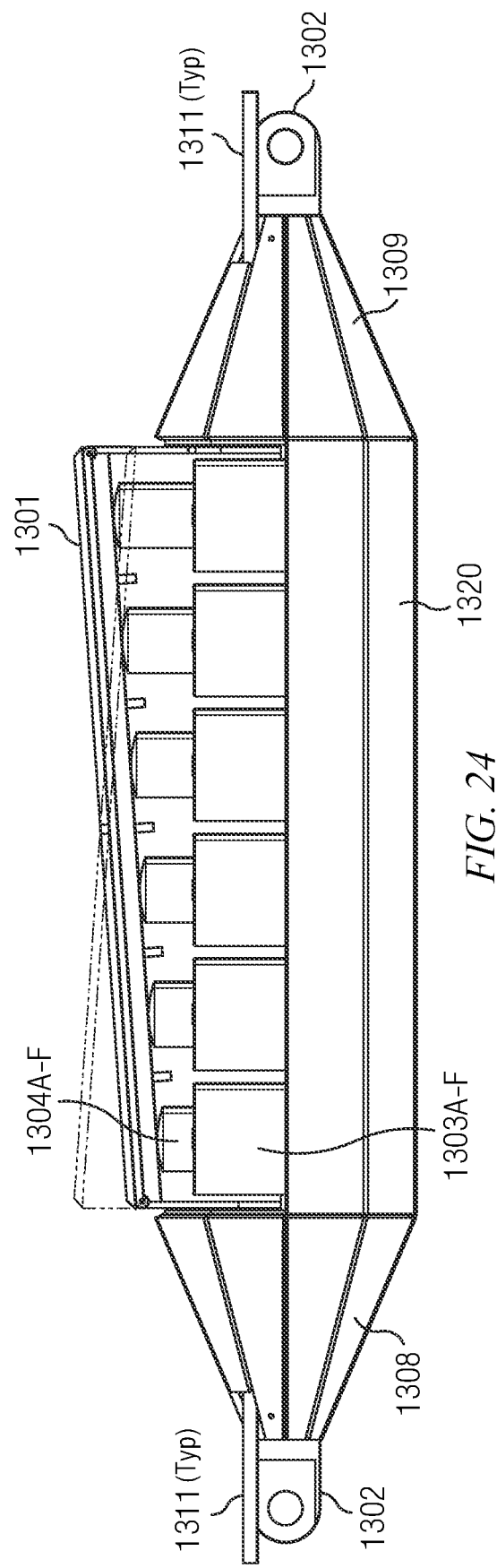
FIG. 24 is a schematic illustrating an embodiment of expander 1300 in which individual pistons 1303A-F may be actuated selectively.

As described above, FIGS. 20A through 22B illustrate both "unjacketed" and "jacketed" embodiments of expander 1300. Hydraulic lines 1311 are shown on FIGS. 20A through 20B to illustrate that pistons 1303A-F are preferably actuated via conventional hydraulics. In some embodiments, pistons 1303A-F are addressed by hydraulic lines 1311 so as to cause pistons 1303A-F to extend and retract in unison when actuated. FIG. 24 is a schematic illustrating other embodiments of expander 1300, in which at least one of pistons 1303A-F is configured to be extended and retracted individually (i.e. extended and retracted independently of others of pistons 1303A-F). FIG. 24 shows pistons 1303A-F may be individually (independently) addressed by hydraulic lines 1311 so as to cause pistons 1303A-F to extend and retract selectively when actuated. Per the example illustrated on FIG. 24, selective actuation of pistons 1303A-F enables floating pad 1301 to displace outwardly with respect to expander chassis 1320 in a selected location along floating pad 1301's length.

It will be appreciated that selective displacement of floating pad 1301 per FIG. 24 enables selective and localized pipe expansion per the examples set forth on FIGS. 23A through 23D. Just by way of example, an unexpanded host pipe, due for refurbishment, may have experienced internal collapse in a highly localized region. Referring to FIGS. 6D-6F and 7A-7F momentarily, expander 1300 per FIG. 24 may be pulled through the collapse initially such that one of cones 1308, 1309 encourages restoration of the collapsed host pipe towards the host pipe's original diameter. When floating pad 1301 is positioned at the collapse, selective expansion per FIG. 24 may further restore the collapsed host pipe's diameter to near original without disturbing surrounding host pipe. Further selective actuation of pistons 1303A-F on FIG. 24 may then adjust floating pad 1301 to be substantially parallel to expander chassis 1320. Further selective actuation of pistons 1303A-F may then cause pistons 1303A-F to expand in unison so as to expand the host pipe in the manner previously described with reference to FIGS. 6D-6F and 7A-7F.

Although the inventive material in this disclosure has been described in detail along with some of its technical advantages, it will be understood that various changes, substitutions and alternations may be made to the described embodiments without departing from the broader spirit and scope of such inventive material as set forth in the appended claims.

I claim:

1. An expander, comprising:
   a chassis;
   a floating pad, the floating pad disposed to be displaced relative to the chassis by at least one retractable and extendable piston, such that retraction and extension of the at least one piston is configured to transition the expander between a fully-retracted state and a fully-extended state, wherein the expander has a first expansion range between the fully-retracted state and the fully-extended state; and
   a floating pad jacket disposed to be removably attached to the floating pad, such that the floating jacket retracts and extends integrally with the floating pad when the floating jacket is attached to the floating pad, wherein the floating pad jacket increases the first expansion range of the expander to a second expansion range when the floating pad jacket is attached to the floating pad.

2. The expander of claim 1, further including a spacer, the spacer disposed to be selectively interposed between the floating pad and the floating pad jacket, such that the spacer and floating pad jacket increase the first expansion range of the expander to a spaced expansion range when the floating pad jacket is attached to the floating pad with the spacer interposed therebetween.

3. The expander of claim 1, further including a chassis jacket disposed to be removably attached to the chassis, such that the chassis jacket increases the first expansion range of the expander to a third expansion range when the chassis jacket is attached to the chassis.

4. The expander of claim 1, further including a first cone positioned at a first end of the chassis.

5. The expander of claim 4, further including a second cone positioned at a second end of the chassis.

6. The expander of claim 5, further including first and second cone jackets each disposed to be removably attached to the first and second cones respectively.

7. The expander of claim 4, further including a first cone jacket disposed to be removably attached to the first cone.

8. The expander of claim 7, in which the first cone jacket is an assembly of multiple cone parts.

9. The expander of claim 1, in which at least one piston is configured to be extended and retracted independently.

10. An expander, comprising:
    a chassis;
    a floating pad, the floating pad disposed to be displaced relative to the chassis by at least one retractable and extendable piston, such that retraction and extension of the at least one piston is configured to transition the expander between a fully-retracted state and a fully-extended state, wherein the expander has a first expansion range between the fully-retracted state and the fully-extended state;
    a floating pad jacket disposed to be removably attached to the floating pad, such that the floating pad jacket increases the first expansion range of the expander to a second expansion range when the floating pad jacket is attached to the floating pad; and
    a spacer, the spacer disposed to be selectively interposed between the floating pad and the floating pad jacket, such that the spacer and floating pad jacket increase the first expansion range of the expander to a spaced expansion range when the floating pad jacket is attached to the floating pad with the spacer interposed therebetween.

11. The expander of claim 10, further including a chassis jacket disposed to be removably attached to the chassis, such that the chassis jacket increases the first expansion range of the expander to a third expansion range when the chassis jacket is attached to the chassis.

12. The expander of claim 10, further including a first cone positioned at a first end of the chassis.

13. The expander of claim 12, further including a second cone positioned at a second end of the chassis.

14. The expander of claim 13, further including first and second cone jackets each disposed to be removably attached to the first and second cones respectively.

15. The expander of claim 12, further including a first cone jacket disposed to be removably attached to the first cone.

16. The expander of claim 15, in which the first cone jacket is an assembly of multiple cone parts.

17. The expander of claim 10, in which at least one piston is configured to be extended and retracted independently.

18. An expander, comprising:
   a chassis;
   a floating pad, the floating pad disposed to be displaced relative to the chassis by at least one retractable and extendable piston, such that retraction and extension of the at least one piston is configured to transition the expander between a fully-retracted state and a fully-extended state, wherein the expander has a first expansion range between the fully-retracted state and the fully-extended state;
   a first cone positioned at a first end of the chassis and a second cone positioned at a second end of the chassis;
   a floating pad jacket disposed to be removably attached to the floating pad, such that the floating pad jacket increases the first expansion range of the expander to a second expansion range when the floating pad jacket is attached to the floating pad;
   a chassis jacket disposed to be removably attached to the chassis, such that the chassis jacket increases the first expansion range of the expander to a third expansion range when the chassis jacket is attached to the chassis; and
   first and second cone jackets each disposed to be removably attached to the first and second cones respectively;
   wherein an exterior surface of the expander is substantially continuous when: (1) the floating pad jacket, the chassis jacket and the first and second cone jackets are all attached to the floating pad, chassis and first and second cones respectively, and (2) the expander is in the fully-retracted state.

19. The expander of claim 18, in which at least one of the first and second cone jackets is an assembly of multiple cone parts.

20. The expander of claim 18, in which at least one piston is configured to be extended and retracted independently.

* * * * *

UNITED STATES PATENT AND TRADEMARK OFFICE
CERTIFICATE OF CORRECTION

| | | |
|---|---|---|
| PATENT NO. | : 11,892,114 B2 | |
| APPLICATION NO. | : 17/237899 | |
| DATED | : November 7, 2023 | |
| INVENTOR(S) | : Roger W. Thompson | |

It is certified that error appears in the above-identified patent and that said Letters Patent is hereby corrected as shown below:

In the Specification

In Column 16, Line 23, replace "Eon" with --E on--.

In Column 16, Line 24, replace "His" with --H is--.

In Column 20, Line 31, replace "atop" with --a top--.

In Column 25, Line 51, replace "1E" with --10E--.

In Column 26, Line 31, replace "1A" with --11A--.

Signed and Sealed this
Second Day of April, 2024

Katherine Kelly Vidal
*Director of the United States Patent and Trademark Office*